US006986157B1

(12) United States Patent
Fijolek et al.

(10) Patent No.: US 6,986,157 B1
(45) Date of Patent: Jan. 10, 2006

(54) METHOD AND SYSTEM FOR DYNAMIC SERVICE REGISTRATION IN A DATA-OVER-CABLE SYSTEM

(75) Inventors: John G. Fijolek, Naperville, IL (US); Ali Akgun, Evanston, IL (US); Rita Shammas, Lincolnwood, IL (US); Matthew Harper, Arlington Heights, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/217,347

(22) Filed: Dec. 21, 1998

(51) Int. Cl.
 *H04N 7/173* (2006.01)
(52) U.S. Cl. .................... 725/111; 709/229; 370/395.2
(58) Field of Classification Search ............... 725/111; 709/229; 370/295.2

See application file for complete search history.

(56) References Cited

U.S. PATENT DOCUMENTS

| | | | |
|---|---|---|---|
| 4,644,533 A | 2/1987 | Braff et al. ............... 370/94 |
| 4,881,263 A | 11/1989 | Herbison et al. ........... 380/21 |
| 4,996,685 A | 2/1991 | Farese et al. | |
| 5,014,234 A | 5/1991 | Edwards, Jr. ............... 364/900 |
| 5,138,712 A | 8/1992 | Corbin ..................... 395/700 |
| 5,301,273 A | 4/1994 | Konishi | |
| 5,347,304 A | 9/1994 | Moura et al. | |
| 5,430,727 A | 7/1995 | Callon | |
| 5,442,749 A | 8/1995 | Northcutt et al. ......... 395/200.09 |

(Continued)

OTHER PUBLICATIONS

Cable Television Laboratories Inc., Data-Over-Cable Service Interface Specification (DOCSIS) Radio Frequency Interface Specification (SP-RFI-I04-980724), Jul. 24, 1998, ii-296.*

(Continued)

*Primary Examiner*—Chris Grant
*Assistant Examiner*—Andrew Y. Koenig
(74) *Attorney, Agent, or Firm*—McDonnell Boehnen Hulbert & Berghoff LLP

(57) ABSTRACT

A method and system for dynamic service registration, activation and deactivation on a data-over-cable system. A first network device, such as a cable modem with associated service devices (e.g., Voice over Internet Protocol telephones) sends a first message to another network device, such as a cable modem termination system. The first message includes multiple service parameters for a desired service requested by a service device associated with the first network device. The multiple service parameters are extracted from the first message. A service session profile is created for the desired service. The service session profile includes one or more of the extracted service parameters required by the desired service. The service session profile is used by a service server associated with the cable modem termination system to provide a desired service. The service session profile is associated with a deferred inactive service identifier for the cable modem. The deferred inactive service identifier is returned to the cable modem in a second message. The deferred inactive service identifier is used at a later time by a service device associated with the cable modem to activate the desired service and to generate a service event on a service server. The service event may include an authentication, authorization, accounting or other event. A deferred service can be activated and deactivated used even after a network device, such as a cable modem, has already established a session with another network device, such as a cable modem termination system, on a data-over-cable system.

30 Claims, 27 Drawing Sheets

U.S. PATENT DOCUMENTS

| | | | |
|---|---|---|---|
| 5,488,412 A | 1/1996 | Majeti et al. | |
| 5,489,897 A | 2/1996 | Inoue | 340/870.39 |
| 5,528,595 A | 6/1996 | Walsh et al. | 370/85.13 |
| 5,583,931 A | 12/1996 | Schneider et al. | |
| 5,586,121 A | 12/1996 | Moura et al. | |
| 5,598,410 A | 1/1997 | Stone | 370/469 |
| 5,600,717 A | 2/1997 | Schneider et al. | |
| 5,606,606 A | 2/1997 | Schneider et al. | |
| 5,608,446 A | 3/1997 | Carr et al. | |
| 5,610,910 A | 3/1997 | Focsaneanu et al. | |
| 5,623,542 A | 4/1997 | Schneider et al. | |
| 5,623,601 A | 4/1997 | Vu | 395/187.01 |
| 5,636,211 A | 6/1997 | Newlin et al. | |
| 5,675,732 A | 10/1997 | Majeti et al. | |
| 5,675,742 A | 10/1997 | Jain et al. | |
| 5,678,041 A | 10/1997 | Baker et al. | |
| 5,708,654 A | 1/1998 | Arndt et al. | |
| 5,710,885 A | 1/1998 | Bondi | 709/224 |
| 5,724,510 A | 3/1998 | Arndt et al. | |
| 5,761,602 A | 6/1998 | Wagner et al. | 455/3.1 |
| 5,778,181 A | 7/1998 | Hidary et al. | 395/200.48 |
| 5,790,198 A | 8/1998 | Roop et al. | 348/460 |
| 5,790,548 A | 8/1998 | Sistanizadeh et al. | 370/401 |
| 5,790,677 A | 8/1998 | Fox et al. | 380/24 |
| 5,790,770 A | 8/1998 | McClure et al. | |
| 5,790,806 A | 8/1998 | Koperda | 395/200.82 |
| 5,793,747 A | 8/1998 | Kline | |
| 5,799,086 A | 8/1998 | Sudia | 380/23 |
| 5,805,804 A | 9/1998 | Laursen et al. | 348/7 |
| 5,809,252 A | 9/1998 | Beighe et al. | 395/200.57 |
| 5,812,819 A | 9/1998 | Rodwin et al. | 395/500 |
| 5,815,664 A | 9/1998 | Asano | 395/200.57 |
| 5,818,845 A | 10/1998 | Moura et al. | 370/449 |
| 5,819,028 A | 10/1998 | Manghirmalani et al. | 395/185.1 |
| 5,819,042 A | 10/1998 | Hansen | 714/756 |
| 5,828,655 A | 10/1998 | Moura et al. | 370/326 |
| 5,828,666 A | 10/1998 | Focsaneanu et al. | |
| 5,835,720 A | 11/1998 | Nelson et al. | 395/200.54 |
| 5,835,727 A | 11/1998 | Wong et al. | 395/200.68 |
| 5,841,777 A | 11/1998 | Cohen | 370/433 |
| 5,848,233 A | 12/1998 | Radia et al. | |
| 5,852,721 A | 12/1998 | Dillon et al. | 395/200.47 |
| 5,854,901 A | 12/1998 | Cole et al. | 709/245 |
| 5,859,852 A | 1/1999 | Moura et al. | 370/449 |
| 5,864,679 A | 1/1999 | Kanai et al. | 709/238 |
| 5,870,134 A | 2/1999 | Laubach et al. | 348/12 |
| 5,872,523 A | 2/1999 | Dellaverson et al. | 340/825.52 |
| 5,884,024 A | 3/1999 | Lim et al. | 395/187.01 |
| 5,892,754 A | 4/1999 | Kompella et al. | |
| 5,894,479 A | 4/1999 | Mohammed | |
| 5,903,558 A | 5/1999 | Jones et al. | 370/351 |
| 5,909,549 A | 6/1999 | Compliment et al. | |
| 5,913,037 A | 6/1999 | Spofford et al. | 395/200.56 |
| 5,915,119 A | 6/1999 | Cone | |
| 5,922,049 A | 7/1999 | Radia et al. | 709/220 |
| 5,922,051 A | 7/1999 | Sidey | 709/223 |
| 5,923,659 A | 7/1999 | Curry et al. | 370/401 |
| 5,926,458 A | 7/1999 | Yin | |
| 5,943,604 A | 8/1999 | Chen et al. | 455/5.1 |
| 5,954,797 A | 9/1999 | Sidey | 709/223 |
| 5,958,007 A | 9/1999 | Lee et al. | 709/219 |
| 5,960,177 A | 9/1999 | Tanno | 395/200.59 |
| 5,974,453 A | 10/1999 | Andersen et al. | 709/220 |
| 5,982,748 A | 11/1999 | Yin et al. | |
| 5,987,524 A | 11/1999 | Yoshida et al. | |
| 5,991,292 A | 11/1999 | Focsaneanu et al. | |
| 5,991,306 A | 11/1999 | Burns et al. | |
| 5,996,076 A | 11/1999 | Rowney et al. | 713/201 |
| 5,999,536 A | 12/1999 | Kawafuji et al. | |
| 6,003,077 A | 12/1999 | Bawden et al. | 709/223 |
| 6,005,851 A | 12/1999 | Craddock et al. | 370/329 |
| 6,006,264 A | 12/1999 | Colby et al. | 709/226 |
| 6,009,103 A | 12/1999 | Woundy | 370/401 |
| 6,012,088 A | 1/2000 | Li et al. | 709/219 |
| 6,013,107 A | 1/2000 | Blackshear et al. | 703/229 |
| 6,014,545 A | 1/2000 | Wu et al. | 455/3.1 |
| 6,018,767 A | 1/2000 | Fijolek et al. | 709/218 |
| 6,031,841 A | 2/2000 | Woundy | |
| 6,032,019 A | 2/2000 | Chen et al. | 455/5.1 |
| 6,041,041 A | 3/2000 | Ramanathan et al. | 370/241 |
| 6,046,979 A | 4/2000 | Bauman | |
| 6,049,546 A | 4/2000 | Ramakrishnan | 370/412 |
| 6,049,825 A | 4/2000 | Yamamoto | |
| 6,049,826 A | 4/2000 | Beser | 709/222 |
| 6,052,724 A | 4/2000 | Willie et al. | 709/223 |
| 6,058,421 A | 5/2000 | Fijolek et al. | 709/225 |
| 6,061,349 A | 5/2000 | Coile et al. | |
| 6,065,049 A | 5/2000 | Beser | 709/218 |
| 6,070,187 A | 5/2000 | Subramaniam et al. | |
| 6,070,242 A | 5/2000 | Wong et al. | |
| 6,070,246 A | 5/2000 | Beser | 713/201 |
| 6,073,178 A | 6/2000 | Wong et al. | |
| 6,075,787 A | 6/2000 | Bobeck et al. | 370/395 |
| 6,091,709 A | 7/2000 | Harrison et al. | 370/235 |
| 6,094,431 A | 7/2000 | Yamato et al. | 370/395 |
| 6,104,700 A | 8/2000 | Haddock et al. | |
| 6,105,068 A | 8/2000 | Naudus | 709/228 |
| 6,112,258 A | 8/2000 | Miller et al. | |
| 6,118,785 A | 9/2000 | Araujo et al. | 370/401 |
| 6,122,254 A | 9/2000 | Aydemir et al. | |
| 6,128,298 A | 10/2000 | Wootton et al. | |
| 6,130,879 A | 10/2000 | Liu | |
| 6,130,880 A | 10/2000 | Naudus et al. | 370/235 |
| 6,137,792 A | 10/2000 | Jonas et al. | |
| 6,137,793 A | 10/2000 | Gorman et al. | |
| 6,148,410 A | 11/2000 | Baskey et al. | |
| 6,157,965 A | 12/2000 | Mohammed et al. | 710/8 |
| 6,170,061 B1 | 1/2001 | Beser | 713/201 |
| 6,178,455 B1 | 1/2001 | Schutte et al. | |
| 6,185,624 B1 | 2/2001 | Fijolek et al. | |
| 6,189,102 B1 | 2/2001 | Beser | |
| 6,208,656 B1 | 3/2001 | Hrastar et al. | |
| 6,212,563 B1 | 4/2001 | Beser | |
| 6,216,171 B1 | 4/2001 | Isono et al. | |
| 6,223,222 B1 * | 4/2001 | Fijolek et al. | 709/227 |
| 6,240,464 B1 | 5/2001 | Fijolek et al. | |
| 6,260,072 B1 | 7/2001 | Rodriguez-Moral | |
| 6,269,099 B1 | 7/2001 | Borella et al. | |
| 6,272,150 B1 | 8/2001 | Hrastar | |
| 6,275,853 B1 | 8/2001 | Beser et al. | |
| 6,289,377 B1 | 9/2001 | Lalwaney et al. | 709/222 |
| 6,295,554 B1 | 9/2001 | Karadogan et al. | |
| 6,301,223 B1 | 10/2001 | Hrastar et al. | |
| 6,301,618 B1 | 10/2001 | Sitaraman et al. | |
| 6,308,328 B1 | 10/2001 | Bowcutt et al. | |
| 6,331,987 B1 | 12/2001 | Beser | |
| 6,332,163 B1 | 12/2001 | Bowman-Amuah | |
| 6,337,858 B1 * | 1/2002 | Petty et al. | 370/356 |
| 6,351,773 B1 | 2/2002 | Fijolek et al. | |
| 6,370,147 B1 | 4/2002 | Beser | |
| 6,438,110 B1 * | 8/2002 | Rai et al. | 370/254 |
| 6,438,123 B1 * | 8/2002 | Chapman | 370/351 |
| 6,442,158 B1 | 8/2002 | Beser | 370/352 |
| 6,449,291 B1 | 9/2002 | Burns et al. | 370/516 |
| 6,496,511 B1 | 12/2002 | Wang et al. | 370/401 |
| 6,510,162 B1 | 1/2003 | Fijolek et al. | 370/432 |
| 6,535,486 B1 | 3/2003 | Naudus | 370/235 |
| 6,560,203 B1 | 5/2003 | Beser et al. | 370/252 |
| 6,570,606 B1 | 5/2003 | Sidhu et al. | 348/14.1 |
| 6,577,642 B1 | 6/2003 | Fijolek et al. | 370/465 |
| 6,636,485 B1 | 10/2003 | Fijolek et al. | 370/252 |
| 6,654,387 B1 | 11/2003 | Beser et al. | 370/485 |
| 6,657,991 B1 | 12/2003 | Akgun et al. | 370/352 |

2002/0101883 A1  8/2002  Ruszczyk et al. .......... 370/503

OTHER PUBLICATIONS

Kyees, P.J. et al., *ADSL: A New Twisted-Pair Access to the Information Highway*, IEEE Communications Magazine, vol. 33, Issue 4, Apr. 1995, pp. 52-60.
Huang, Yin-Hwa et al., *Design of an MPEG-Based Set-Top Box for Video on Demand Services*, Acoustics, Speech, and Signal Processing, 1995, ICASSP-95., 1995 International Conference, vol. 4, ISBN: 0-7803-2431-5, May 9-12, 1995, pp. 2655-2658.
"Radio Frequency Interface Specification (Interim Specification) SP-RFI-I04-980724", MCNS Holdings, L.P., 1997, pp. ii to 196.
"Radio Frequency Interface Specification (Interim Specification) SP-RFI-I05-991105", MCNS Holdings, L.P., 1999, pp. ii to 202.
"Radio Frequency Interface Specification (Interim Specification) SP-RFIv1.1-I06-001215", MCNS Holdings, L.P., 2000, pp. ii to 432.
"*Data-Over-Cable Service Interface Specifications: Radio Frequency Interface Specification SP-RFI-v1.1-D01981214*", (1998) Cable Television Laboratories, Inc. pp. 1-268.
U.S. Appl. No. 09/085,555, filed May 27, 1998, Beser.
U.S. Appl. No. 09/316,488, filed May 21, 1999, Beser et al.
U.S. Appl. No. 09/317,588, filed May 24, 1999, Beser et al.
U.S. Appl. No. 09/317,775, filed May 24, 1999, Vogel et al.
U.S. Appl. No. 09/584,516, filed May 31, 2000, Grabelsky et al.
U.S. Appl. No. 09/654,670, filed Sep. 5, 2000, Wang et al.
U.S. Appl. No. 09/663,756, filed Sep. 15, 2000, Vogel.
U.S. Appl. No. 09/677,431, filed Oct. 2, 2000, Beser et al.
U.S. Appl. No. 09/677,800, filed Oct. 2, 2000, Beser et al.
U.S. Appl. No. 09/722,924, filed Nov. 27, 2000, Fijolek et al.
U.S. Appl. No. 09/722,939, filed Nov. 27, 2000, Fijolek et al.
U.S. Appl. No. 09/728,282, filed Nov. 30, 2000, Puthiyandyil et al.
U.S. Appl. No. 09/731,333, filed Dec. 6, 2000, Joseph et al.
U.S. Appl. No. 09/788,782, filed Feb. 20, 2001, Voldman et al.
U.S. Appl. No. 09/791,176, filed Feb. 22, 2001, Freed et al.
U.S. Appl. No. 09/796,585, filed Feb. 27, 2001, Vogel et al.
U.S. Appl. No. 09/955,833, filed Sep. 19, 2001, Vogel et al.
"Cable Modem to Customer Premise Equipment Interface Specification (Interim) SP-CMCI-I02-980317", Multimedia Cable Network Systems (MCNS) Holdings, L.P., 1998, pp. ii to 40.
"Operations Support System Interface Specification Baseline Privacy Interface MIB (Interim) SP-OSSI-BPI-I01-980331", MCNS Holdings, L.P., 1998, pp. ii to 33.
"Cable Modem Termination System-Network Side Interface Specification (Interim Specification) SP-CMTS-NSII01-960702", MCNS Holdings, L.P., 1996, pp. ii to 13.
"Removable Security Module Interface Specification (Interim Specification) SP-RSMI-I01-980204", MCNS Holdings, L.P., 1997, pp. ii to 48.
"Baseline Privacy Interface Specification (Interim) SP-BPI-I01-970922", MCNS Holdings, L.P., 1997, pp. ii to 66.
"Operations Support System Interface Specification (Interim) SP-OSSII01-970403", MCNS Holdings, L.P., 1997, pp. 1 to 30.
"Radio Frequency Interface Specification (Interim Specification) SP-RFI-I02-971008", MCNS Holdings, L.P., 1997. pp. ii to 186.
"Cable Modem Telephony Return Interface Specification (Interim) SP-CMTRI-I01-970804", MCNS Holdings, L.P., 1997, pp. ii to 74.
"Security System Specification (Interim Specification) SP-SSI-I01-970506", MCNS Holdings, L.P., 1997, pp. ii to 103.
"Internet Engineering Task Force, Request for Comments 2131, Dynamic Host Configuration Protocol (DHCP)", Mar. 1997, pp. 1 to 42.
S. Adiraju, J. Fijolek, IPCDN Telephony Return MIB, Internet Engineering Task Force, Internet Draft, "<draft-ietf-ipcdn-tri-mib-00.1.txt>," Mar. 23, 1998, pp. 1 to 26.
Alexander, S., *DHCP Options and BOOTP Vendor Extensions*, RFC 2132, Mar. 1997, pp. 1-37.

* cited by examiner

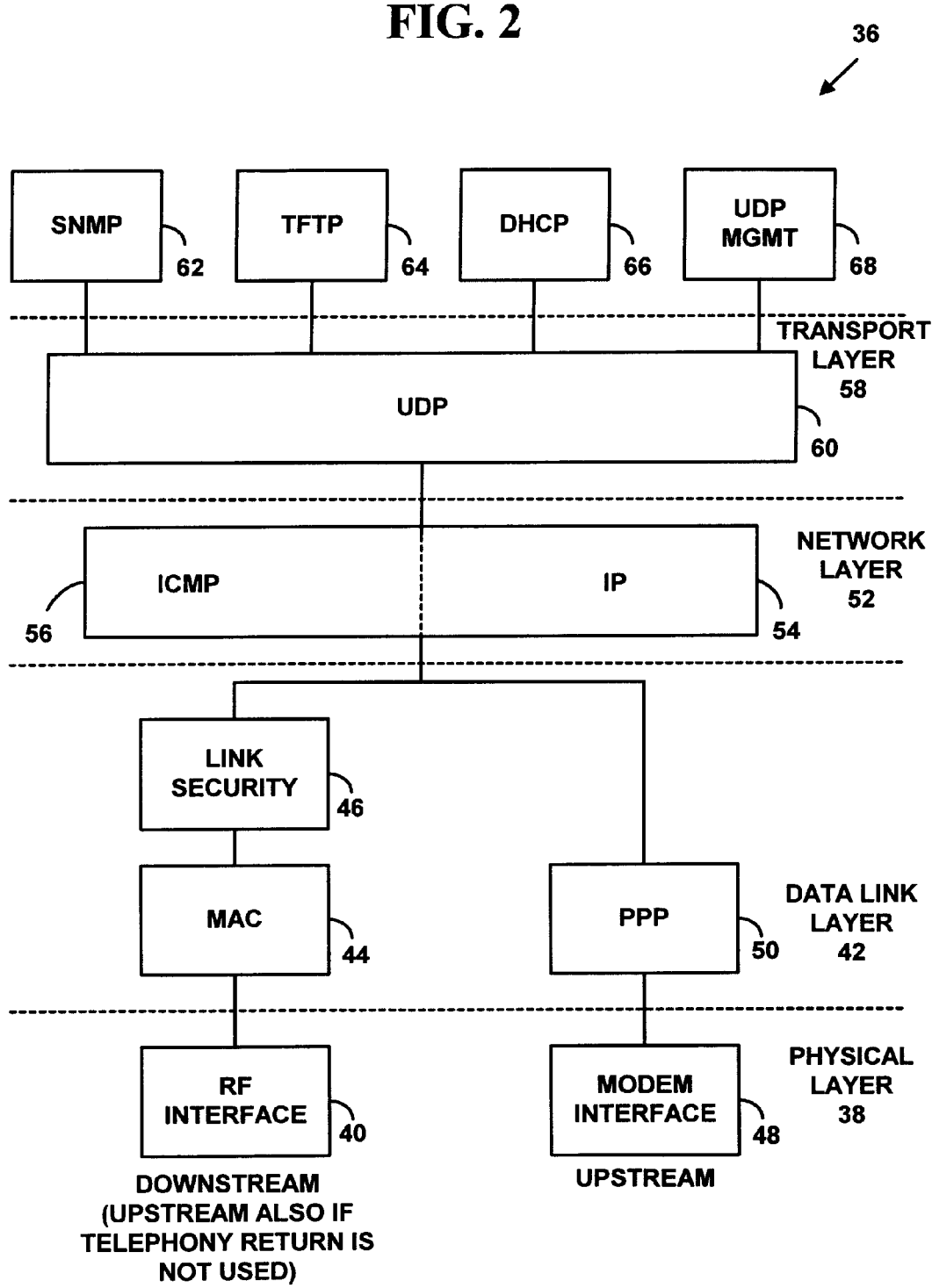

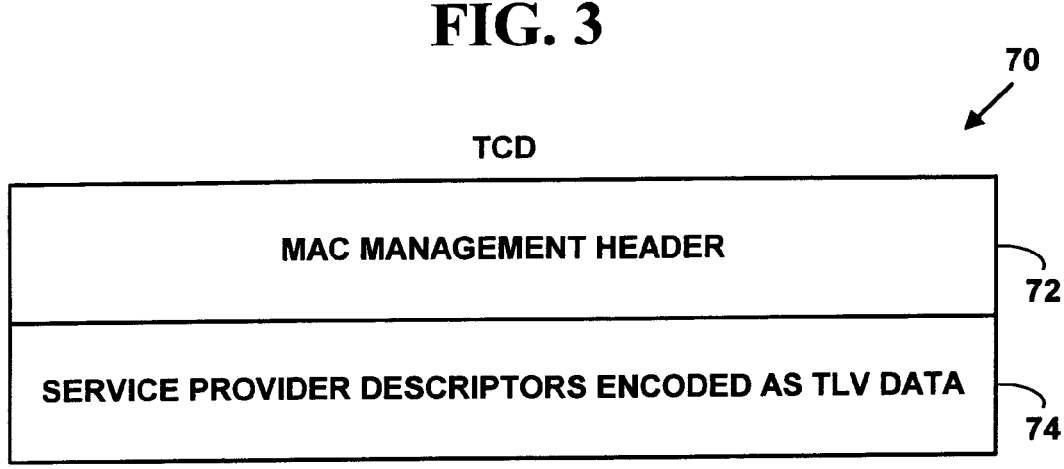
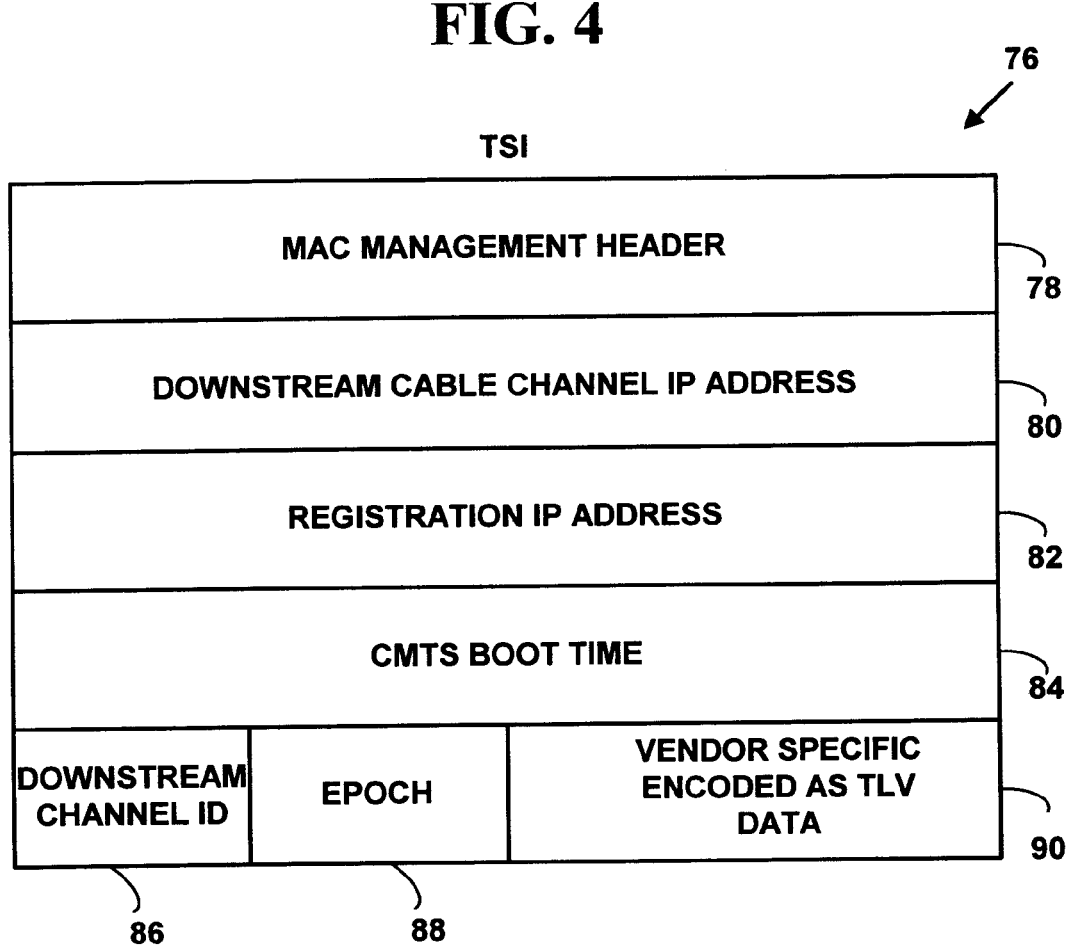

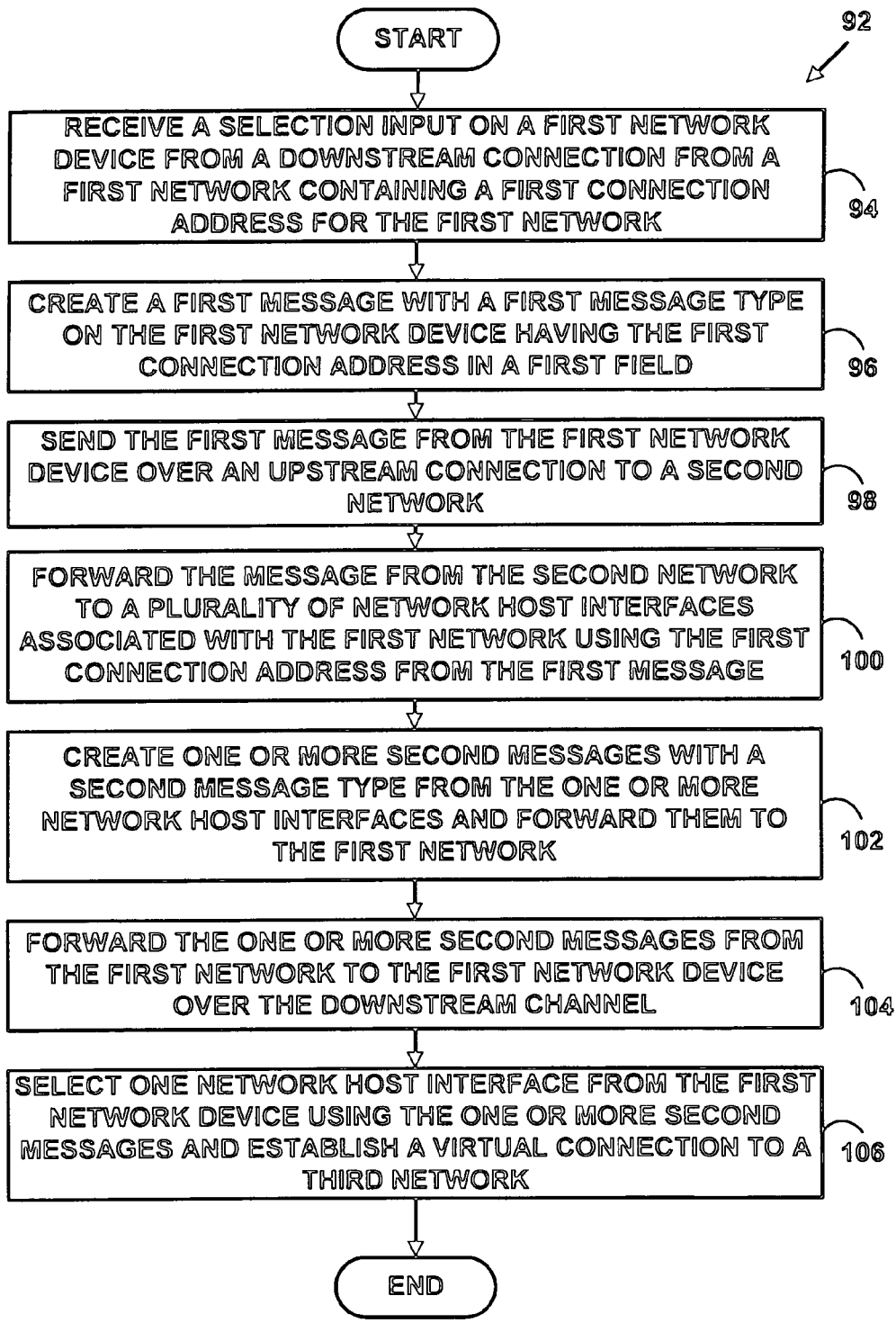

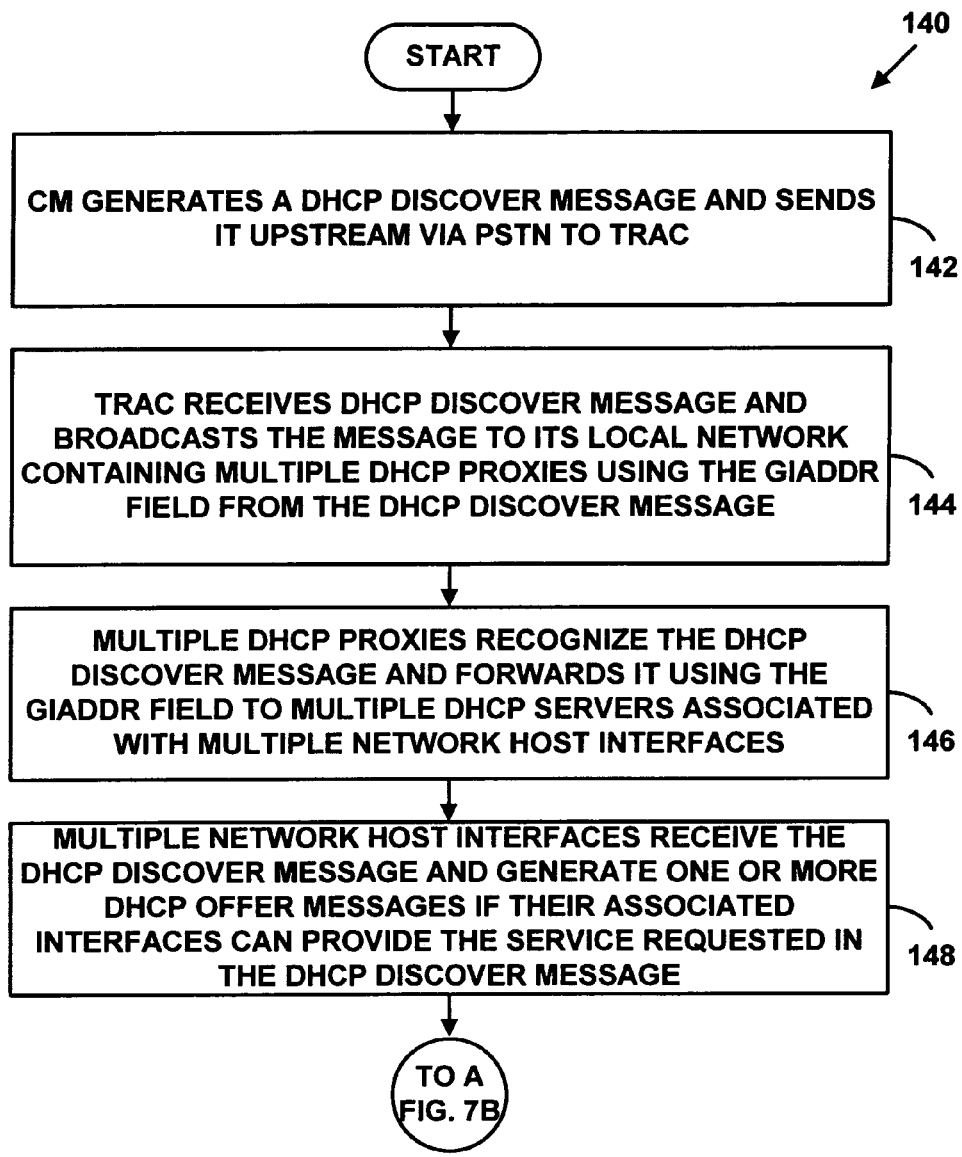

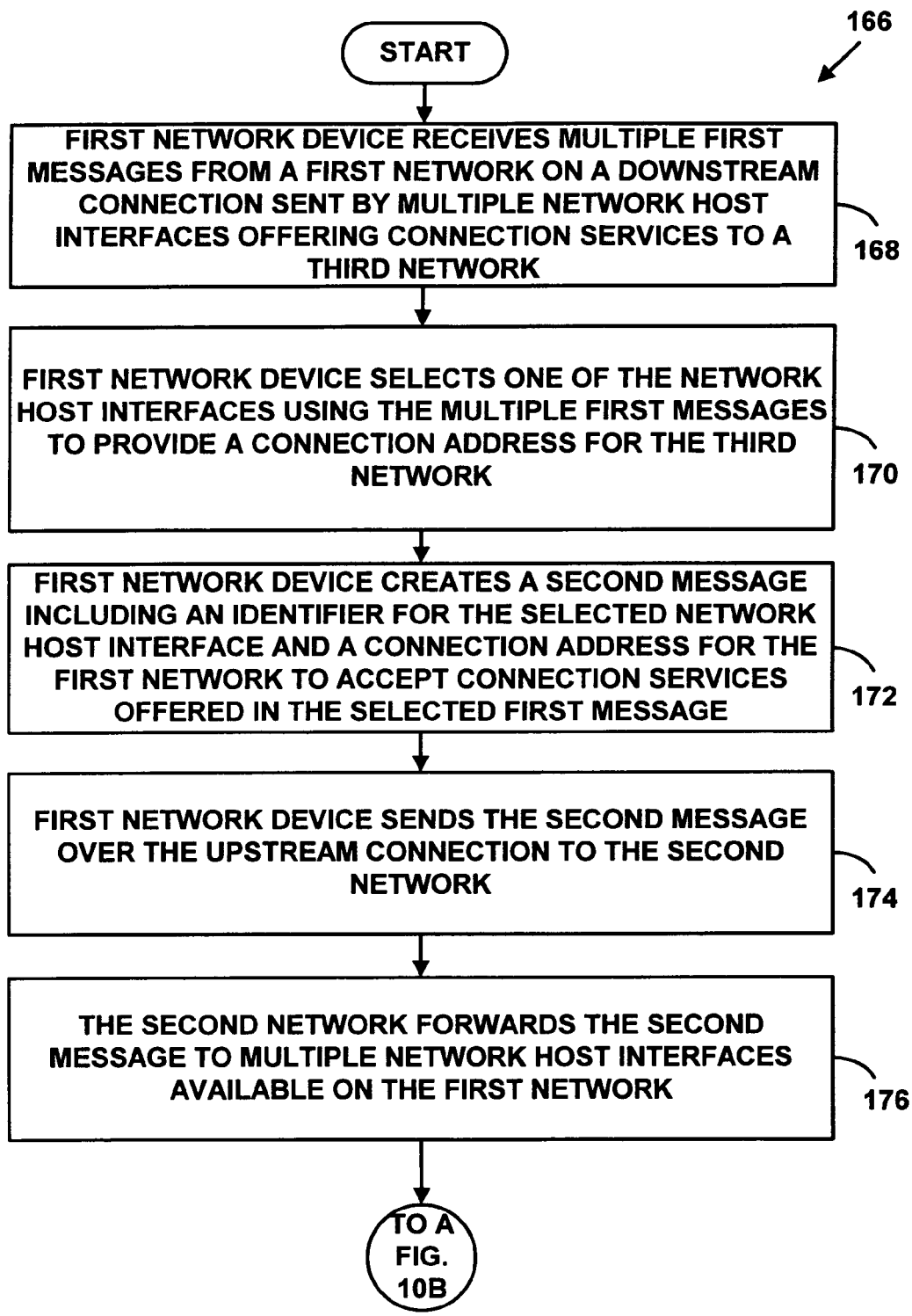

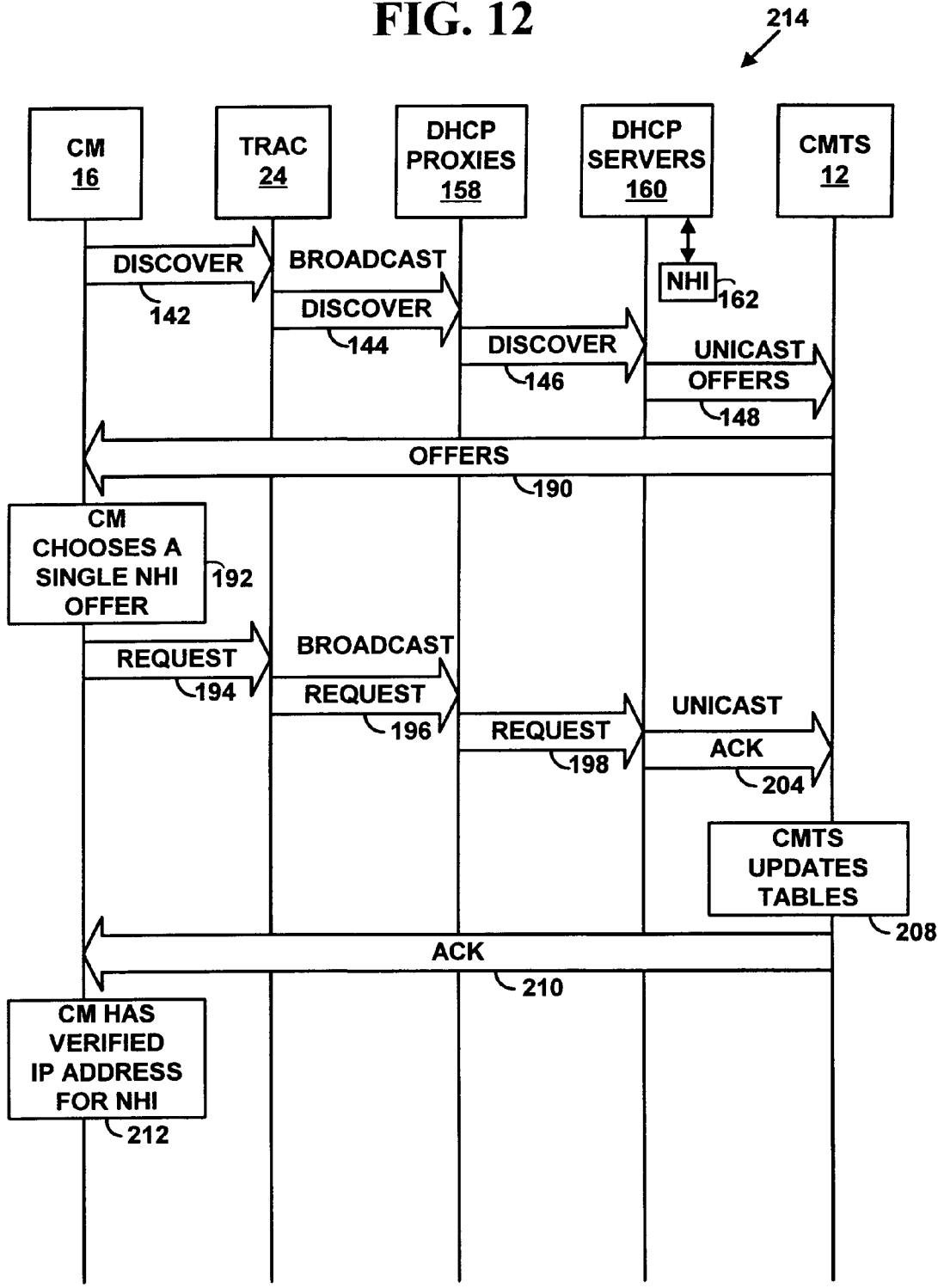

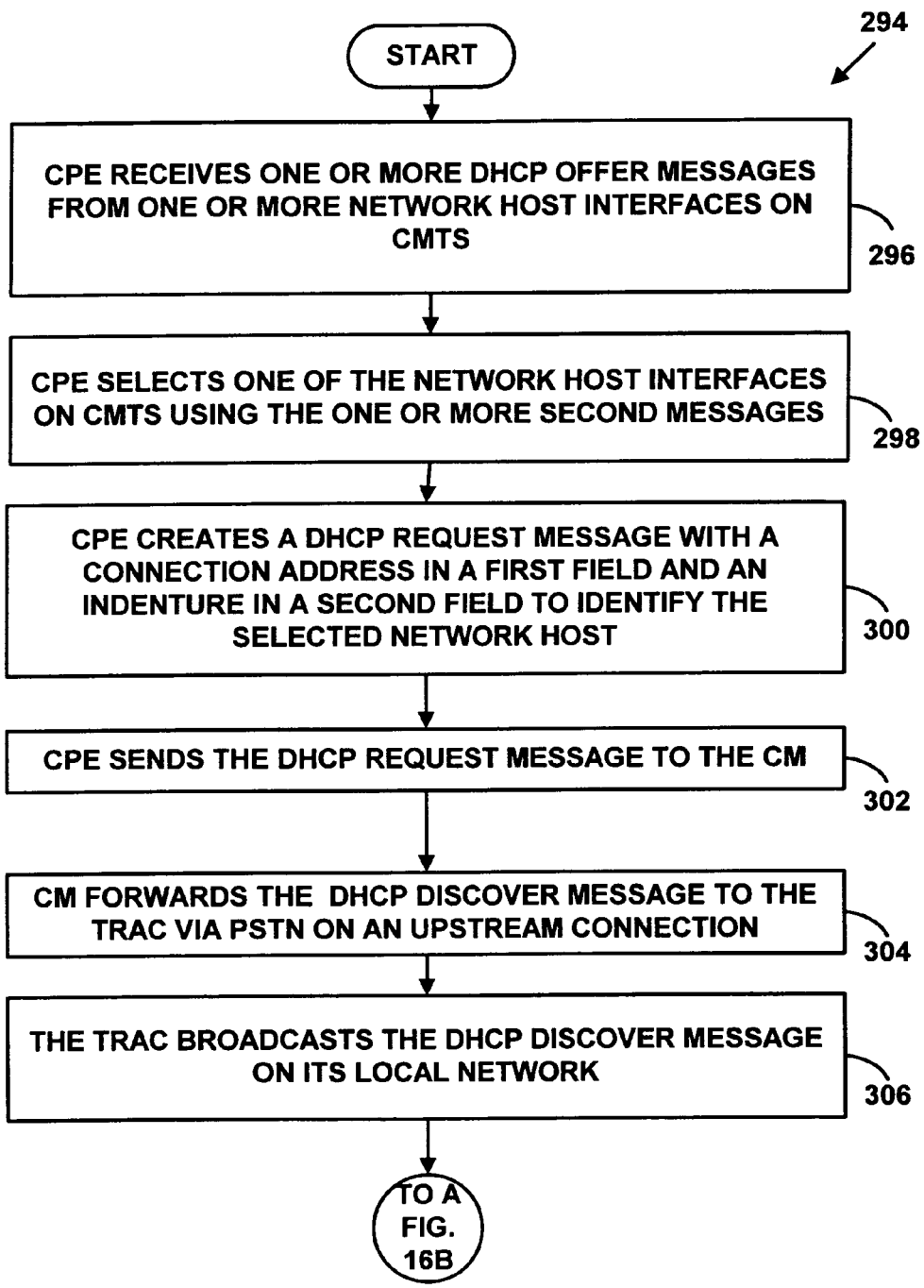

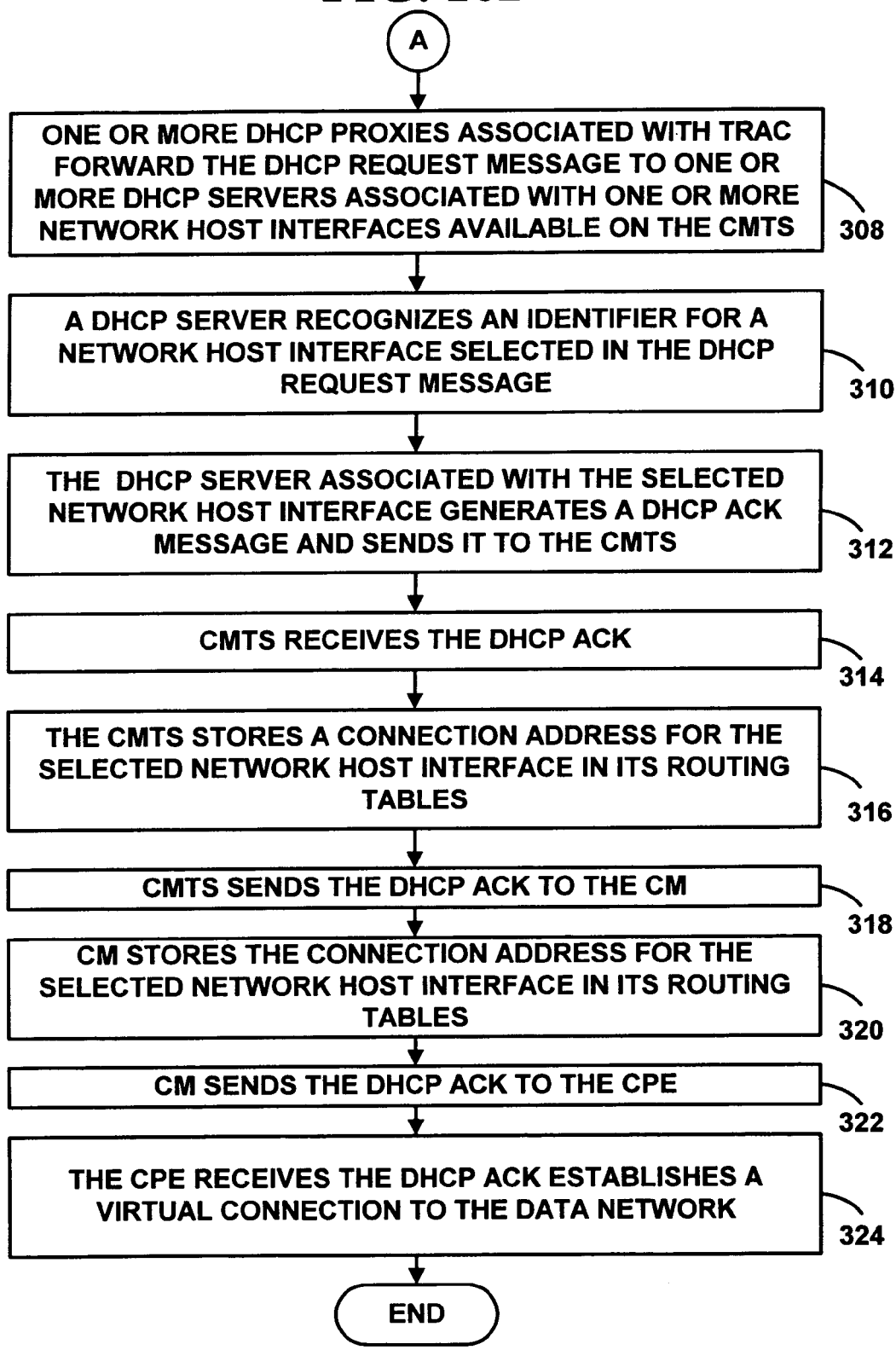

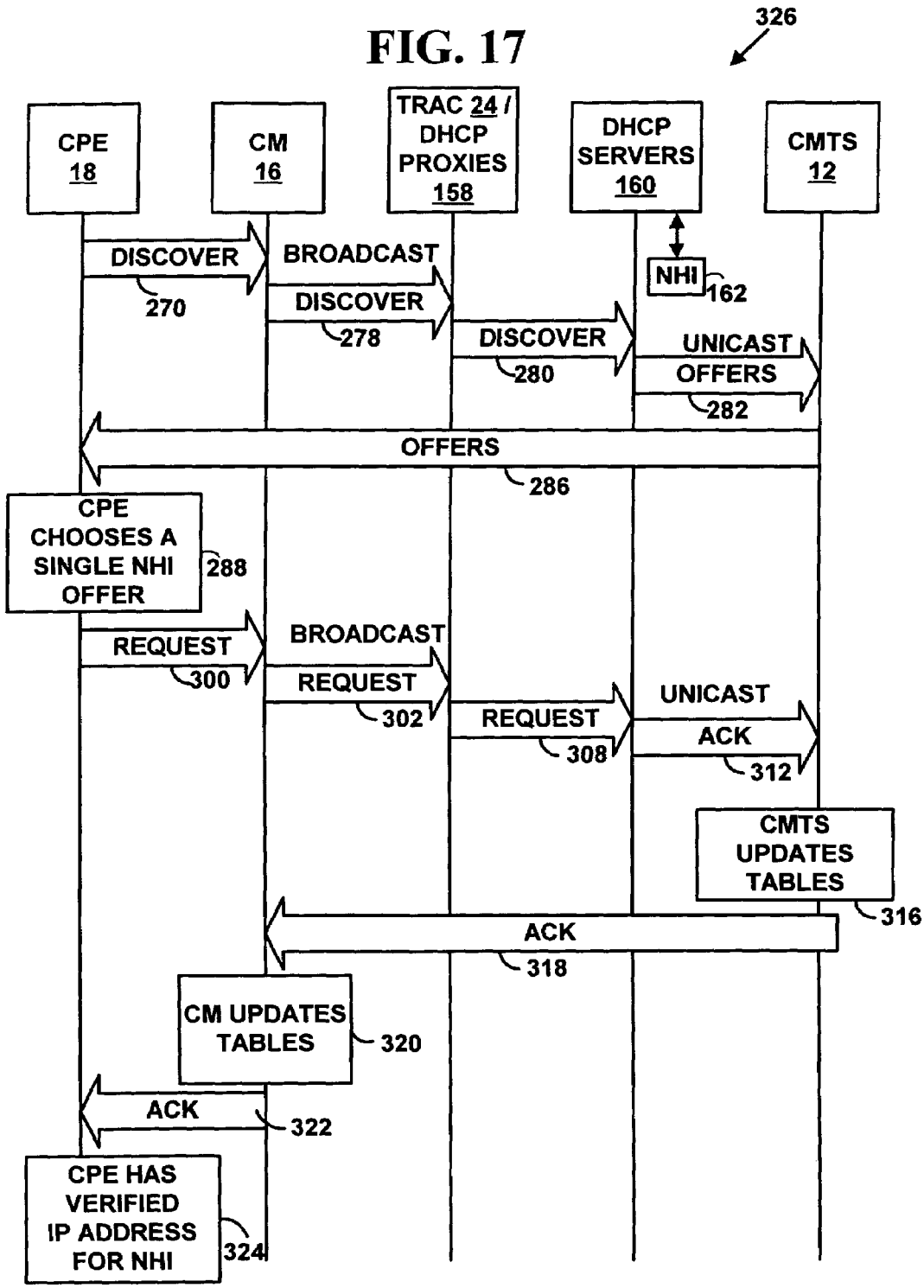

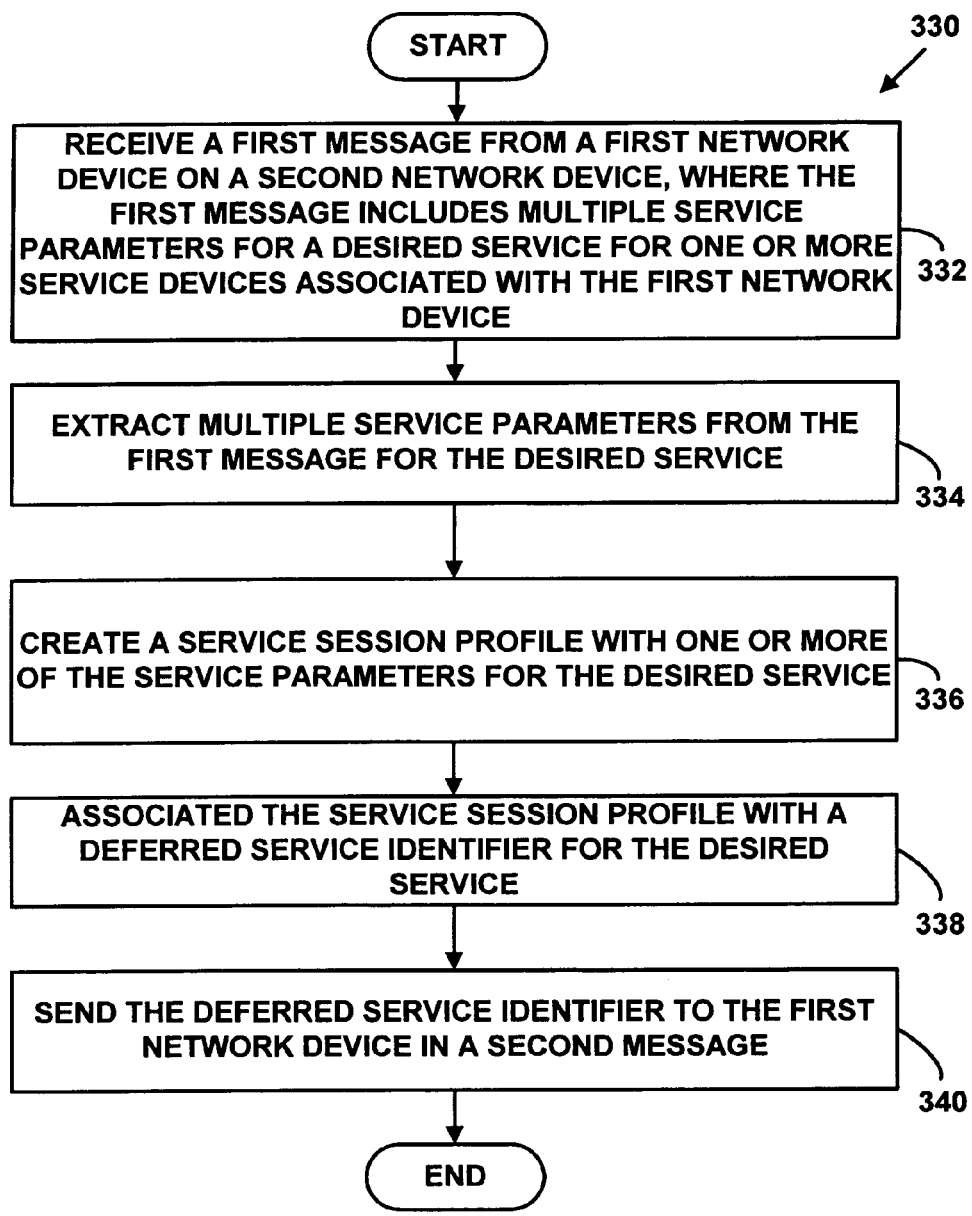

METHOD AND SYSTEM FOR DYNAMIC SERVICE REGISTRATION IN A DATA-OVER-CABLE SYSTEM

FIELD OF INVENTION

The present invention relates to communications in computer networks. More specifically, it relates to a method and system for dynamic service registration in a data-over-cable system.

BACKGROUND OF THE INVENTION

Cable television networks such as those provided by Comcast Cable Communications, Inc., of Philadelphia, Pa., Cox Communications of Atlanta, Ga., Tele-Communications, Inc., of Englewood Colo., Time-Warner Cable, of Marietta Ga., Continental Cablevision, Inc., of Boston Mass., and others provide cable television services to a large number of subscribers over a large geographical area. The cable television networks typically are interconnected by cables such as coaxial cables or a Hybrid Fiber/Coaxial ("HFC") cable system which have data rates of about 10 Mega-bits-per-second ("Mbps") to about 30+Mbps.

The Internet, a world-wide-network of interconnected computers, provides multi-media content including audio, video, graphics and text that typically requires a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps to about 30+Mbps available on a coaxial cable or HFC cable system on a cable television network.

With the explosive growth of the Internet, many customers have desired to use the larger bandwidth of a cable television network to connect to the Internet and other computer networks.

Cable modems, such as those provided by 3Com Corporation, of Santa Clara, Calif., Motorola Corporation, of Arlington Heights, Ill., Hewlett-Packard Co., of Palo Alto, Calif., Bay Networks, of Santa Clara, Calif., Scientific-Atlanta, of Norcross, Ga. and others offer customers higher-speed connectivity to the Internet, an intranet, Local Area Networks ("LANs") and other computer networks via cable television networks. These cable modems currently support a data connection to the Internet and other computer networks via a cable television network with a data rate of up to about 30+Mbps, which is a much larger data rate than can be supported by a modem used over a serial telephone line.

However, many cable television networks provide only unidirectional cable systems, supporting only a "downstream" cable data path. A downstream data path is the flow of data from a cable system "headend" to a customer. A cable system headend is a central location in the cable television network that is responsible for sending cable signals in the downstream direction. A return data path via a telephone network (i.e., a "telephony return"), such as a public switched telephone network provided by AT&T, GTE, Sprint, MCI and others, is typically used for an "upstream" data path. An upstream data path is the flow of data from the customer back to the cable system headend. A cable television system with an upstream connection to a telephony network is called a "data-over-cable system with telephony return."

An exemplary data-over-cable system with telephony return includes customer premise equipment (e.g., a customer computer), a cable modem, a cable modem termination system, a cable television network, a public switched telephone network, a telephony remote access concentrator and a data network (e.g., the Internet). The cable modem termination system and the telephony remote access concentrator together are called a "telephony return termination system."

The cable modem termination system receives data packets from the data network and transmits them downstream via the cable television network to a cable modem attached to the customer premise equipment. The customer premise equipment sends response data packets to the cable modem, which sends response data packets upstream via public switched telephone network to the telephony remote access concentrator, which sends the response data packets back to the appropriate host on the data network.

In a two-way cable system without telephony return, the customer premise equipment sends response data packets to the cable modem, which sends the data packets upstream via the cable television network to the cable modem termination system. The cable modem termination system sends the data packets to appropriate hosts on the data network. The cable modem termination system sends the response data packets back to the appropriate cable modem.

As a cable modem is initialized in a data-over-cable system, it registers with a cable modem termination system to allow the cable modem to receive data over a cable television connection and from a data network (e.g., the Internet or an Intranet). The cable modem forwards configuration information it receives in a configuration file during initialization to the cable modem termination system as part of a registration request message. A cable modem also helps initialize and register any attached customer premise equipment with the cable modem termination system.

A cable modem termination system in a data-over-cable system typically manages connections to tens of thousands of cable modems. Most of the cable modems are attached to host customer premise equipment such as a customer computer. To send and receive data to and from a computer network like the Internet or an intranet, a cable modem and customer premise equipment and other network devices have a network address dynamically assigned on the data-over-cable system. Many data-over-cable systems use a Dynamic Host Configuration Protocol ("DHCP") as a standard messaging protocol to dynamically allocate network addresses such as Internet Protocol ("IP") addresses. As is known in the art, the Dynamic Host Configuration Protocol is a protocol for passing configuration information to network devices on a network. The Internet Protocol is an addressing protocol designed to route traffic within a network or between networks.

A cable modem termination system typically handles requests for services on the data-over-cable system cable modems and customer premise equipment. As is known in the art, a Multimedia Cable Network System ("MCNS") Data Over Cable Service Interface Specification system ("DOCSIS") is typically used on some data-over-cable systems to define server interfaces that allow data services on a session basis. A session based data service is typically provided to a network device such as a cable modem or customer premise equipment during a one-time login and registration. The data service is typically available, or "always on," as long as the network device is powered on.

A Remote Authentication Dial In User Server ("RADIUS") server one is one example of an interface used by the DOCSIS system to provide data or other services to a network device. As is known in the art, RADIUS servers are responsible for receiving user connection requests, authenticating users, and then returning configuration information necessary for a client to deliver a service to a user. A RADIUS server can act as a proxy client to other RADIUS servers or other kinds of authentication servers (e.g., a Voice over Internet Protocol server, Dynamic Host Configuration server, a cable modem termination system, etc.).

Data services and other services such as Voice over Internet Protocol ("VoIp"), Asynchronous Transport Mode ("ATM"), Frame Relay, Integrated Services Digital Network ("ISDN"), Asymetric Digital Subscriber Lines ("ADSL") with configurable Quality-of-Service ("QoS"), Class-of-Service ("CoS"), Type-of-Service ("ToS"), etc. parameters are typically also session based. When a network device desires a data or other service, a DOCSIS system server is typically used to provide authentication, authorization and/or accounting for assigning a data service used by a network device during a service session.

There are several problems associated with using a DOCSIS system server or other non-DOCSIS to allow a data service during a session on a data-over-cable system. A session is typically created once during a login and registration sequence, and not changed as long as the network device is "powered on." For example, for Voice over Internet Protocol, a network device would typically require a session where a voice call could be completed at any time. One solution is to allow a network device that requires a session to have a maximum number of service parameters and service resources allocated to the session whether or not the network device is actually using a requested service. However, this may waste services resources on the data-over-cable system and prevent other network devices from using resources that are allocated, but are not currently being used by a network device.

It is also typically necessary to provide authentication, authorization or accounting at a DOCSIS system server or other non-DOCSIS when a service session is created. If a requested service requires additional service agreements, additional authentication, authorization or accounting has to be completed. However, the authentication, authorization or accounting is typically associated with a login request to initiate a service session. So requesting additional services after a service session is established may prevent authentication, authorization or accounting from being properly used by current DOCSIS system servers or other non-DOCSIS servers and may compromise the security of the data-over-cable system or prevent the data-over-cable system from collecting revenues it is owed for providing access to a service.

Thus, it is desirable to dynamically provide service session based services after a session has already been established by a network device. The dynamic service session based services should provide the ability to activate session-based services and also allow authentication, authorization or accounting to be dynamically used after a session has already been established by a network device.

SUMMARY OF THE INVENTION

In accordance with preferred embodiments of the present invention, some of the problems associated with providing dynamic service session based services in a data-over-cable system are overcome. A method and system for providing dynamic service registration on a data-over-cable system is provided. One aspect of the present invention includes a method for providing dynamic session services in a data-over-cable system. The method includes receiving a first message on a second network device on a data-over-cable system from a first network device on the data-over-cable system. The first message includes multiple service parameters for a desired service for a service device associated with the first network device. The multiple service parameters for the desired service are extracted from the first message. A service session profile is created for the desired service. The service session profile includes one or more of the extracted service parameters required by the desired service. The service session profile is used by a service server associated with the second network device to activate the desired service. The service session profile is associated with a deferred inactive service identifier for the first network device. The deferred inactive service identifier is used to activate the desired service at a later time. The deferred inactive service identifier is returned to the first network device in a second message.

Multiple deferred inactive service identifiers can be returned to support multiple service devices associated with a first network device requesting multiple services. The deferred inactive service identifier is used at a later time by a service device associated with the first network device to activate the desired service and to generate a service event on a service server. A desired service can be dynamically activated even though the first network device may have already established a session (e.g., a login or other session) with the second network device on the data-over-cable system. A desired service that has been activated using a deferred inactive service identifier can also be dynamically deactivated and reactivated again at a later time.

For example, the method allows a first network device, such as cable modem, to receive a deferred inactive service identifier during a registration sequence with a second network device, such as a cable modem termination system, that can be used by a service device (e.g., a voice over internet protocol telephone) associated with the cable modem to activate a desired service at a later time when the service device is ready to use the desired service (e.g., for a Voice over Internet Protocol call). The service session profile includes parameters required to by the desired service (e.g., quality-of-service parameters). The deferred inactive service identifier is also used to generate a service event on a service server associated with the cable modem termination system (e.g., an authentication, authorization or accounting event on a Voice over Internet Protocol server). The desired service can be dynamically activated even though the first network device may have already established a session (e.g., a login) with the second network device on the data-over-cable system.

However, the present invention is not limited to cable modems, cable modem termination systems and Voice over Internet Protocol services. Other network devices and other desired services can also be used with the method.

Another aspect of the present invention includes a system for providing dynamic services to a network device in data-over-cable system. The system includes a network device for providing a desired service requested by a service device. A service session profile includes one or more of the service parameters required for a desired service. A deferred inactive service identifier associated with a service session profile allows activation of a desired service at a later time. A deferred active service identifier created from a deferred inactive service identifier indicates that a desired service is now active. A service event generator generates a service event on a service server associated with a network device to request a change in status of a desired service on a data-over-cable system.

The method and system may dynamically provide deferred session based services after a service session between a network device and a data-over-cable system has already been established. The dynamic session based services may also provide the ability to allow service events such as authentication, authorization or accounting to be dynamically generated when a deferred session based service is activated or deactivated.

The foregoing and other features and advantages of a preferred embodiment of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein:

FIG. 2 is a block diagram illustrating a protocol stack for a cable modem;

FIG. 3 is a block diagram illustrating a Telephony Channel Descriptor message structure;

FIG. 4 is a block diagram illustrating a Termination System Information message structure;

FIG. 5 is a flow diagram illustrating a method for addressing hosts in a cable modem system;

FIGS. 7A and 7B are a flow diagram illustrating a method for discovering hosts in a cable modem system;

FIGS. 10A and 10B are a flow diagram illustrating a method for resolving host addresses in a data-over-cable system;

FIG. 12 is a block diagram illustrating the message flow of the method illustrated in FIG. 10;

FIGS. 16A and 16B are a flow diagram illustrating a method for resolving network host interfaces from customer premise equipment;

FIG. 17 is a block diagram illustrating a message flow for the methods in FIGS. 15A, 15B, and 16A and 16B;

FIG. 18 is a flow diagram illustrating a method for dynamic service registration on a data-over-cable system;

DETAILED DESCRIPTION OF PREFERRED EMBODIMENTS

Exemplary Data-Over-Cable System

Figure 1:
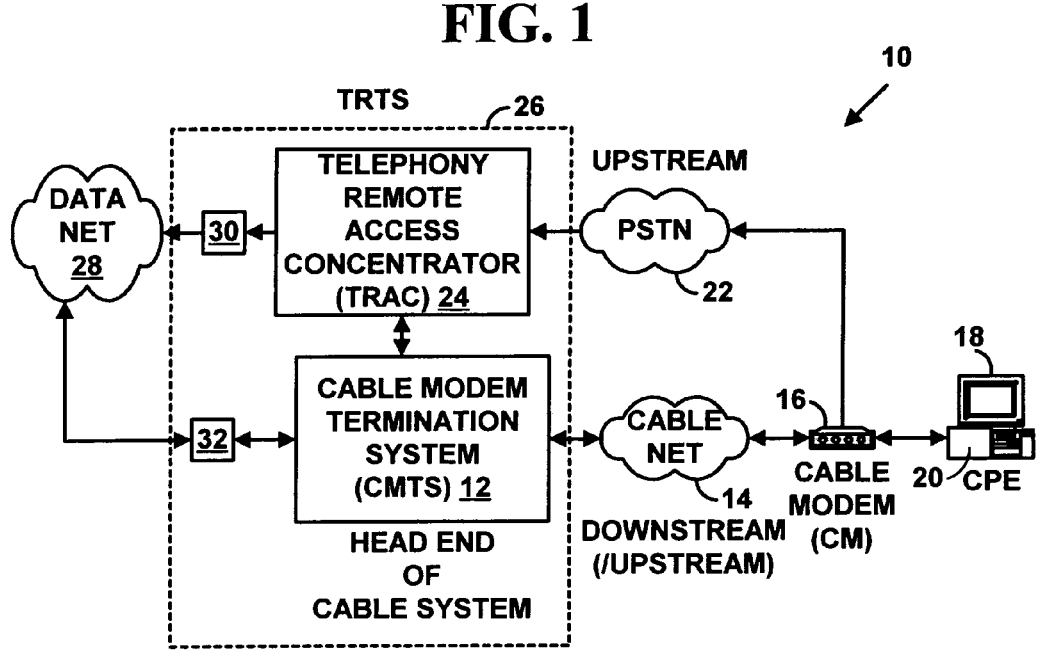
FIG. 1 is a block diagram illustrating a cable modem system with telephony return.

FIG. 1 is a block diagram illustrating an exemplary data-over-cable system 10. Most cable providers known in the art predominately provide uni-directional cable systems, supporting only a "downstream" data path. A downstream data path is the flow of data from a cable television network "headend" to customer premise equipment (e.g., a customer's personal computer). A cable television network headend is a central location that is responsible for sending cable signals in a downstream direction. A return path via a telephony network ("telephony return") is typically used for an "upstream" data path in uni-directional cable systems. An upstream data path is the flow of data from customer premise equipment back to the cable television network headend.

However, data-over-cable system 10 of the present invention may also provide a bi-directional data path (i.e., both downstream and upstream) without telephony return as is also illustrated in FIG. 1. The present invention is not limited to a data-over-cable system with telephony return. In a data-over cable system without telephony return, customer premise equipment or a cable modem has an upstream connection to the cable modem termination system via a cable television connection, a wireless connection, a satellite connection, or a connection via other technologies to send data upstream to the cable modem termination system.

Data-over-cable system 10 includes a Cable Modem Termination System ("CMTS") 12 connected to a cable television network 14, hereinafter cable network 14. FIG. 1 illustrates one CMTS 12. However, data-over-cable system 10 can include multiple CMTS 12. Cable network 14 includes cable television networks such as those provided by Comcast Cable Communications, Inc., of Philadelphia, Pa., Cox Communications, or Atlanta, Ga., Tele-Communications, Inc., of Englewood Colo., Time-Warner Cable, of Marietta, Ga., Continental Cablevision, Inc., of Boston, Mass., and others. The cable network 14 is connected to a Cable Modem ("CM") 16 with a downstream cable connection. The CM 16 is any cable modem such as those provided by 3Com Corporation of Santa Clara, Calif., Motorola Corporation of Arlington Heights, Ill., Hewlett-Packard Co. of Palo Alto, Calif., Bay Networks of Santa Clara, Calif., Scientific-Atlanta, of Norcross, Ga. and others. FIG. 1 illustrates one CM 16. However, in a typical data-over-cable system, tens or hundreds of thousands of the CMs 16 are connected to the CMTS 12.

The CM 16 is connected to Customer Premise Equipment ("CPE") 18 such as a personal computer system via a Cable Modem-to-CPE Interface ("CMCI") 20.

One CPE 18 is illustrated in FIG. 1. However, the CM 16 may have multiple CPE 18 attached (Not illustrated in FIG. 1). In one preferred embodiment of the present invention, the CM 16 is connected to a Public Switched Telephone Network ("PSTN") 22 with an upstream telephony connection. The PSTN 22 includes those public switched telephone networks provided by AT&T, Regional Bell Operating Companies (e.g., Ameritech, U.S. West, Bell Atlantic, Southern Bell Communications, Bell South, NYNEX, and Pacific Telesis Group), GTE, Sprint, MCI and others. The upstream telephony connection is any of a standard telephone line connection, Integrated Services Digital Network ("ISDN") connection, Asymmetric Digital Subscriber Line ("ADSL") connection, or other telephony connection. The PSTN 22 is connected to a Telephony Remote Access Concentrator ("TRAC") 24.

In another preferred embodiment of the present invention, in a data-over cable system without telephony return, the CM 16 has an upstream connection to the CMTS 12 via a cable television connection, a wireless connection, a satellite connection, or a connection via other technologies to send data upstream outside of the telephony return path. An upstream cable television connection via cable network 14 is illustrated in FIG. 1.

FIG. 1 illustrates a telephony modem integral to the CM 16. In another embodiment of the present invention, the telephony modem is a separate modem unit external to the CM 16 used specifically for connecting with the PSTN 22. A separate telephony modem includes a connection to the CM 16 for exchanging data. In yet another embodiment of the present invention, the CM 16 includes functionality to connect only to the cable network 14 and receives downstream signals from the cable network 14 and sends upstream signals to the cable network 14 without telephony return. The present invention is not limited to cable modems used with telephony return.

In one preferred embodiment of the present invention of the telephony return, the TRAC 24 is a Total Control Telephony Hub by 3Com Corporation of Santa Clara, Calif. An exemplary TRAC 24 is described in U.S. Pat. No. 5,528,595, granted to Dale M. Walsh et al., and incorporated herein by reference. However, the TRAC 24 could also be a telephony hub including those by Lucent Technologies of Murray Hill, N.J., Livingston Enterprises, Inc. of Pleasanton, Calif., Ascend Communications of Alameda, Calif. and others.

The CMTS 12 and the TRAC 24 may be at a "headend" of cable system 10, or the TRAC 24 may be located elsewhere and have routing associations to the CMTS 12. The CMTS 12 and the TRAC 24 together are called a "Telephony Return Termination System" ("TRTS") 26. The TRTS 26 is illustrated by a dashed box in FIG. 1. The CMTS 12 and the TRAC 24 make up the TRTS 26 whether or not they are located at the headend of cable network 14. The TRAC 24 may be located in a different geographic location from the CMTS 12. Content severs, operations servers, administrative servers and maintenance servers used in data-over-cable system 10 (not shown in FIG. 1) may also be in different locations. Access points to the data-over-cable system 10 are connected to one or more of the CMTS 12, or cable headend access points. Such configurations may be "one-to-one", "one-to-many," or "many-to-many," and may be interconnected to other Local Area Networks ("LANs") or Wide Area Networks ("WANs").

The TRAC 24 is connected to a data network 28 (e.g., the Internet, an intranet or other LAN) by a TRAC-Network System Interface 30 ("TRAC-NSI"). The CMTS 12 is connected to data network 28 by a CMTS-Network System Interface ("CMTS-NSI") 32. The present invention is not limited to data-over-cable system 10 illustrated in FIG. 1, and more or fewer components, connections and interfaces could also be used. The present invention may also be used in a data-over-cable system 10 with or without telephony return.

Network Device Protocol Stack

FIG. 2 is a block diagram illustrating a protocol stack 36 for network devices in data-over-cable system 10. FIG. 2 illustrates the downstream and upstream protocols used, for example, in the CM 16. As is known in the art, the Open System Interconnection ("OSI") model is used to describe computer networks. The OSI model consists of seven layers including from lowest-to-highest, a physical, data-link, network, transport, session, application and presentation layer. The physical layer transmits bits over a communication link. The data link layer transmits error free frames of data. The network layer transmits and routes data packets.

For downstream data transmission, network devices including the CM 16 are connected to cable network 14 in a physical layer 38 via a Radio Frequency ("RF") Interface 40. In a preferred embodiment of the present invention, RF Interface 40 has an operation frequency range of 50 Mega-Hertz ("MHz") to 1 Giga-Hertz ("GHz") and a channel bandwidth of 6 MHz. However, other operation frequencies may also be used and the invention is not limited to these frequencies. The RF interface 40 uses a signal modulation method of Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels. In one embodiment of the present invention, QAM-64 is used in the RF interface 40. However, other operating frequencies and modulation methods could also be used. For more information on the RF interface 40 see the Institute of Electrical and Electronic Engineers ("IEEE") standard 802.14 for cable modems incorporated herein by reference. IEEE standards can be found on the World Wide Web at the Universal Resource Locator ("URL") "www.ieee.org." However, other RF interfaces 40 could also be used and the present invention is not limited to IEEE 802.14 (e.g., RF interfaces from Multimedia Cable Network Systems ("MCNS") and others could also be used).

Above the RF interface 40 in a data-link layer 42 is a Medium Access Control ("MAC") layer 44. As is known in the art, the MAC layer 44 controls access to a transmission medium via physical layer 38. For more information on the MAC layer protocol 44 see IEEE 802.14 for cable modems. However, other MAC layer protocols 44 could also be used and the present invention is not limited to IEEE 802.14 MAC layer protocols (e.g., MCNS MAC layer protocols and others could also be used).

Above the MAC layer 44 is an optional link security protocol stack 46. The link security protocol stack 46 prevents unauthorized users from making a data connection from cable network 14. The RF interface 40 and the MAC layer 44 can also be used for an upstream connection in a data-over-cable system 10 without telephony return.

For upstream data transmission with telephony return, the CM 16 is connected to the PSTN 22 in physical layer 38 via modem interface 48. The International Telecommunications Union-Telecommunication Standardization Sector ("ITU-T", formerly known as the CCITT) defines standards for communication devices identified by "V.xx" series where "xx" is an identifying number. ITU-T standards can be found on the World Wide Web at the URL "www.itu.ch."

In one embodiment of the present invention, ITU-T V.34 is used as modem interface 48.

As is known in the art, ITU-T V.34 is commonly used in the data link layer for modem communications and currently allows data rates as high as 33,600 bits-per-second ("bps"). For more information see the ITU-T V.34 standard. However, other modem interfaces or other telephony interfaces could also be used. For example, an Asymmetric Digital Subscriber Link ("ADSL") or an Integrated Services Digital Network ("ISDN") telephony interface could also be used in place of the modem interface 48.

Above modem interface 48, in data link layer 42, is a Point-to-Point Protocol ("PPP") layer 50, hereinafter PPP 50. As is known in the art, PPP is used to encapsulate network layer datagrams over a serial communications link. For more information on PPP see Internet Engineering Task Force ("IETF") Request for Comments ("RFC"), RFC-1661, RFC-1662 and RFC-1663, incorporated herein by reference. Information for IETF RFCs can be found on the World Wide Web at URLs "ds.intemic.net" or "www.ietf.org."

Above both the downstream and upstream protocol layers in a network layer 52 is an Internet Protocol ("IP") layer 54. IP layer 54, hereinafter IP 54, roughly corresponds to OSI layer 3, the network layer, but is typically not defined as part of the OSI model. As is known in the art, IP 54 is a routing protocol designed to route traffic within a network or between networks. For more information on IP 54 see, RFC-791, incorporated herein by reference.

Internet Control Message Protocol ("ICMP") layer 56 is used for network management. The main functions of ICMP layer 56, hereinafter ICMP 56, include error reporting, reachability testing (e.g., "pinging") congestion control, route-change notification, performance, subnet addressing and others. Since IP 54 is an unacknowledged protocol, datagrams may be discarded and ICMP 56 is used for error reporting. For more information on ICMP 56 see, RFC-971, incorporated herein by reference.

Above IP 54 and ICMP 56 is a transport layer 58 with a User Datagram Protocol layer 60 ("UDP"). UDP layer 60, hereinafter UDP 60, roughly corresponds to OSI layer 4, the transport layer, but is typically not defined as part of the OSI model. As is known in the art, UDP 60 provides a connectionless mode of communications with datagrams. For more information on UDP 60 see, RFC-768, incorporated herein by reference.

Above the network layer are a Simple Network Management Protocol ("SNMP") layer 62, Trivial File Transfer Protocol ("TFTP") layer 64, Dynamic Host Configuration Protocol ("DHCP") layer 66 and a UDP manager 68. SNMP layer 62 is used to support network management functions. For more information on SNMP layer 62 see, RFC-1157, incorporated herein by reference. TFTP layer 64 is a file transfer protocol used to download files and configuration information. For more information on TFTP layer 64 see, RFC-1350, incorporated herein by reference. The DHCP layer 66 is a protocol for passing configuration information to hosts on an IP 54 network. For more information on the DHCP layer 66 see, RFC-1541, and RFC-2131, incorporated herein by reference. UDP manager 68 distinguishes and routes packets to an appropriate service (e.g., a virtual tunnel). More or few protocol layers could also be used with data-over-cable system 10.

The CM 16 supports transmission and reception of IP 54 datagrams as specified by RFC-791. The CMTS 12 and the TRAC 24 may also perform filtering of IP 54 datagrams. The CM 16 is also configurable for IP 54 datagram filtering to restrict the CM 16 and the CPE 18 to the use of only their assigned IP 54 addresses. The CM 16 is configurable for IP 54 datagram UDP 60 port filtering (i.e., deep filtering).

The CM 16 forwards IP 54 datagrams destined to an IP 54 unicast address across the cable network 14 or the PSTN 22. Some routers have security features intended to filter out invalid users who alter or masquerade packets as if sent from a valid user. Since routing policy is under the control of network operators, such filtering is a vendor specific implementation. For example, dedicated interfaces (i.e., Frame Relay) may exist between the TRAC 24 and/or the CMTS 12 which preclude filtering, or various forms of virtual tunneling and reverse virtual tunneling could be used to virtually source upstream packets from the CM 16. For more information on virtual tunneling, see Level 2 Tunneling Protocol ("L2TP") or Point-to-Point Tunneling Protocol ("PPTP") in IETF draft documents incorporated herein by reference by Kory Hamzeh, et. al (IETF draft documents are precursors to IETF RFCs and are works in progress).

The CM 16 also forwards IP 54 datagrams destined to an IP 54 multicast address across the cable network 14 or the PSTN 22. The CM 16 is configurable to keep IP 54 multicast routing tables and to use group membership protocols. The CM 16 is also capable of IP 54 tunneling upstream through the telephony path. A CM 16 that wants to send a multicast packet across a virtual tunnel will prepend another IP 54 header, set the destination address in the new header to be the unicast address of the CMTS 12 at the other end of the tunnel, and set the IP 54 protocol field to be four, which means the next protocol is IP 54.

The CMTS 12 at the other end of the virtual tunnel receives the packet, strips off the encapsulating IP 54 header, and forwards the packet as appropriate. A broadcast IP 54 capability is dependent upon the configuration of the direct linkage, if any, between the TRAC 24 and the CMTS 12. The CMTS 12, the CM 16, and the TRAC 24 are capable of routing IP 54 datagrams destined to an IP 54 broadcast address which is across the cable network 14 or the PSTN 22 if so configured. The CM 16 is configurable for IP 54 broadcast datagram filtering.

An operating environment for other devices, the CM 16 and other devices of the present invention includes a processing system with at least one high speed Central Processing Unit ("CPU") and a memory system. In accordance with the practices of persons skilled in the art of computer programming, the present invention is described below with reference to acts and symbolic representations of operations or instructions that are performed by the processing system, unless indicated otherwise. Such acts and operations or instructions are sometimes referred to as being "computer-executed", or "CPU executed."

It will be appreciated that the acts and symbolically represented operations or instructions include the manipulation of electrical signals by the CPU. An electrical system with data bits causes a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the CPU. The computer readable medium includes cooperating or interconnected computer readable media, which exist exclusively on the processing system or is distributed among multiple interconnected processing systems that may be local or remote to the processing system.

Initialization of a Cable Modem

When the CM 16 is initially powered on, if telephony return is being used, the CM 16 will receive a Telephony Channel Descriptor ("TCD") from the CMTS 12 that is used to provide dialing and access instructions on downstream channels via cable network 14. Information in the TCD is used by the CM 16 to connect to the TRAC 24. The TCD is transmitted as a MAC 44 management message with a management type value of $TR_1\_TCD$ at a periodic interval (e.g., every 2 seconds). To provide for flexibility, the TCD message parameters are encoded in a Type/Length/Value ("TLV") form. However, other encoding techniques could also be used. FIG. 3 is a block diagram illustrating a TCD message structure 70 with MAC 44 management header 72 and Service Provider Descriptor(s) ("SPD") 74 encoded in TLV format. SPDs 74 are compound TLV encodings that define telephony physical-layer characteristics that are used by the CM 16 to initiate a telephone call. The SPD 74 is a TLV-encoded data structure that contains sets of dialing and access parameters for the CM 16 with telephony return. The SPD 74 is contained within TCD message 70. There may be multiple SPD 74 encodings within a single TCD message 70. There is at least one SPD 74 in TCD message 70. The SPD 74 parameters are encoded as SPD-TLV tuples. The SPD 74 contains the parameters shown in Table 1 and may contain optional vendor specific parameters. However, more or fewer parameters could also be used in the SPD 74.

TABLE 1

| SPD 74 Parameter | Description |
| --- | --- |
| Factory Default Flag | Boolean value, if TRUE(1), indicates a SPD which should be used by the CM 16. |
| Service Provider Name | This parameter includes the name of a service provider. Format is standard ASCII string composed of numbers and letters. |
| Telephone Numbers | These parameters contain telephone numbers that the CM 16 uses to initiate a telephony modem link during a login process. Connections are attempted in ascending numeric order (i.e., Phone Number 1, Phone Number 2 . . . ). The SPD contains a valid telephony dial string as the primary dial string (Phone Number 1), secondary dial-strings are optional. Format is ASCII string(s) composed of: any sequence of numbers, pound "#" and star "*" keys and comma character "," used to indicate a two second pause in dialing. |
| Connection Threshold | The number of sequential connection failures before indicating connection failure. A dial attempt that does not result in an answer and connection after no more than ten rings is considered a failure. The default value is one. |
| Login User Name | This contains a user name the CM 16 will use an authentication protocol over the telephone link during the initialization procedure. Format is a monolithic sequence of alphanumeric characters in an ASCII string composed of numbers and letters. |
| Login Password | This contains a password that the CM 16 will use during authentication over a telephone link during the initialization procedure. Format is a monolithic |

TABLE 1-continued

| SPD 74 Parameter | Description |
| --- | --- |
| | sequence of alphanumeric characters in an ASCII string composed of numbers and letters. |
| DHCP Authenticate | Boolean value, reserved to indicate that the CM 16 uses a specific indicated DHCP 66 Server (see next parameter) for a DHCP 66 Client and BOOTP Relay Process when TRUE (one). The default is FALSE (zero) which allows any DHCP 66 Server. |
| DHCP Server | IP 54 address value of a DHCP 66 Server the CM 16 uses for DHCP 66 Client and BOOTP Relay Process. If this attribute is present and DHCP 66 Authenticate attribute is TRUE(1). The default value is integer zero. |
| RADIUS Realm | The realm name is a string that defines a Remote Authentication Dial In User Service ("RADIUS") server domain. Format is a monolithic sequence of alphanumeric characters in an ACSII string composed of numbers and letters. |
| PPP Authentication | This parameter instructs the telephone modem which authentication procedure to perform over the telephone link. |
| Demand Dial Timer | This parameter indicates time (in seconds) of inactive networking time that will be allowed to elapse before hanging up a telephone connection at CM 16. If this optional parameter is not present, or set to zero, then the demand dial feature is not activated. The default value is zero. |
| Vendor Specific Extensions | Optional vendor specific extensions. |

A Termination System Information ("TSI") message is transmitted by the CMTS 12 at periodic intervals (e.g., every 2 seconds) to report CMTS 12 information to the CM 16 whether or not telephony return is used. The TSI message is transmitted as a MAC 44 management message. The TSI provides a CMTS 12 boot record in a downstream channel to the CM 16 via cable network 14. Information in the TSI is used by the CM 16 to obtain information about the status of the CMTS 12. The TSI message has a MAC 44 management type value of $TR_1\_TSI$.

FIG. 4 is a block diagram of a TSI message structure 76. TSI message structure 76 includes a MAC 44 management header 78, a downstream channel IP address 80, a registration IP address 82, a CMTS 12 boot time 84, a downstream channel identifier 86, an epoch time 88 and vendor specific TLV encoded data 90.

A description of the fields of TSI message 76 are shown in Table 2. However, more or fewer fields could also be used in TSI message 76.

TABLE 2

| TSI 76 Parameter | Description |
| --- | --- |
| Downstream Channel IP Address 80 | This field contains an IP 54 address of the CMTS 12 available on the downstream channel this message arrived on. |
| Registration IP Address 82 | This field contains an IP 54 address the CM 16 sends its registration request messages to. This address MAY be the same as the Downstream Channel IP 54 address. |
| CMTS Boot Time 84 | Specifies an absolute-time of a CMTS 12 recorded epoch. The clock setting |

TABLE 2-continued

| TSI 76 Parameter | Description |
| --- | --- |
| | for this epoch uses the current clock time with an unspecified accuracy. Time is represented as a 32 bit binary number. |
| Downstream Channel ID 86 | A downstream channel on which this message has been transmitted. This identifier is arbitrarily chosen by CMTS 12 and is unique within the MAC 44 layer. |
| Epoch 88 | An integer value that is incremented each time the CMTS 12 is either re-initialized or performs address or routing table flush. |
| Vendor Specific Extensions 90 | Optional vendor extensions may be added as TLV encoded data. |

If telephony return is being used, after receiving the TCD 70 message and the TSI message 76, the CM 16 continues to establish access to data network 28 (and resources on the network) by first dialing into the TRAC 24 and establishing a telephony PPP 50 session. Upon the completion of a successful PPP 50 connection, the CM 16 performs PPP 50 Link Control Protocol ("LCP") negotiation with the TRAC 24. Once LCP negotiation is complete, the CM 16 requests Internet Protocol Control Protocol ("IPCP") address negotiation. For more information on IPCP see, RFC-1332, incorporated herein by reference. During IPCP negotiation, the CM 16 negotiates an IP 54 address with the TRAC 24 for sending IP 54 data packet responses back to data network 28 via the TRAC 24, via PPP 50.

When the CM 16 has established an IP 54 link to TRAC 24, it begins "upstream" communications to the CMTS 12 via the DHCP layer 66 to complete a virtual data connection by attempting to discover network host interfaces available on the CMTS 12 (e.g., IP 54 host interfaces for a virtual IP 54 connection). The virtual data connection allows the CM 16 to receive data from data network 28 via the CMTS 12 and cable network 14, and send return data to data network 28 via TRAC 24 and PSTN 22. The CM 16 must first determine an address of a host interface (e.g., an IP 54 interface) associated with on the CMTS 12 that can be used by data network 28 to send data to the CM 16. However, the CM 16 has only a downstream connection from the CMTS 12 and has to obtain a connection address to the data network 28 using an upstream connection to the TRAC 24.

Addressing Network Host Interfaces in the Data-Over-Cable System

FIG. 5 is a flow diagram illustrating a method 92 for addressing network host interfaces in a data-over-cable system with telephony return via a cable modem. Method 92 allows a cable modem to establish a virtual data connection to a data network. In method 92, multiple network devices are connected to a first network with a downstream connection of a first connection type, and connected to a second network with an upstream connection of a second connection type.

The first and second networks are connected to a third network with a third connection type. At Step 94, a selection input is received on a first network device from a first network over a downstream connection. The selection input includes a first connection address allowing the first network device to communicate with the first network via upstream connection to a second network. At Step 96, a first message of a first type for a first protocol is created on the first network device having the first connection address from the selection input in a first message field. The first message is used to request a network host interface address on the first network. The first connection address allows the first network device to have the first message with the first message type forwarded to network host interfaces associated with the first network via the upstream connection to the second network.

At Step 98, the first network device sends the first message over the upstream connection to the second network. The second network uses the first address field in the first message to forward the first message to one or more network host interfaces associated with the first network at Step 100. Network host interfaces associated with the first network that can provide the services requested in first message send a second message with a second message type with a second connection address in a second message field to the first network at Step 102. The second connection address allows the first network device to receive data packets from the a network via a network host interface available on the first network. The first network forwards one or more second messages on the downstream connection to the first network device at Step 104.

The first network device selects a second connection address from one of the second messages from one of the one or more network host interfaces associated with the first network at Step 106 and establishes a virtual connection from the third network to the first network device using the second connection address for the selected network host interface.

The virtual connection includes receiving data on the first network host interface on the first network from the third network and sending the data over the downstream connection to the first network device. The first network device sends data responses back to the third network over the upstream connection to the second network, which forwards the data to the appropriate destination on the third network.

In one preferred embodiment of the present invention, the data-over-cable system is the data-over-cable system 10, with telephony return. In such an embodiment, the first network device is the CM 16, the first network is the cable network 14, and the downstream connection is a cable television connection. The second network is the PSTN 22, the upstream connection is a telephony connection, the third network is data network 28 (e.g., the Internet or an intranet) and the third type of connection is an IP 54 connection. The first and second connection addresses are IP 54 addresses. However, the present invention is not limited to the network components and addresses described. Method 92 allows the CM 16 to determine an IP 54 network host interface address associated with the CMTS 12 to receive IP 54 data packets from the data network 28, thereby establishing a virtual IP 54 connection with the data network 28.

After addressing network host interfaces using Method 92, an exemplary data path through cable system 10 is illustrated in Table 3. However other data paths could also be used and the present invention is not limited to the data paths shown in Table 3. For example, the CM 16 may send data upstream back through the cable network 14 (e.g., the CM 16 to cable network 14 to the CMTS 12) and not use the PSTN 22, the TRAC 24, or the telephony return upstream path.

TABLE 3

1. An IP 54 datagram from data network 28 destined for the CM 16 arrives on the CMTS-NSI 32 and enters the CMTS 12.
2. CMTS 12 encodes the IP 54 datagram in a cable data frame, passes it to MAC 44 and transmits it "downstream" to RE interface 40 on the CM 16 via cable network 14.
3. CM 16 recognizes the encoded IP 54 datagram in MAC layer 44 received via RF interface 40.
4. CM 16 responds to the cable data frame and encapsulates a response IP 54 datagram in a PPP 50 frame and transmits it "upstream" with modem interface 48 via the PSTN 22 to TRAC 24.
5. TRAC 24 decodes the IP 54 datagram and forwards it via TRAC-NSI 30 to a destination on data network 28.

Dynamic Network Host Configuration on a Data-Over-Cable System

As was illustrated in FIG. 2, the CM 16 includes a Dynamic Host Configuration Protocol ("DHCP") layer 66, hereinafter the DHCP 66. The DHCP 66 is used to provide configuration parameters to hosts on a network (e.g., an IP 54 network). The DHCP 66 consists of two components: a protocol for delivering host-specific configuration parameters from a DHCP 66 server to a host and a mechanism for allocation of network host addresses to hosts. The DHCP 66 is built on a client-server model, where designated the DHCP 66 servers allocate network host addresses and deliver configuration parameters to dynamically configured network host clients.

Figure 6:
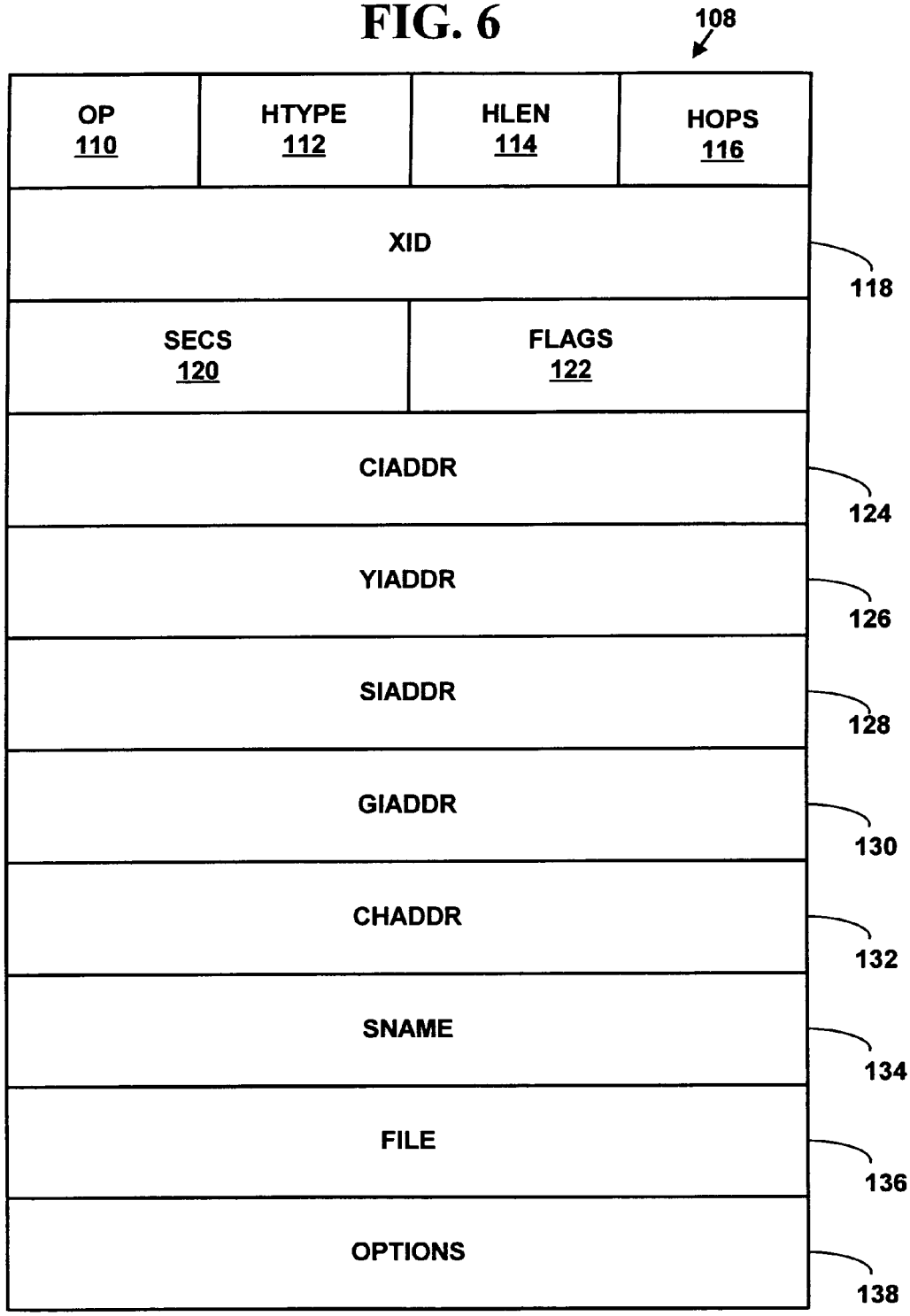
FIG. 6 is a block diagram illustrating a Dynamic Host Configuration Protocol message structure.

FIG. 6 is a block diagram illustrating an exemplary DHCP 66 message structure 108.

The format of the DHCP 66 messages is based on the format of BOOTstrap Protocol ("BOOTP") messages described in RFC-951 and RFC-1542, incorporated herein by reference. From a network host client's point of view, the DHCP 66 is an extension of the BOOTP mechanism. This behavior allows existing BOOTP clients to interpret with the DHCP 66 servers without requiring any change to network host the clients' BOOTP initialization software. The DHCP 66 provides persistent storage of network parameters for network host clients.

To capture BOOTP relay agent behavior described as part of the BOOTP specification and to allow interoperability of existing BOOTP clients with the DHCP 66 servers, the DHCP 66 servers uses a BOOTP message format. Using BOOTP relaying agents eliminates the necessity of having a DHCP 66 server on each physical network segment.

DHCP 66 message structure 108 includes an operation code field 110 ("op"), a hardware address type field 112 ("htype"), a hardware address length field 114 ("hlen"), a number of hops field 116 ("hops"), a transaction identifier field 118 ("xid"), a seconds elapsed time field 120 ("secs"), a flags field 122 ("flags"), a client IP address field 124 ("ciaddr"), a your IP address field 126 ("yiaddr"), a server IP address field 128 ("siaddr"), a gateway/relay agent IP address field 130 ("giaddr"), a client hardware address field 132 ("chaddr"), an optional server name field 134 ("sname"), a boot file name 136 ("file") and an optional parameters field 138 ("options"). Descriptions for an exemplary DHCP 66 message 108 fields are shown in Table 4.

TABLE 4

| DHCP 66 Parameter | Description |
| --- | --- |
| OP 110 | Message op code/message type. 1 BOOTREQUEST, 2 = BOOTREPLY. |
| HTYPE 112 | Hardware address type (e.g., '1' = 10 Mps Ethernet). |
| HLEN 114 | Hardware address length (e.g. '6' for 10 Mbps Ethernet). |
| HOPS 116 | Client sets to zero, optionally used by relay-agents when booting via a relay-agent. |
| XID 118 | Transaction ID, a random number chosen by the client, used by the client and server to associate messages and responses between a client and a server. |
| SECS 120 | Filled in by client, seconds elapsed since client started trying to boot. |
| FLAGS 122 | Flags including a BROADCAST bit. |
| CIADDR 124 | Client IP address; filled in by client in DHCPREQUEST if verifying previously allocated configuration parameters. |
| YIADDR 126 | 'Your'(client) IP address. |
| SIADDR 128 | IP 54 address of next server to use in bootstrap; returned in DHCPOFFER, DHCPACK and DHCPNAK by server. |
| GIADDR 130 | Gateway relay agent IP 54 address, used in booting via a relay-agent. |
| CHADDR 132 | Client hardware address (e.g., MAC layer 44 address). |
| SNAME 134 | Optional server host name, null terminated string. |
| FILE 136 | Boot file name, terminated by a null string. |
| OPTIONS 138 | Optional parameters. |

The DHCP 66 message structure shown in FIG. 6 is used to discover IP 54 and other network host interfaces in data-over-cable system 10. A network host client (e.g., the CM 16) uses the DHCP 66 to acquire or verify an IP 54 address and network parameters whenever the network parameters may have changed. Table 5 illustrates a typical use of the DHCP 66 protocol to discover a network host interface from a network host client.

TABLE 5

1. A network host client broadcasts a DHCP 66 discover message on its local physical subnet. The DHCP 66 discover message may include options that suggest values for a network host interface address. BOOTP relay agents may pass the message on to DHCP 66 servers not on the same physical subnet.
2. DHCP servers may respond with a DHCPOFFER message that includes an available network address in the 'yiaddr' field (and other configuration parameters in DHCP 66 options) from a network host interface. DHCP 66 servers unicasts the DHCPOFFER message to the network host client (using the DHCP/BOOTP relay agent if necessary) if possible, or may broadcast the message to a broadcast address (preferably 255.255.255.255) on the client's subnet.
3. The network host client receives one or more DHCPOFFER messages from one or more DHCP 66 servers. The network host client may choose to wait for multiple responses.
4. The network host client chooses one DHCP 66 server with an associated network host interface from which to request configuration parameters, based on the configuration parameters offered in the DHCPOFFER messages.

Discovering Network Host Interfaces in the Data-Over-Cable System

The DHCP 66 discovery process illustrated in Table 5 will not work in data-over-cable system 10 with r without telephony return. In an exemplary preferred embodiment of the present invention with telephony return, the CM 16 discovers network host interfaces via TRAC 24 and the PSTN 22 on an upstream telephony connection. In another exemplary preferred embodiment of the present invention without telephony return, the CM 16 discovers network host interfaces via the CMTS 12 on an upstream cable connection.

The DHCP 66 addressing process shown in Table 5 was not originally intended to discover network host interfaces in data-over-cable system 10. The CMTS 12 has DHCP 66 servers associated with network host interfaces (e.g., IP 54 interfaces). However, in one preferred embodiment of the present invention with telephony return, the CM 16 only has as downstream connection from the CMTS 12. The CM 16 has an upstream connection to TRAC 24, which has a DHCP 66 layer. However, TRAC 24 does not have the DHCP 66 servers, or direct access to network host interfaces (e.g., IP 54 interfaces) associated with the CMTS 12.

Figure 7B:
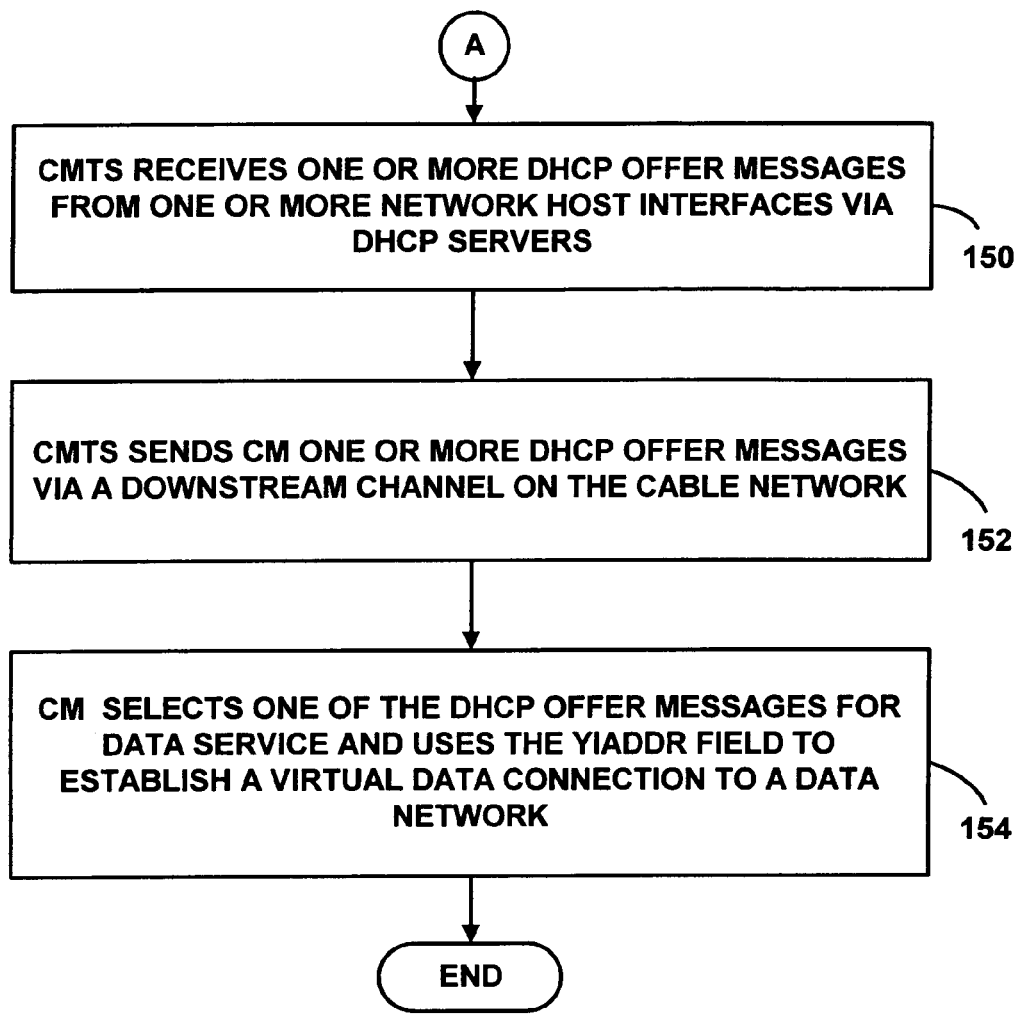

FIGS. 7A and 7B are a flow diagram illustrating a Method 140 for discovering network host interfaces in data-over-cable system 10. In one preferred embodiment of the present inventions with telephony return, when the CM 16 has established an IP 54 link to TRAC 24, via PPP 50, it begins communications with the CMTS 12 via DHCP 66 to complete a virtual IP 54 connection with the data network 28. However, to discover what IP 54 host interfaces might be available on the CMTS 12, the CM 16 has to communicate with the CMTS 12 via the PSTN 22 and TRAC 24 since the CM 16 only has a "downstream" cable channel from the CMTS 12 in a data-over-cable system with telephony return.

At Step 142 in FIG. 7A, after receiving a TSI message 76 from the CMTS 12 on a downstream connection, the CM 16 generates a DHCP discover ("DHCPDISCOVER") message and sends it upstream via the PSTN 22 to TRAC 22 to discover what IP 54 interfaces are associated with the CMTS 12. The fields of the DHCP 66 discover message are set as illustrated in Table 6. However, other field settings may also be used.

TABLE 6

| DHCP 66 Parameter | Description |
|---|---|
| OP 110 | Set to BOOTREQUEST. |
| HTYPE 112 | Set to network type (e.g., one for 10 Mbps Ethernet). |
| HLEN 114 | Set to network length (e.g., six for 10 Mbps Ethernet) |
| HOPS 116 | Set to zero. |
| FLAGS 122 | Set BROADCAST bit to zero. |
| CIADDR 124 | If the CM 16 has previously been assigned an IP 54 address, the IP 54 address is placed in this field. If the CM 16 has previously been assigned an IP 54 address by the DHCP 66, and also has been assigned an address via IPCP, the CM 16 places the DHCP 66 IP 54 address in this field. |
| GIADDR 130 | CM 16 places the Downstream Channel IP 54 address 80 of the CMTS 12 obtained in TSI message 76 on a cable downstream channel in this field. |
| CHADDR 132 | CM 16 places its 48-bit MAC 44 LAN address in this field. |

The DHCPDISCOVER message is used to "discover" the existence of one or more IP 54 host interfaces associated with the CMTS 12. The DHCP 66 giaddr-field 130 (FIG. 6) includes a downstream channel IP address 80 of the CMTS 12 obtained in TSI message 76 (e.g., the first message field from Step 96 of Method 92). Using the downstream channel IP address 80 of the CMTS 12 obtained in TSI message 76 allows the DHCPDISCOVER message to be forwarded by TRAC 24 to the DHCP 66 servers (i.e., protocol servers) associated with network host interfaces associated with the CMTS 12. If the DHCP 66 giaddr-field 130 (FIG. 6) in a DHCP message from a DHCP 66 client is non-zero, a DHCP 66 server sends any return messages to a DHCP 66 server port on a DHCP 66 relaying agent (e.g., the CMTS 12) whose address appears in the DHCP 66 giaddr-field 130.

In a typical DHCP 66 discovery process, the DHCP 66 giaddr-field 130 is set to zero. However, in one preferred embodiment of the present invention, the DHCP 66 giaddr-field 130 contains the IP address 80 of the CMTS 12. If the DHCP 66 giaddr-field 130 is zero, the DHCP 66 client is on the same subnet as the DHCP 66 server, and the DHCP 66 server sends any return messages to either the DHCP 66 client's network address, if that address was supplied in the DHCP 66 ciaddr-field 124 (FIG. 6), or to a client's hardware address (e.g., MAC address 44) specified in the DHCP 66 chaddr-field 132 (FIG. 6) or to a local subnet broadcast address (e.g., 255.255.255.255).

At Step 144, a DHCP 66 layer on TRAC 24 broadcasts the DHCPDISCOVER message on its local network leaving the DHCP 66 giaddr-field 130 intact since it already contains a non-zero value. TRAC's 24 local network includes connections to one or more DHCP 66 proxies (i.e., network host interface proxies). The DHCP 66 proxies accept the DHCP 66 messages originally from the CM 16 destined for DHCP 66 servers associated with network host interfaces associated with the CMTS 12. The TRAC 24 has no direct access to DHCP 66 servers associated with network host interfaces associated with the CMTS 12. The DHCP 66 proxies are not used in a typical the DHCP 66 discovery process known on the art.

One or more DHCP 66 proxies on TRAC's 24 local network recognizes the DHCPDISCOVER message and forwards it to one or more DHCP 66 servers associated with network host interfaces (e.g., IP 54 interfaces) associated with the CMTS 12 at Step 146. Since the DHCP 66 giaddr-field 130 (FIG. 6) in the DHCPDISCOVER message sent by the CM 16 is already non-zero (i.e., contains the downstream IP address of the CMTS 12), the DHCP 66 proxies also leave the DHCP 66 giaddr-field 130 intact.

One or more DHCP 66 servers for network host interfaces (e.g., IP 54 interfaces) available on the CMTS 12 receive the DHCPDISCOVER message and generate a DHCP 66 offer message ("DHCPOFFER") at Step 148. The DHCP 66 offer message is an offer of configuration parameters sent from network host interfaces to the DHCP 66 servers and back to a network host client (e.g., the CM 16) in response to a DHCPDISCOVER message. The DHCP 66 offer message is sent with the message fields set as illustrated in Table 7. However, other field settings can also be used. The DHCP 66 yiaddr-field 126 (e.g., second message field from Step 102 of Method 92) contains an IP 54 address for a network host interface available on the CMTS 12 and used for receiving data packets from data network 28.

TABLE 7

| DHCP 66 Parameter | Description |
|---|---|
| FLAGS 122 | BROADCAST bit set to zero. |
| YIADDR 126 | IP 54 address from a network host interface to allow the CM 16 to receive data from data network 28 via a network host interface available on the CMTS 12. |

TABLE 7-continued

| DHCP 66 Parameter | Description |
| --- | --- |
| SIADDR 128 | An IP 54 address for a TFTP 64 server to download configuration information for an interface host. |
| CHADDR 132 | MAC 44 address of the CM 16. |
| SNAME 134 | Optional DHCP 66 server identifier with an interface host. |
| FILE 136 | A TFTP 64 configuration file name for the CM 16. |

DHCP 66 servers send the DHCPOFFER message to the address specified in the DHCP 66 giaddr-field 130 (i.e., the CMTS 12) from the DHCPDISCOVER message if associated network host interfaces (e.g., IP 54 interfaces) can offer the requested service (e.g., IP 54 service) to the CM 16. The DHCPDISOVER message DHCP 66 giaddr-field 130 contains a downstream channel IP address 80 of the CMTS 12 that was received by the CM 16 in TSI message 76. This allows the CMTS 12 to receive the DHCPOFFER messages from the DHCP 66 servers and send them to the CM 16 via a downstream channel on cable network 14.

At Step 150 in FIG. 7B, the CMTS 12 receives one or more DHCPOFFER messages from one or more DHCP 66 servers associated with the network host interfaces (e.g., IP 54 interfaces). THE CMTS 12 examines the DHCP 66 yiaddr-field 126 and DHCP 66 chaddr-field 132 in the DHCPOFFER messages and sends the DHCPOFFER messages to the CM 16 via cable network 14. The DHCP 66 yiaddr-field 126 contains an IP 54 address for a network host IP 54 interface available on the CMTS 12 and used for receiving IP 54 data packets from data network 28. The DHCP 66 chaddr-field 132 contains the MAC 44 layer address for the CM 16 on a downstream cable channel from the CMTS 12 via cable network 14. The CMTS 12 "knows" the location of the CM 16 since it sent the CM 16 a MAC 44 layer address in one or more initialization messages (e.g., TSI message 76).

If a BROADCAST bit in flags-field 124 is set to one, the CMTS 12 sends the DHCPOFFER messages to a broadcast IP 54 address (e.g., 255.255.255.255) instead of the address specified in the DHCP 66 yiaddr-field 126. The DHCP 66 chaddr-field 132 is still used to determine that MAC 44 layer address. If the BROADCAST bit in the DHCP 66 flags-field 122 is set, the CMTS 12 does not update internal address or routing tables based upon the DHCP 66 yiaddr-field 126 and the DHCP 66 chaddr-field 132 pair when a broadcast message is sent.

At Step 152, the CM 16 receives one or more DHCPOFFER messages from the CMTS 12 via cable network 14 on a downstream connection. At Step 154, the CM 16 selects an offer for IP 54 service from one of the network host interfaces (e.g., an IP interfaces 54) associated with the CMTS 12 that responded to the DHCPDISOVER message sent at Step 142 in FIG. 7A and establishes a virtual IP 54 connection. The selected DHCPOFFER message contains a network host interface address (e.g., IP 54 address) in the DHCP 66 yiaddr-field 126 (FIG. 6). A CM 16 acknowledges the selected network host interface with a DHCP 66 message sequence explained below.

After selecting and acknowledging a network host interface, the CM 16 has discovered an IP 54 interface address available on the CMTS 12 for completing a virtual IP 54 connection with the data network 28. Acknowledging a network host interface is explained below. The virtual IP 54 connection allows IP 54 data from the data network 28 to be sent to the CMTS 12 which forwards the IP 54 packets to the CM 16 on a downstream channel via the cable network 14. The CM 16 sends response IP 54 packets back to data network 28 via the PSTN 22 and the TRAC 24 if telephony return is used. The CM sends response IP packets back to the data network 28 via the CMTS 12 if a two-way cable network is used.

Figure 8:
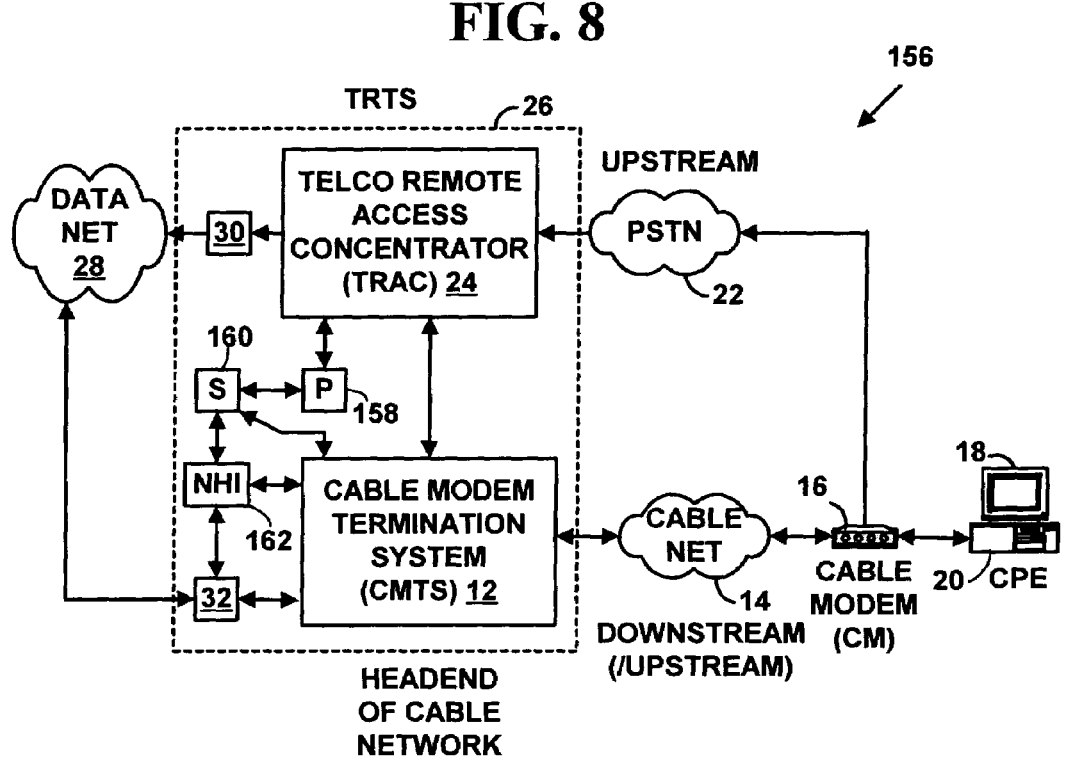
FIG. 8 is a block diagram illustrating a data-over-cable system for the method illustrated in FIGS. 7A and 7B.

FIG. 8 is a block diagram illustrating an exemplary data-over-cable system 156 for the Method illustrated in FIGS. 7A and 7B. Data-over-cable system 156 includes DHCP 66 proxies ("P") 158, DHCP 66 servers ("S") 160 and associated Network Host Interfaces ("NHI") 162 available on the CMTS 12. Multiple DHCP 66 proxies 158, DHCP 66 servers 160 and network host interfaces 162 are illustrated as single boxes in FIG. 8. FIG. 8 also illustrates the DHCP 66 proxies 158 separate from TRAC 24. In one embodiment of the present invention, the TRAC 24 includes integral DHCP 66 proxy functionality and no separate DHCP 66 proxies 158 are used. In such an embodiment, TRAC 24 forwards the DHCP 66 messages using the DHCP 66 giaddr-field 130 to the DHCP 66 servers 160 associated with the CMTS 12.

Figure 9:
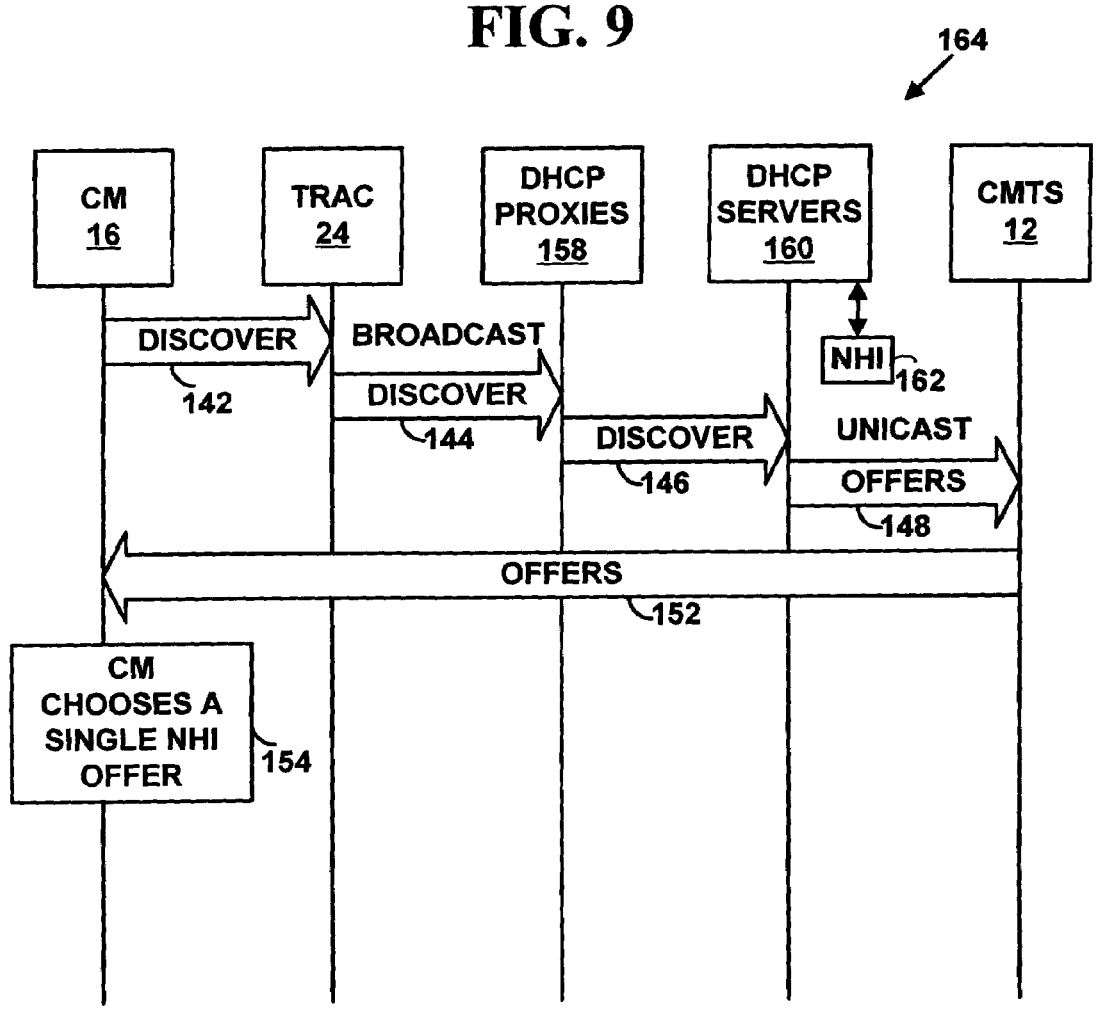
FIG. 9 is a block diagram illustrating the message flow of the method illustrated in FIGS. 7A and 7B.

FIG. 9 is a block diagram illustrating a message flow 162 of Method 140 (FIGS. 7A and 7B). Message flow 162 includes the DHCP proxies 158 and the DHCP servers 160 illustrated in FIG. 8 Steps 142, 144, 146, 148, 150 and 154 of Method 140 (FIGS. 7A and 7B) are illustrated in FIG. 9. In one embodiment of the present invention, the DHCP proxies 158 are not separate entities, but are included in TRAC 24. In such an embodiment, the DHCP proxy services are provided directly by TRAC 24.

Resolving Addresses for Network Host Interfaces

Figure 10B:
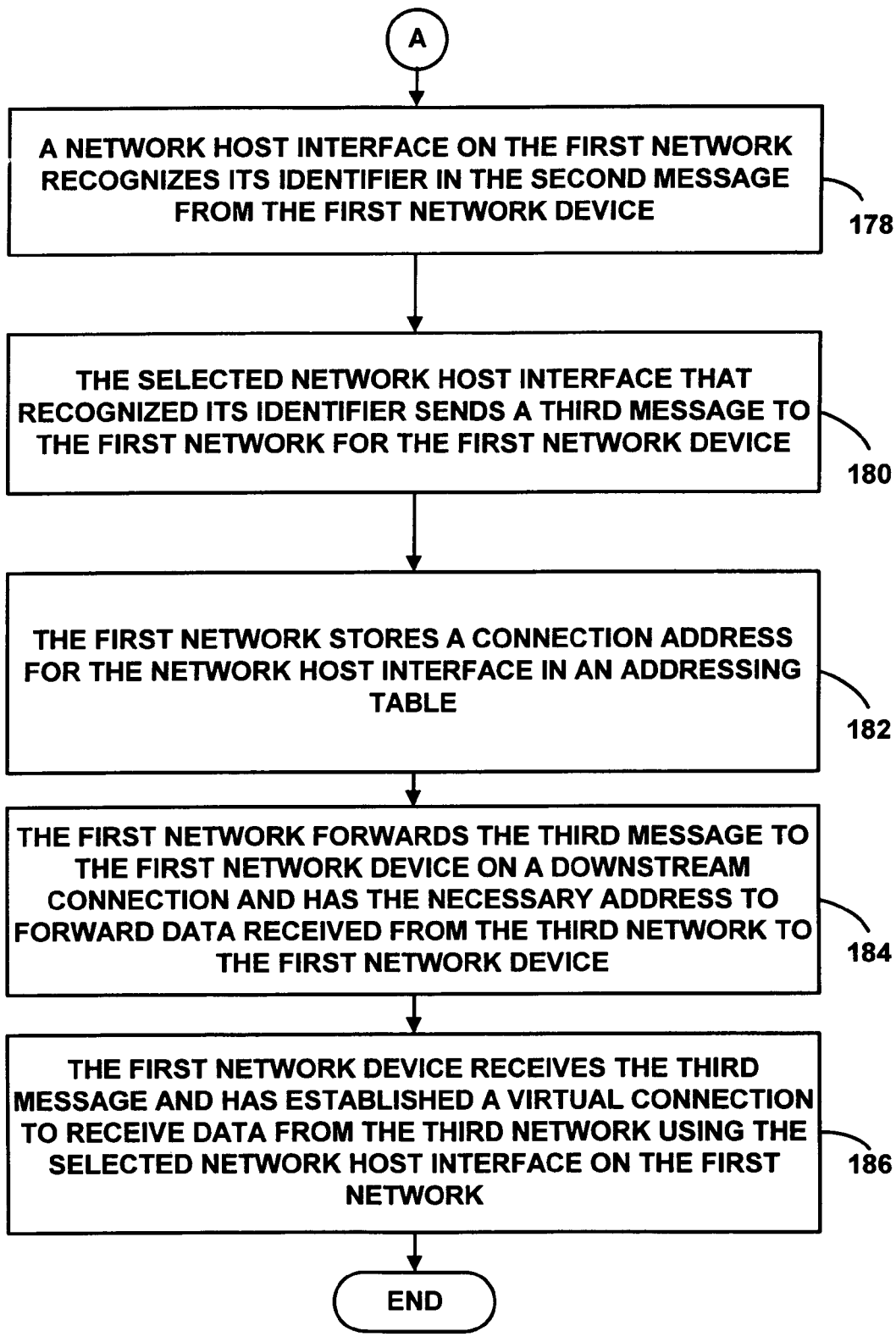

Since the CM 16 receives multiple the DHCPOFFER messages (Step 152 FIG. 7B) the CM 16 resolves and acknowledges one offer from a selected network host interface. FIGS. 10A and 10B are a flow diagram illustrating a Method 166 for resolving and acknowledging host addresses in a data-over-cable system. Method 166 includes a first network device that is connected to a first network with a downstream connection of a first connection type, and connected to a second network with an upstream connection of a second connection type. The first and second networks are connected to a third network with a third connection type. In one embodiment of the present invention, the first network device is the CM 16, the first network is cable network 14, the second network is the PSTN 22 and the third network is data network 28 (e.g., the Internet). The downstream connection is a cable television connection, the upstream connection is a telephony connection, and the third connection is an IP connection. However, the upstream connection and the data stream connection can both be cable television connections for use in a data-over-cable system without telephony return.

Turning to FIG. 10A, one or more first messages are received on the first network device from the first network on the downstream connection at Step 168. The one or more first messages are offers from one or more network host interfaces available on the first network to provide the first network device a connection to the third network. The first network device selects one of the network host interfaces using message fields in one of the one or more first messages at Step 170. The first network device creates a second message with a second message type to accept the offered services from a selected network host interface at Step 172.

The second message includes a connection address for the first network in a first message field and an identifier to identify the selected network host interface in a second message field.

The first network device sends the second message over the upstream connection to the second network at Step 174. The second network uses the first message field in the second message to forward the second message to the one or more network host interfaces available on first network at Step 176.

A network host interface available on the first network identified in second message field in the second message from the first network device recognizes an identifier for the network host interface at Step 178 in FIG. 10B. The selected network host interface sends a third message with a third message type to the first network at Step 180. The third message is an acknowledgment for the first network device that the selected network host interface received the second message from the first network device. The first network stores a connection address for the selected network interface in one or more tables on the first network at Step 182. The first network will forward data from the third network to the first network device when it is received on the selected network host interface using the connection address in the one or more routing tables. The first network forwards the third message to the first network device on the downstream connection at Step 184. The first network device receives the third message at Step 186. The first network and the first network device have the necessary addresses for a virtual connection that allows data to be sent from the third network to a network host interface on the first network, and from the first network over the downstream connection to the first network device. Method 166 accomplishes resolving network interface hosts addresses from a cable modem in a data-over-cable with or without telephony return.

Method 166 of the present invention is used in data-over-cable system 10 with telephony return. However, the present invention is not limited to data-over-cable system 10 with telephony return and can be used in data-over-cable system 10 without telephony return by using an upstream cable channel instead of an upstream telephony channel.

Figure 11A:
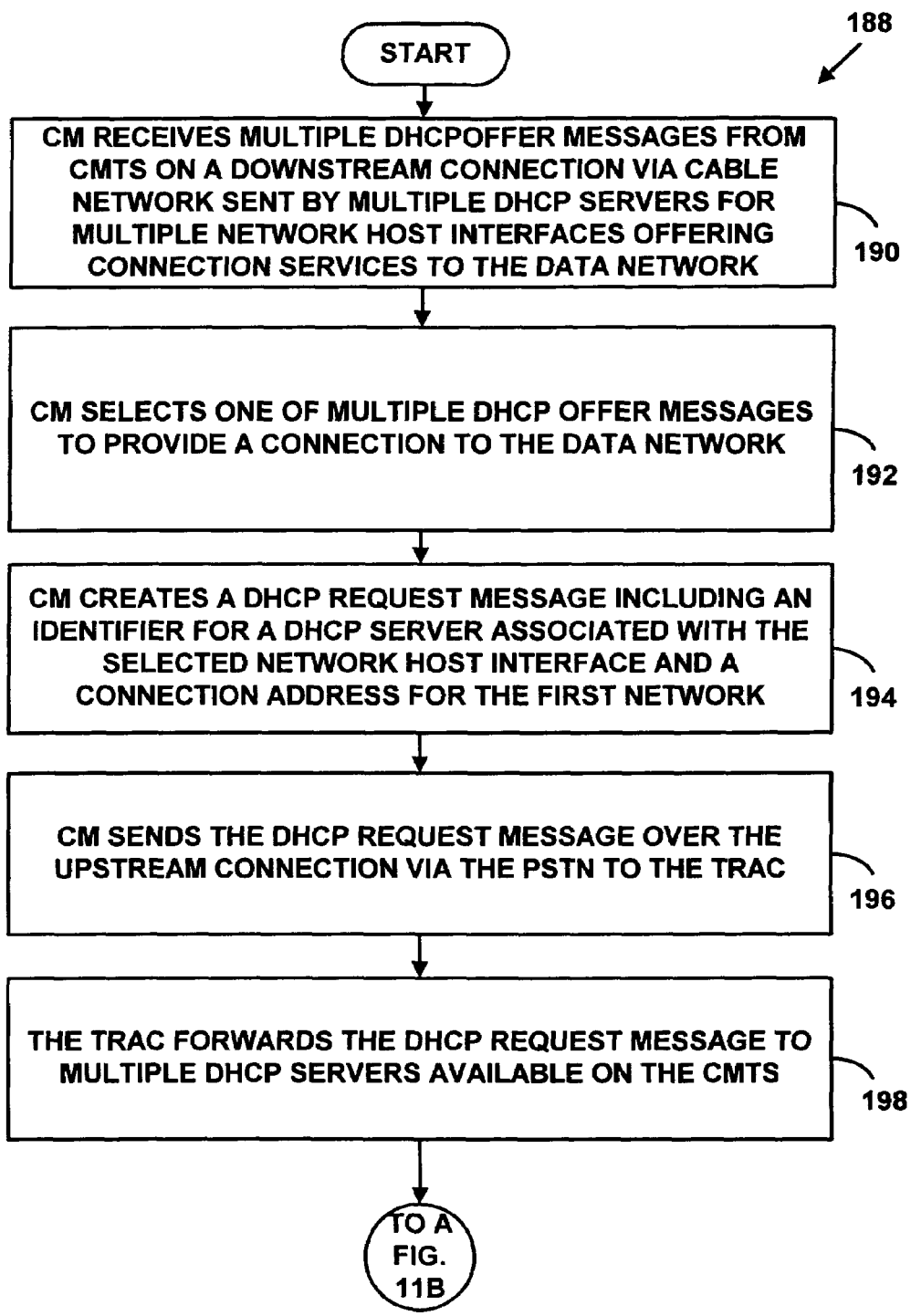
FIG. 11 is a flow diagram illustrating a method for resolving discovered host addresses.
Figure 11B:
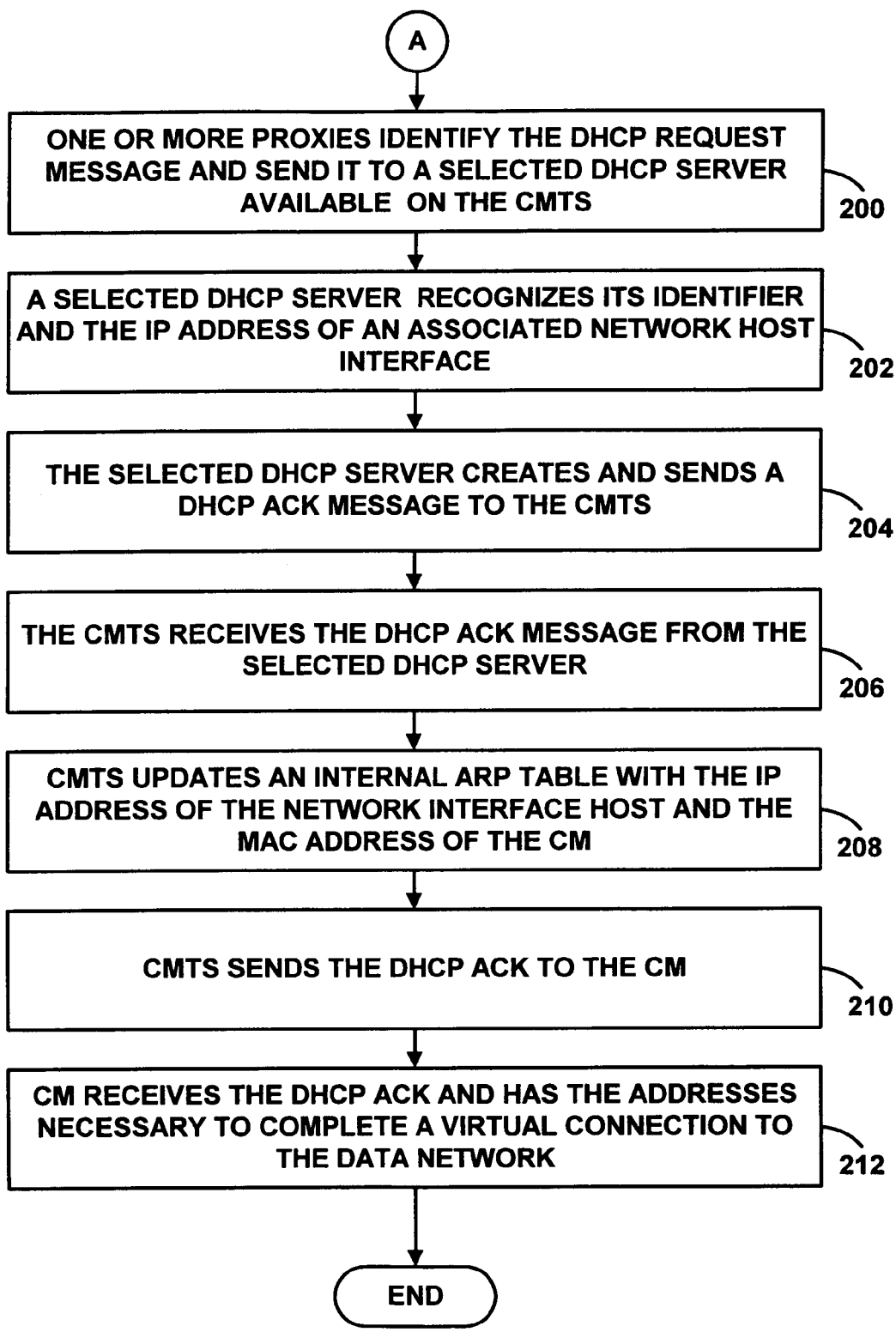

FIGS. 11A and 11B are a flow diagram illustrating a Method 188 for resolving discovered host addresses in data-over-cable system 10 with telephony return. At Step 190 in FIG. 11A, the CM 16 receives one or more DHCPOFFER messages from one or more of the DHCP 66 servers 160 associated with one or more network host interfaces 162 associated with the CMTS 12 (e.g., at Step 168 in Method 166). The one or more DHCPOFFER messages include the DHCP 66 fields set as illustrated in Table 7 above. However, other field settings could also be used. At Step 192, the CM 16 selects one of the DHCPOFFER messages (see also, Step 170 in Method 166). At Step 194, the CM 16 creates a DHCP 66 request message ("DHCPREQUEST") message to request the services offered by a network host interface 168 selected at Step 192. The fields of the DHCP request message are set as illustrated in Table 8. However, other field settings may also be used.

TABLE 8

| DHCP 66 Parameter | Description |
|---|---|
| OP 110 | Set to BOOTREQUEST. |
| HTYPE 112 | Set to network type (e.g., one for 10 Mbps Ethernet). |

TABLE 8-continued

| DHCP 66 Parameter | Description |
|---|---|
| HLEN 114 | Set to network length (e.g., six for 10 Mbps Ethernet) |
| HOPS 116 | Set to zero. |
| FLAGS 122 | Set BROADCAST bit to zero. |
| CIADDR 124 | If the CM 16 has previously been assigned an IP address, the IP address is placed in this field. If the CM 16 has previously been assigned an IP address by the DHCP 66, and also has been assigned an address via IPCP, the CM 16 places the DHCP 66 IP 54 address in this field. |
| YIADDR 126 | IP 54 address sent from the selected network interface host in DHCPOFFER message |
| GIADDR 130 | CM 16 places the Downstream Channel IP 54 address 80 the CMTS 12 obtained in TSI message 76 on a cable downstream channel in this field. |
| CHADDR 132 | CM 16 places its 48-bit MAC 44 LAN address in this field. |
| SNAME 134 | DHCP 66 server identifier for the selected network interface host |

The DHCPREQUEST message is used to "request" services from the selected IP 54 host interface 162 associated with the CMTS 12 using a DHCP 66 server 160 associated with the selected network host interface 162. The DHCP 66 giaddr-field 130 (FIG. 6) includes the downstream channel IP address 80 for the CMTS 12 obtained in TSI message 76 (e.g., the first message-field from Step 172 of Method 166). Putting the downstream channel IP address 80 obtained in TSI message 76 in a DHCPREQUEST message allows the DHCPREQUEST message to be forwarded by the TRAC 24 to the DHCP 66 servers 160 associated with network host interfaces 162 associated with the CMTS 12. The DHCP 66 giaddr-field 126 contains an identifier (e.g., second message field, Step 172 in Method 166) and the DHCP 66 sname-field 134 contains a DHCP 66 server identifier 160 associated with the selected network host interface.

If the DHCP 66 giaddr-field 130 in a DHCP 66 message from a DHCP 66 client is non-zero, a DHCP 66 server 160 sends any return messages to a DHCP 66 server port on a DHCP 66 relaying agent (e.g., the CMTS 12) whose address appears in DHCP 66 giaddr-field 130. If DHCP 66 giaddr-field 130 is zero, the DHCP 66 client is on the same subnet as the DHCP 66 server, and the DHCP 66 server sends any return messages to either the DHCP 66 client's network address, if that address was supplied in the DHCP 66 ciaddr-field 124, or to the client's hardware address specified in the DHCP 66 chaddr-field 132 or to the local subnet broadcast address.

Returning to FIG. 11A at Step 196, the CM 16 sends the DHCPREQUEST message on the upstream connection to TRAC 24 via the PSTN 22. At Step 198, a DHCP 66 layer on TRAC 24 broadcasts the DHCPREQUEST message on its local network leaving the DHCP 66 giaddr-field 130 intact since it already contains a non-zero value. The TRAC's 24 local network includes connections to one or more DHCP 66 proxies 158. The DHCP 66 proxies 158 accept DHCP 66 messages originally from the CM 16 destined for the DHCP 66 servers 160 associated with network host interfaces 168 associated with the CMTS 12. In another embodiment of the present invention, TRAC 24 provides the DHCP 66 proxy functionality, and no separate DHCP 66 proxies are used.

The one or more DHCP 66 proxies 158 on TRAC's 24 local network message forwards the DHCPOFFER to one or more of the DHCP 66 servers 160 associated with network host interfaces 162 (e.g., IP 54 interfaces) available on the CMTS 12 at Step 200 in FIG. 11B. Since DHCP 66 giaddr-field 130 in the DHCPDISCOVER message sent by the CM 16 is already non-zero (i.e., contains the downstream IP address of the CMTS 12), the DHCP 66 proxies leave 158 the DHCP 66 giaddr-field 130 intact.

One or more of the DHCP 66 servers 160 for the selected network host interfaces 162 (e.g., IP 54 interface) associated with the CMTS 12 receives the DHCPOFFER message at Step 202. A selected DHCP 66 server 160 recognizes a DHCP 66 server identifier in the DHCP 66 sname-field 134 or the IP 54 address that was sent in the DHCPOFFER message in the DHCP 66 yiaddr-field 126 from the DHCPREQUST message as being for the selected DHCP 66 server 160.

The selected DHCP 66 server 160 associated with network host interface 162 selected by the CM 16 in the DHCPREQUEST message creates and sends a DHCP 66 acknowledgment message ("DHCPACK") to the CMTS 12 at Step 204. The DHCPACK message is sent with the message fields set as illustrated in Table 9. However, other field settings can also be used. The DHCP 66 yiaddr-field again contains the IP 54 address for the selected network host interface available on the CMTS 12 for receiving data packets from data network 28.

TABLE 9

| DHCP 66 Parameter | Description |
| --- | --- |
| FLAGS 122 | Set a BROADCAST bit to zero. |
| YIADDR 126 | IP 54 address for the selected network host interface to allow the CM 16 to receive data from data network 28. |
| SIADDR 128 | An IP 54 address for a TFTP 64 server to download configuration information for an interface host. |
| CHADDR 132 | MAC 44 address of the CM 16. |
| SNAME 134 | DHCP 66 server identifier associated with the selected network host interface. |
| FILE 136 | A configuration file name for an network interface host. |

The selected DHCP 66 server 160 sends the DHCACK message to the address specified in the DHCP 66 giaddr-field 130 from the DHCPREQUEST message to the CM 16 to verify the selected network host interface (e.g., IP 54 interface) will offer the requested service (e.g., IP 54 service).

At Step 206, the CMTS 12 receives the DHCPACK message from the selected DHCP 66 server 160 associated with the selected network host interface 162 IP 54 address (e.g., IP 54 interface). The CMTS 12 examines the DHCP 66 yiaddr-field 126 and the DHCP 66 chaddr-field 132 in the DHCPACK message. The DHCP 66 yiaddr-field 126 contains an IP 54 address for a network host IP 54 interface available on the CMTS 12 and used for receiving IP 54 data packets from data network 28 for the CM 16. The DHCP 66 chaddr-field 132 contains the MAC 44 layer address for the CM 16 on a downstream cable channel from the CMTS 12 via cable network 14.

CMTS 12 updates an Address Resolution Protocol ("ARP") table and other routing tables on the CMTS 12 to reflect the addresses in the DHCP 66 yiaddr-field 126 and the DHCP 66 chaddr-field 132 at Step 208. As is known in the art, ARP allows a gateway such as the CMTS 12 to forward any datagrams from a data network such as data network 28 it receives for hosts such as the CM 16. For more information on ARP see, RFC-826, incorporated herein by reference.

CMTS 12 stores a pair of network address values in the ARP table, the IP 54 address of the selected network host interface from the DHCP 66 yiaddr-field 126 and a Network Point of Attachment ("NPA") address. In one preferred embodiment of the present invention, The NPA address is a MAC 44 layer address for the CM 16 via a downstream cable channel. The IP/NPA address pair are stored in local routing tables with the IP/NPA addresses of hosts (e.g., the CMs 16) that are attached to cable network 14.

At Step 210, the CMTS 12 sends the DHCPACK message to the CM 16 via the cable network 14. At Step 212, the CM 16 receives the DHCPACK message, and along with the CMTS 12 has addresses for a "virtual connection" between the data network 28 and the CM 16. When data packets arrive on the IP 54 address for the selected CM 16 they are sent to the CMTS 12 and the CMTS 12 forwards them using a NPA (i.e., a MAC 44 address) from the routing tables on a downstream channel via the cable network 14 to the CM 16.

If a BROADCAST bit in the DHCP 66 flags-field 124 is set to one in the DHCPACK, the CMTS 12 sends the DHCPACK messages to a broadcast IP 54 address (e.g., 255.255.255.255). The DHCP 66 chaddr-field 132 is still used to determine a MAC 44 layer address. If the BROADCAST bit in the DHCP 66 flags field 122 is set, the CMTS 12 does not update the ARP table or other routing tables based upon the DHCP 66 yiaddr-field 126 and the DHCP 66 chaddr-field 132 pair when a broadcast message is sent.

FIG. 12 is a block diagram illustrating the message flow 214 of the Method 188 illustrated in FIGS. 11A and 11B. Message flow 214 includes the DHCP proxies 158 and the DHCP servers 160 illustrated in FIG. 8. Method Steps 194, 196, 198, 204, 208, 210 and 212 of Method 188 (FIGS. 1A and 11B) are illustrated in FIG. 12. In one embodiment of the present invention, the DHCP proxies 158 are not separate entities, but are included in TRAC 24. In such an embodiment, the DHCP proxy services are provided directly by TRAC 24.

After Method 188, the CMTS 12 has a valid IP/MAC address pair in one or more address routing tables including an ARP table to forward IP 54 data packets from data network 28 to the CM 16, thereby creating a virtual IP 54 data path to/from the CM 16 as was illustrated in Method 92 (FIG. 5) and Table 3. The CM 16 has necessary parameters to proceed to the next phase of initialization, a downloading of a configuration file via TFTP 64. Once the CM 16 has received the configuration file and has been initialized, it registers with the CMTS 12 with w registration message and is ready to receive data from data network 14.

In the event that the CM 16 is not compatible with the configuration of the network host interface 162 received in the DHCPACK message, the CM 16 may generate a DHCP 66 decline message ("DHCPDECLINE") and transmit it to TRAC 24 via the PSTN 22. A DHCP 66 layer in TRAC 24 forwards the DHCPDECLINE message to the DHCP servers 160 and the CMTS 12. Upon seeing a DHCPDECLINE message, the CMTS 12 flushes its ARP tables and routing tables to remove the now invalid IP/MAC pairing. The CM 16 may also send the DHCPDECLINE message to the CMTS 12 on an upstream cable channel. The CMTS 12 will then forward the DHCPDECLINE message to the appropriate DHCP 66 server 160. If an IP 54 address for a network host interface is returned in a DHCPACK that is different from the IP 54 address sent by the CM 16 in the DCHCPREQUEST message, the CM 16 uses the IP 54 address it receives in the DHCPACK message as the IP 54 address of the selected network host interface for receiving data from data network 28.

One preferred embodiment of the present invention is described with respect to, but is not limited to a data-over-cable-system with telephony return. Method 188 can also be used with a cable modem that has a two-way connection (i.e., upstream and downstream) to the cable network 14 and the CMTS 12. In a data-over-cable-system without telephony return, the CM 16 would broadcast the DHCPREQUEST message to one or more DHCP 66 servers 160 associated with one or more network host interfaces 162 associated with the CMTS 12 using an upstream cable connection on the data network 14 including the IP 54 address of the CMTS 12 in the DHCP 66 giaddr-field 130. Method 188 accomplishes resolving addresses for network interface hosts from a cable modem in a data-over-cable with or without telephony return, and without extensions to the existing DHCP protocol.

CPE Initialization in a Data-Over-Cable System

Figure 13A:
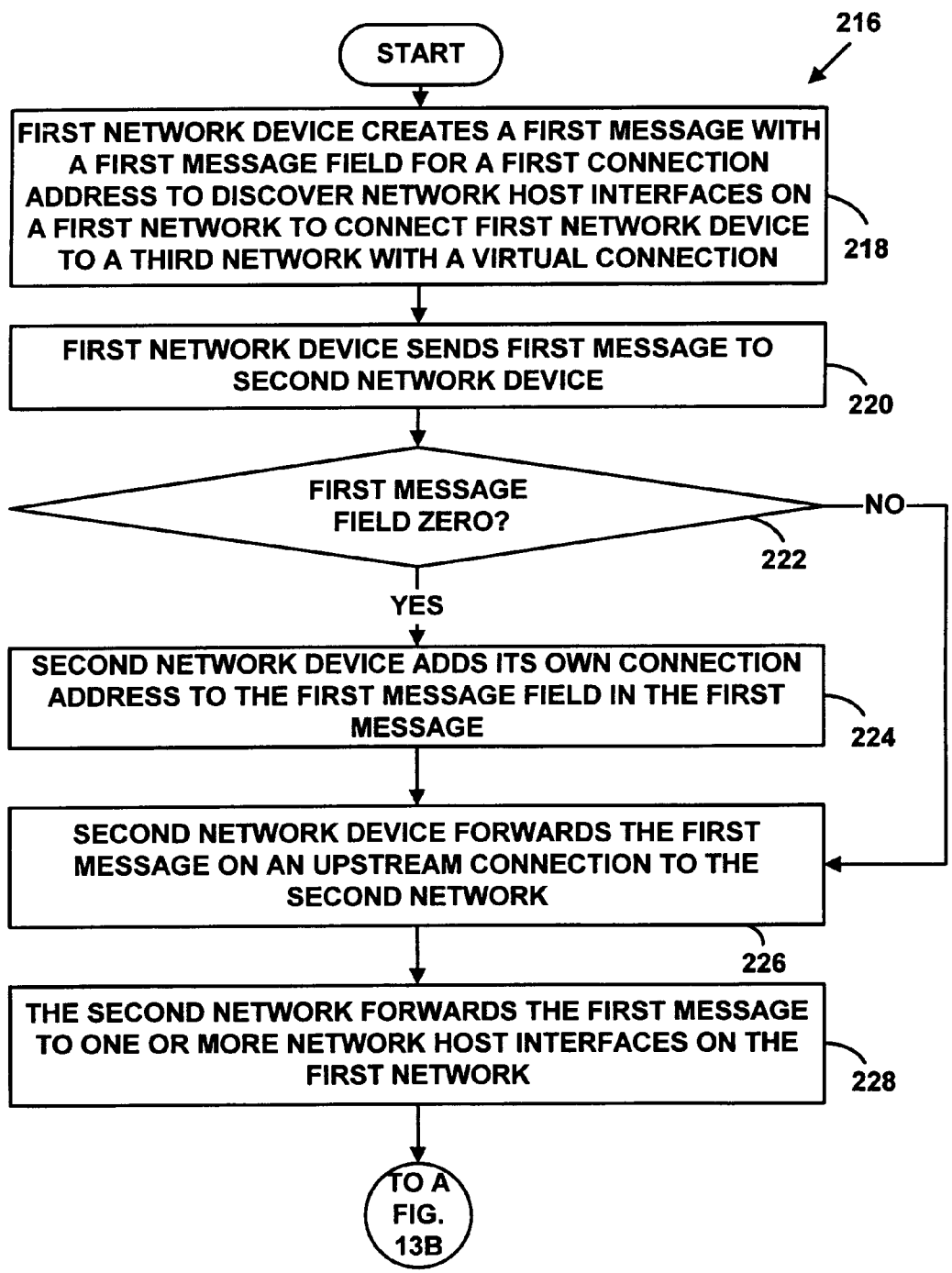
FIGS. 13A and 13B are a flow diagram illustrating a method for obtaining addresses for customer premise equipment.
Figure 13B:
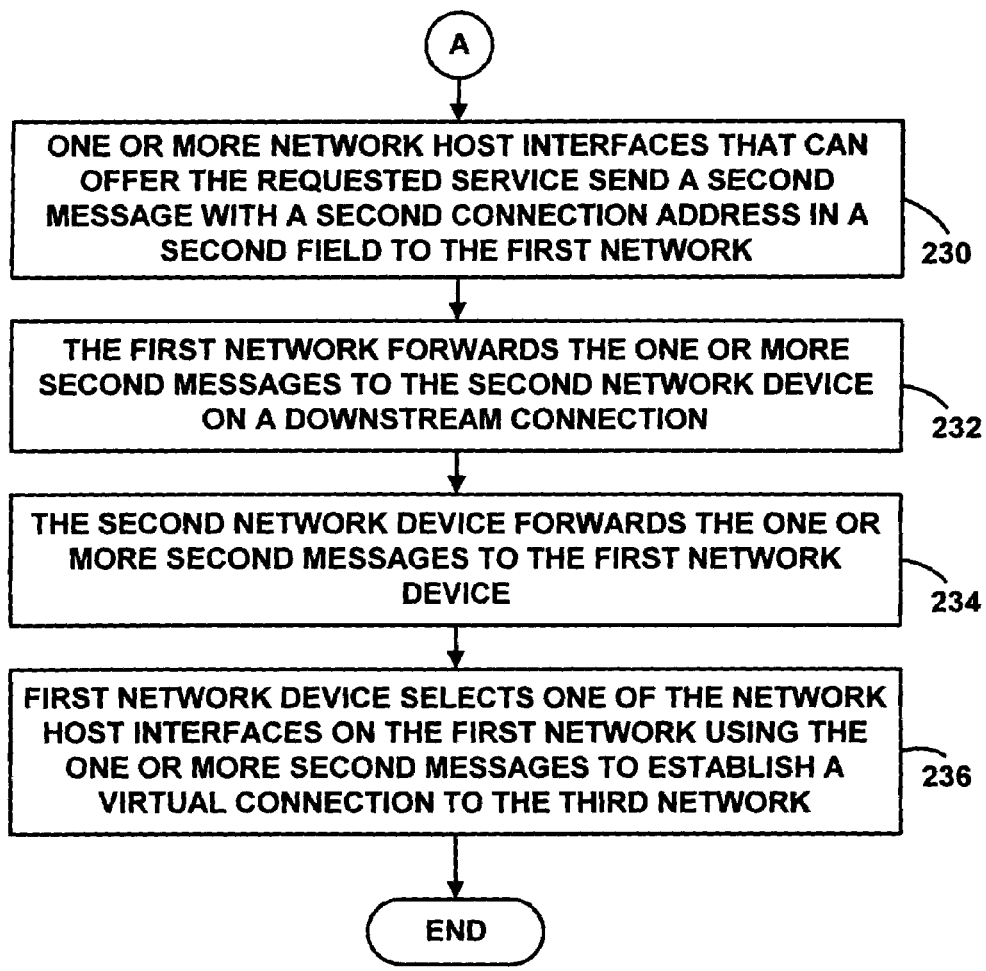

The CPE 18 also uses the DHCP 66 to generate requests to obtain IP 54 addresses to allow CPE 18 to also receive data from data network 28 via the CM 16. In a preferred embodiment of the present invention, the CM 16 functions as a standard BOOTP relay agent/DHCP Proxy 158 to facilitate CPE's 18 access to the DHCP 66 server 160. FIGS. 13A and 13B are a flow diagram illustrating a Method 216 for obtaining addresses for customer premise equipment such as the CPE 18. The CM 16 and the CMTS 12 use information from Method 214 to construct IP 54 routing and ARP table entries for network host interfaces 162 providing data to the CMCI 20 and to CPE 18.

Method 216 in FIGS. 13A and 13B includes a data-over-cable system with telephony return. A first network device with a second network device is used for connecting the first network device to a first network with a downstream connection of a first connection type, and for connecting to a second network with an upstream connection of a second connection type. The first and second networks are connected to a third network with a third connection type.

In one embodiment of the present invention, data-over-cable system with telephony return is data-over-cable system 10 with the first network device is the CPE 18 and the second network device is the CM 16. The first network is the cable television network 14, the downstream connection is a cable television connection, the second network is the PSTN 22, the upstream connection is a telephony connection, the third network is data network 28 (e.g., the Internet or an intranet) and the third type of connection is an IP 54 connection. However, the present invention is not limited to the network components described and other network components may also be used. A data-over-cable system without telephony return can also be used (e.g., a system with a two-way cable channel. Method 216 allows CPE 18 to determine an IP 54 network host interface address available on the CMTS 12 to receive IP 54 data packets from the data network 54, thereby establishing a virtual IP 54 connection with data network 28 via the CM 16.

Returning to FIG. 13A at Step 218, a first message of a first type (e.g., a DHCP 66 discover message) with a first message field for a first connection is created on the first network device. The first message is used to discover a network host interface address on the first network to allow a virtual connection to the third network.

At Step 220, the first network device sends the first message to the second network device. The second network device checks the first message field at Step 222. If the first message field is zero, the second network device puts its own network connection address into the first message field at Step 224. The second network device connection address allows the messages from network host interfaces on the first network to return messages to the second network device attached to the first network device. If the first message field is non-zero, the second network device does not alter the first message field since there could be a relay agent attached to the first network device that may set the first connection address field.

At Step 226, the second network device forwards the first message to a connection address over the upstream connection to the second network. In one embodiment of the present invention, the connection address is an IP broadcast address (e.g., 255.255.255.255). However, other connection addresses can also be used.

The second network uses the first connection address in the first message field in the first message to forward the first message to one or more network host interfaces (e.g., IP 54 network host interfaces 162) available on first network at Step 228. One or more network host interfaces available on the first network that can provide the services requested in first message send a second message with a second message type with a second connection address in a second message field to the first network at Step 230 in FIG. 13B. The second connection address allows the first network device to receive data packets from the third network via a network host interface on the first network. The first network forwards the one or more second messages on the downstream connection to the second network device at Step 232. The second network device forwards the one or more second messages to the first network device at Step 234. The first network device selects one of the one or more network host interfaces on the first network using the one or more second messages at Step 236. This allows a virtual connection to be established between the third network and the first network device via the selected network host interface on the first network and the second network device.

Figure 14A:
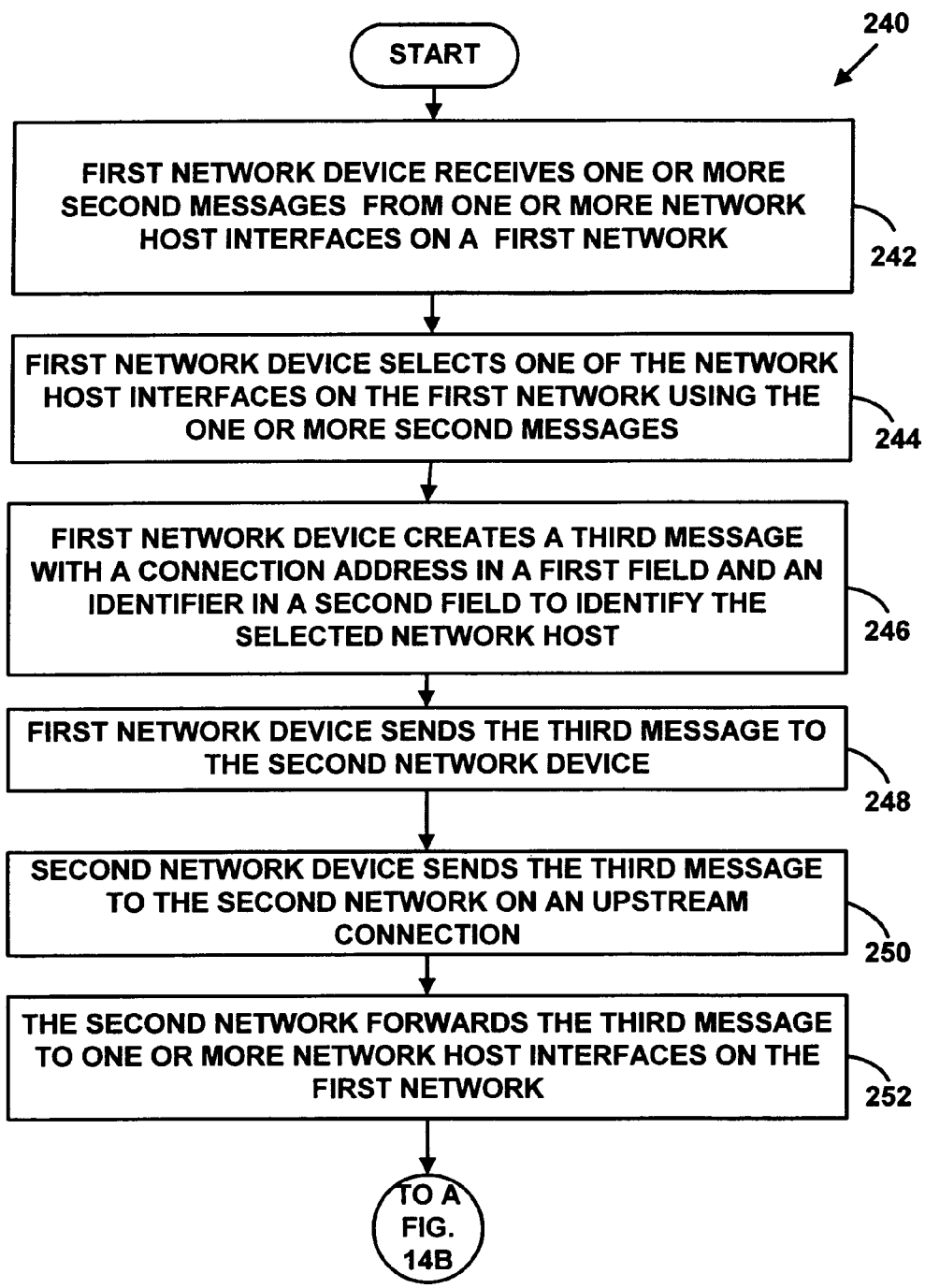
FIGS. 14A and 14B are a flow diagram illustrating a method for resolving addresses for customer premise equipment.
Figure 14B:
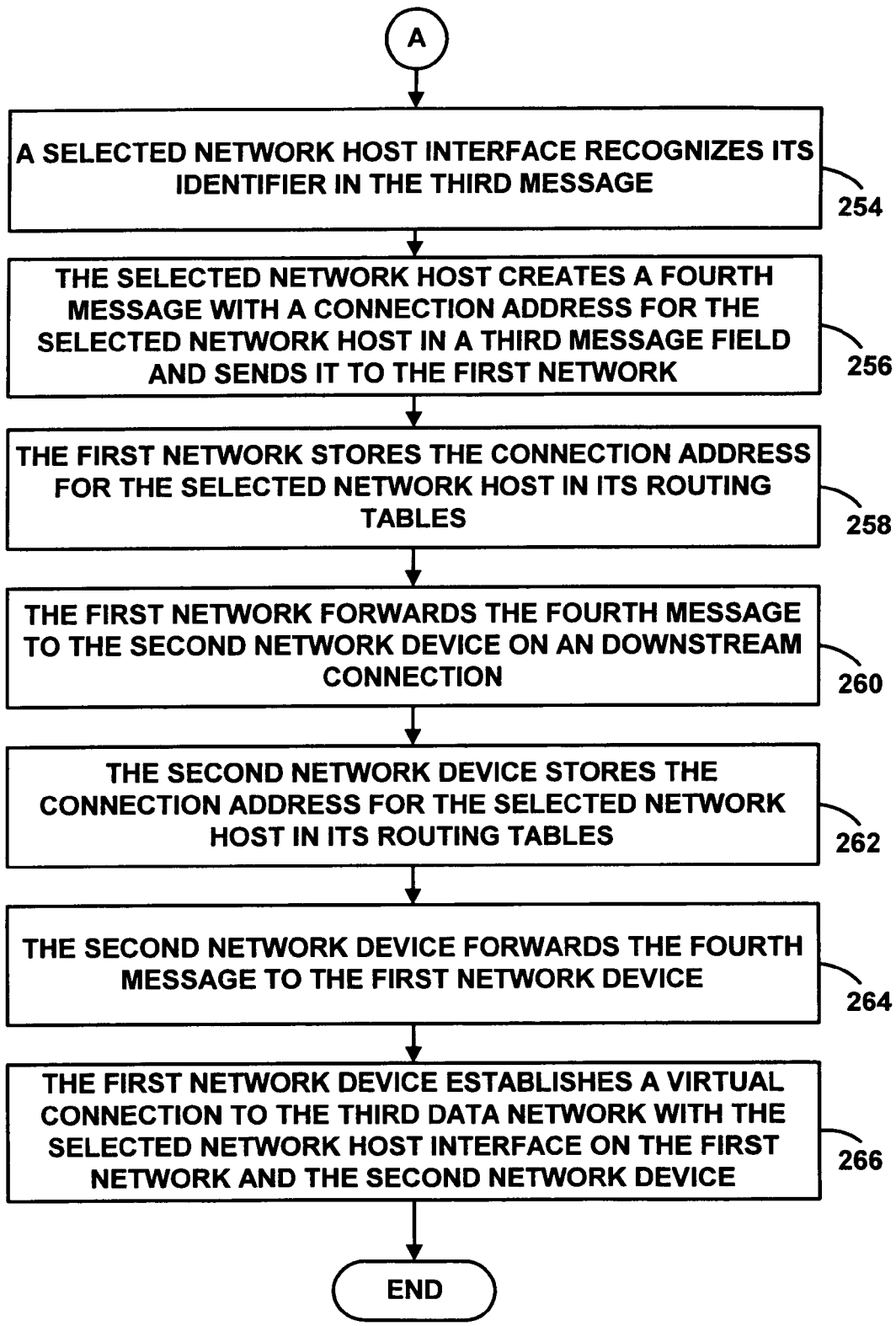

FIGS. 14A and 14B are a flow diagram illustrating a Method 240 for resolving addresses for the network host interface selected by a first network device to create a virtual connection to the third network. Turning to FIG. 14A, at Step 240 one or more second messages are received with a second message type on the first network device from the second network device from the first network on a downstream connection at Step 242. The one or more second messages are offers from one or more protocol servers associated with one or more network host interfaces available on the first network to provide the first network device a connection to the third network. The first network device selects one of the network host interfaces using one of the one or more second messages at Step 244. The first network device creates a third message with a third message type to accept the offered services from the selected network host interface at Step 246. The third message includes a connection address for the first network in a first message field and an identifier to identify the selected network host interface in a second message field. At Step 248, first network device equipment sends the third message to the second network device.

The second network device sends the third message over the upstream connection to the second network at Step 250.

The second network uses the first message field in the third message to forward the third message to the one or more network host interfaces available on first network at Step 252.

A network host interface available on the first network identified in second message field in the third message from the first network device recognizes an identifier for the selected network host interface at Step 254 in FIG. 14B. The selected network host interface sends a fourth message with a fourth message type to the first network at Step 256. The fourth message is an acknowledgment for the first network device that the selected network host interface received the third message. The fourth message includes a second connection address in a third message field. The second connection address is a connection address for the selected network host interface. The first network stores the connection address for the selected network interface from the third message in one or more routing tables (e.g., an ARP table) on the first network at Step 258. The first network will forward data from the third network to the first network device via the second network device when it is received on the selected network host interface using the connection address from the third message field. The first network forwards the fourth message to the second network device on the downstream connection at Step 260. The second network device receives the fourth message and stores the connection address from the third message field for the selected network interface in one or more routing tables on the second network device at Step 262. The connection address for the selected network interface allows the second network device to forward data from the third network sent by the selected network interface to the customer premise equipment. At Step 264, the second network device forward the fourth message to the first network device. At Step 266, the first network device establishes a virtual connection between the third network and the first network device.

After Step 266, the first network, the second network device and the first network device have the necessary connection addresses for a virtual connection that allows data to be sent from the third network to a network host interface on the first network, and from the first network over the downstream connection to the second network and then to the first network device. In one embodiment of the present invention, Method 240 accomplishes resolving network interface hosts addresses from customer premise equipment with a cable modem in a data-over-cable with telephony return without extensions to the existing DHCP protocol.

Methods 216 and 240 of the present invention are used in data-over-cable system 10 with telephony return with the CM 16 and CPE 18. However, the present invention is not limited to data-over-cable system 10 with telephony return and can be used in data-over-cable system 10 without telephony return by using an upstream cable channel instead of an upstream telephony channel.

Figure 15A:
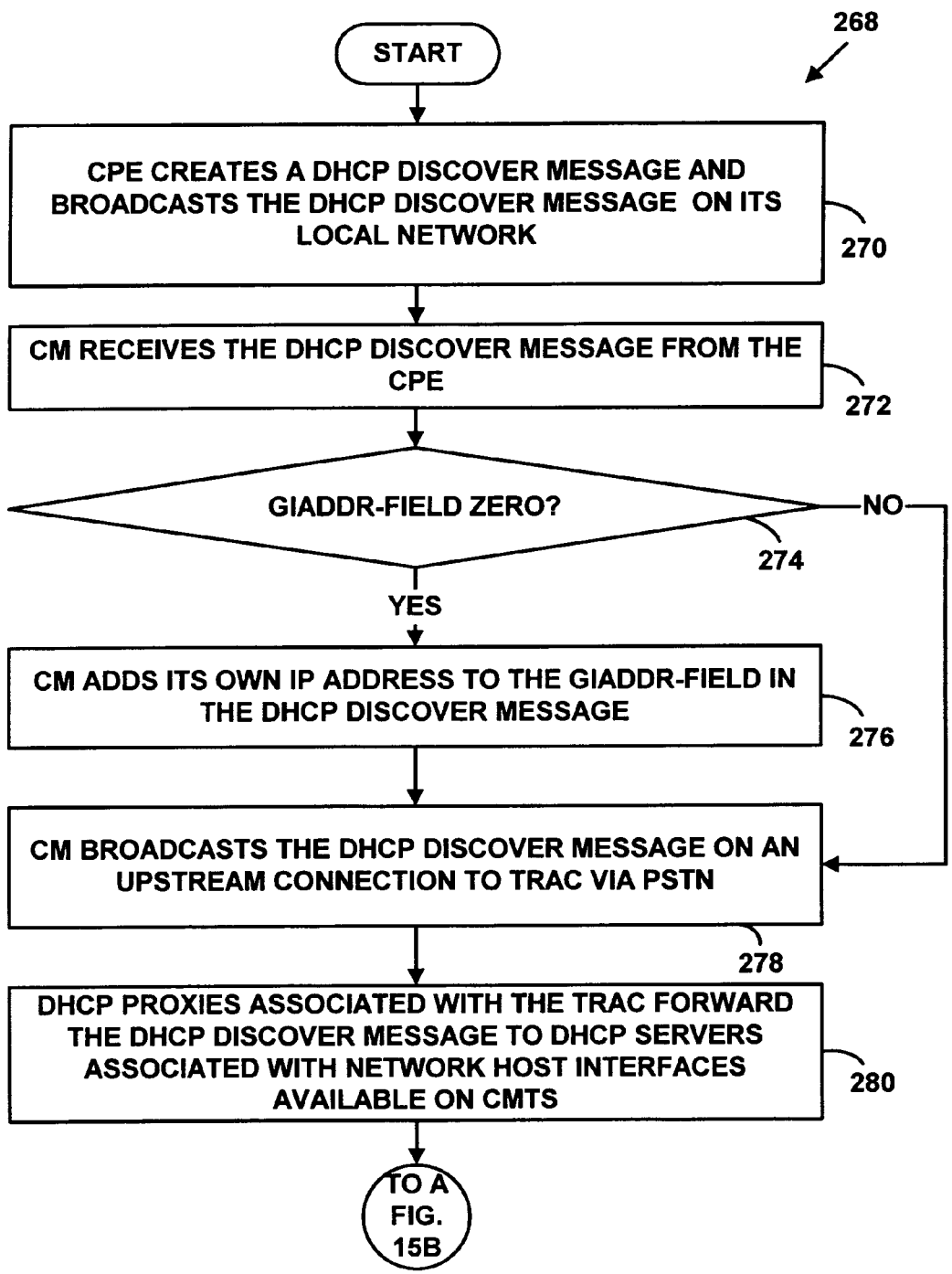
FIGS. 15A and 15B are a flow diagram illustrating a method for addressing network host interfaces from customer premise equipment.
Figure 15B:
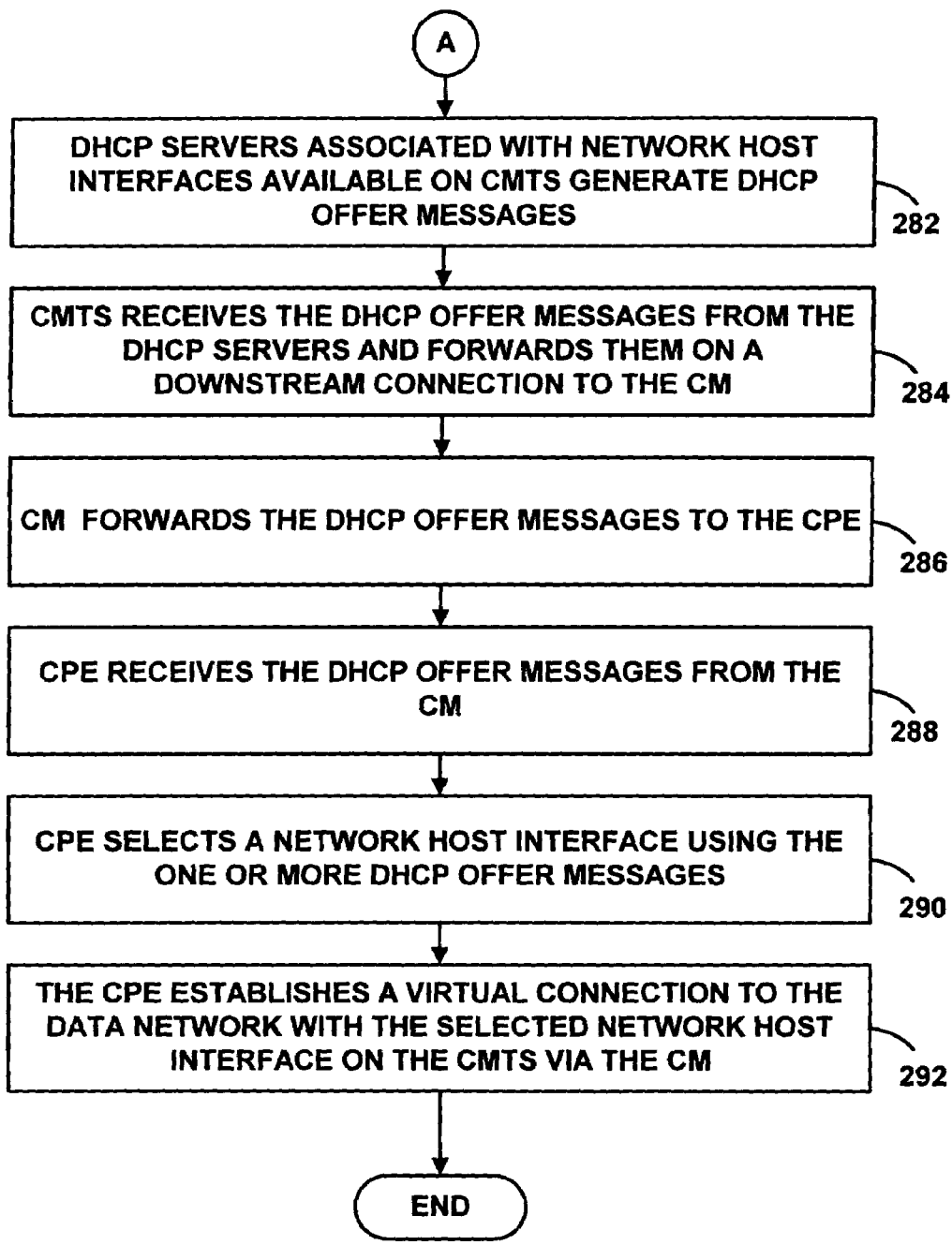

FIGS. 15A and 15B are a flow diagram illustrating a Method 268 for addressing network host interfaces 162 from CPE 18. At Step 270 in FIG. 15A, the CPE 18 generates a DHCPDISCOVER message broadcasts the DHCPDISCOVER message on its local network with the fields set as illustrated in Table 6 above with addresses for CPE 18 instead of the CM 16. However, more or fewer field could also be set in the DHCPDISCOVER message. The CM 16 receives the DHCPDISCOVER as a standard BOOTP relay agent at Step 272. The DHCPDISCOVER message has a MAC 44 layer address for the CPE 18 in the DHCP 66 chaddr-field 132, which the CM 16 stores in one or more routing tables. As a BOOTP relay agent, the CM 16 checks the DHCP 66 giaddr-field 130 (FIG. 6) at Step 274. If the DHCP 66-giaddr-field 130 is set to zero, the CM 16 put its own IP 54 address into the DHCP 66 giaddr-field 130 at Step 276, including the CM 16 is a relay agent.

If the DHCP 66 giaddr-field 130 is non-zero, the CM 16 does not alter the DHCP 66 giaddr-field 130 since there could be another BOOTP relay agent attached to CPE 18 which may have already set the DHCP 66 giaddr-field 130. Any BOOTP relay agent attached to CPE 18 would have also have acquired its IP 54 address using a DHCP 66 discovery process similar to the one described above (e.g., FIG. 12).

Returning to FIG. 15A, at Step 278, the CM 16 broadcasts the DHCPDISCOVER message to a broadcast address via the PSTN 22 to the TRAC 24. In one embodiment of the present invention, the broadcast address is an IP 54 broadcast address (e.g., 255.255.255.255). At Step 280, one or more DHCP 66 proxies 158 associated with TRAC 24, recognize the DHCPDISOVER message, and forward it to one or more DHCP 66 servers 160 associated with one or more network host interfaces 162 associated with the CMTS 12. Since the DHCP 66-giaddr-field 130 is already non-zero, the DHCP proxies 160 leave the DHCP 66 giaddr-field 130 intact. In another embodiment of the present invention, TRAC 24 includes DHCP 66 proxy 158 functionality and no separate DHCP 66 proxies 158 are used. In yet another embodiment of the present invention, the CM 16 broadcasts the DHCPDISCOVER message to the CMTS 12 on an upstream cable channel. The CMTS 12 forwards the DHCPDISCOVER message to one or more DHCP servers 160.

At Step 282 in FIG. 15B, the one or more DHCP servers 160 receive the DHCPDISCOVER message from one or more DHCP proxies 158 and generate one or more DHCPOFFER messages to offer connection services for one or more network host interfaces 162 associated with the CMTS 12 with fields set as illustrated in Table 7. The one or more DHCP 66 servers 160 send the one or more DHCPOFFER messages to the address specified in the DHCP 66 giaddr-field 130 (e.g., the CM 16 or a BOOTP relay agent associated with CPE 18), which is an IP 54 address already contained in an ARP or other routing table in the CMTS 12. Since the CMTS 12 also functions as a relay agent for the one or more DHCP servers 160, the one or more DHCPOFFER messages are received on the CMTS 12 at Step 284.

The CMTS 12 examines the DHCP 66 yiaddr-field 126 and the DHCP 66 giaddr-field 130 in the DHCPOFFER messages, and sends the DHCPOFFER messages down cable network 14 to IP 54 address specified in the DHCP 66 giaddr-field 130. The MAC 44 address for the CM 16 is obtained through a look-up of the hardware address associated with the DHCP 66 chaddr-field 130 (e.g., using ARP). If the BROADCAST bit in the DHCP 66 flags-field 122 is set to one, the CMTS 12 sends the DHCPOFFER message to a broadcast IP 54 address (e.g., 255.255.255.255), instead of the address specified in the DHCP 66 yiaddr-field 126. The CMTS 12 does not update its ARP or other routing tables based upon the broadcast DHCP 66 yiaddr-field 126 DHCP 66 chaddr-field 132 address pair.

Returning to FIG. 15B, the CM 16 receives the one or more DHCPOFFER messages and forwards them to CPE 18 at Step 286. The CM 16 uses the MAC 44 address specified by the DHCP 66 chaddr-field 132 look-up in its routing tables (e.g., ARP table) to find the address of CPE 18 even if the BROADCAST bit in the DHCP 66 flags-field 122 is set. At Step 290, the CPE 18 receives the one or more DHCPOFFER messages from the CM 16. At Step 292, CPE the 18 selects one of the DHCPOFFER messages to allow a virtual connection to be established between the data network 28 and the CPE 18. Method 266 accomplishes addressing network interface hosts from CPE 18 in data-over-cable system 10 without extensions to the existing DHCP 66 protocol.

FIGS. 16A and 16B are a flow diagram illustrating a Method 294 for resolving network host interfaces from the CPE 18. At Step 296, the CPE 18 receives the one or more DHCPOFFER messages from the one or more DHCP 66 servers 160 associated with the one or more network host interfaces associated with the CMTS 12. At Step 298, the CPE 18 chooses one offer of services from a selected network host interface 162. At Step 300, the CPE 18 generates a DHCPREQUEST message with fields set as illustrated in Table 8 above with addresses for CPE 18 instead of the CM 16. However, more or fewer fields could also be set. At Step 302, CPE 18 sends the DHCPREQUEST message to the CM 16. At Step 304, the CM 16 forwards the message to TRAC 24 via the PSTN 22 (or to the CMTS 12 via an upstream cable channel if a two-way cable system is being used).

At Step 306, a DHCP proxies 158 associated with the TRAC 24 broadcasts the DHCPREQUEST message on its local network leaving the DHCP 66 giaddr-field 130 intact since it already contains a non-zero value. The TRAC's 24 local network includes connections to one or more DHCP 66 proxies 158. The DHCP 66 proxies 158 accept the DHCP 66 messages originally from the CPE 18 destined for the DHCP 66 servers 160 associated with network host interfaces 162 associated with the CMTS 12. In another embodiment of the present invention, TRAC 24 provides the DHCP 66 proxy functionality, and no separate DHCP 66 proxies 158 are used.

One or more DHCP 66 proxies 158 on TRAC's 24 local network recognize the DHCPOFFER message and forward it to one or more of the DHCP 66 servers 160 associated with network host interfaces 162 (e.g., IP 54 interfaces) associated with the on the CMTS 12 at Step 308 in FIG. 16B. Since the DHCP 66 giaddr-field 130 in the DHCPDISCOVER message sent by the CPE 18 is already non-zero, (i.e., set by the CM 16) the DHCP 66 proxies leave the DHCP 66 giaddr-field 130 intact.

One or more DHCP 66 servers 160 for the selected network host interfaces 162 (e.g., IP 54 interface) associated with the CMTS 12 receive the DHCPOFFER message at Step 310. A selected the DHCP 66 server 160 recognizes a DHCP 66 server identifier in the DHCP 66 sname-field 134 or the IP 54 address that was sent in the DHCPOFFER message in the DHCP 66 yiaddr-field 126 from the DHCPREQUST message for the selected the DHCP 66 server 160.

The selected DHCP 66 server 160 associated with network host interface 162 selected by the CPE 18 in the DHCPREQUEST message creates and sends a DHCP 66 acknowledgment message ("DHCPACK") to the CMTS 12 at Step 312 using the DHCP 66 giaddr-field 130. The DHCPACK message is sent with the message fields set as illustrated in Table 9. However, other field settings can also be used. The DHCP 66 yiaddr-field contains the IP 54 address for the selected network host interface 162 available on the CMTS 12 for receiving data packets from data network 28 for CPE 18.

At Step 314, the CMTS 12 receives the DHCPACK message. the CMTS 12 examines the DHCP 66 giaddr-field 130 and looks up that IP 54 address in its ARP table or other routing tables for an associated MAC 44 address. This is a MAC 44 address for the CM 16, which sent the DHCPREQUEST message from CPE 18. The CMTS 12 uses the MAC 44 address associated with the DHCP 66 giaddr-field 130 and the DHCP 66 yiaddr-field 126 to update its routing and ARP tables reflecting this address pairing at Step 316. At Step 318, the CMTS 12 sends the DHCPACK message on a downstream channel on cable network 14 to the IP 54 and MAC 44 addresses, respectively (i.e., to the CM 16). If the BROADCAST bit in the DHCP 66 flags-field 122 is set to one, the CMTS 12 sends the DHCPACK message to a broadcast IP 54 address (e.g., 255.255.255.255), instead of the address specified in the DHCP 66 yiaddr-field 126. the CMTS 12 uses the MAC 44 address associated with the DHCP 66 chaddr-field 130 even if the BROADCAST bit is set.

The CM 16 receives the DHCPACK message. The CM 16 examines the DHCP 66 yiaddr-field 126 and DHCP 66 chaddr-field 132, and updates its routing table and ARP tables to reflect the address pairing at Step 320. At Step 322, the CM 16 sends the DHCPACK message to CPE 18 via the CMCI 20 at the IP 54 and the MAC 44 addresses respectively from its routing tables. If the BROADCAST bit in the DHCP 66 flags-field 122 is set to one, the CM 16 sends the downstream packet to a broadcast IP 54 address (e.g., 255.255.255.255), instead of the address specified in the DHCP 66 yiaddr-field 126. The CM 16 uses the MAC 44 address specified in the DHCP 66 chaddr-field 132 even if the BROADCAST bit is set to locate the CPE 18. At Step 324, CPE 18 receives the DHCPACK from the CM 16 and has established a virtual connection to data network 28. In the event that the CPE 18 is not compatible with the configuration received in the DHCPACK message, the CPE 18 may also generate a DHCP 66 decline ("DHCPDECLINE") message and send it to the CM 16. The CM 16 will transmit the DHCPDECLINE message up the PPP 50 link via the PSTN 22 to TRAC 24 or the CMTS 12 via an upstream cable channel. On seeing a DHCPDECLINE message the TRAC 24 sends a unicast copy of the message to the CMTS 12. the CM 16 and the CMTS 12 examine the DHCP 66 yiaddr-field 126 and the DHCP 66 giaddr-field 130, and update their routing and ARP tables had routing tables to flush any invalid pairings.

Upon completion of Methods 266 and 292, the CM 16 and the CMTS 12 have valid IP/MAC address pairings in their routing and ARP tables. These tables store the same set of IP 54 addresses, but does not associate them with the same MAC 44 addresses. This is because the CMTS 12 resolves all the CPE 18 IP 54 addresses to a MAC 44 address of a corresponding the CM 16. The CMs 16, on other hand, is able to address the respective MAC 44 addresses of their own CPEs 18. This also allows the DHCP 66 clients associated with the CPE 18 to function normally since the addressing that is done in the CM 16 CM 16 and the CMTS 12 is transparent to CPE 18 hosts.

FIG. 17 is a block diagram illustrating a message flow 326 for Methods 268 and 294 in FIGS. 15A, 15B, and 16A and 16B. Message flow 326 illustrates a message flow for Methods 268 and 294, for a data-over-cable system with and without telephony return. In another embodiment of the present invention, the CM 16 forwards requests from CPE 18 via an upstream connection on cable network 14 to the DHCP servers 160 associated with one or more network host interfaces 162 associated with the DHCP proxies 158 are not used on the CMTS 12. In such an embodiment, the TRAK 24 and the DHCP proxies 158 are not used.

Method 268 and 294 accomplishes resolving addresses for network interface hosts from customer premise equipment in a data-over-cable with or without telephony return without extensions to the existing DHCP protocol. Methods 268 and 294 of the present invention are illustrated in data-over-cable system 10 with telephony return. However, the present invention is not limited to data-over-cable system 10 with telephony return and can be used in data-over-cable system 10 without telephony return by using an upstream cable channel instead of an upstream telephony channel.

Completing Initialization of a Cable Modem or CPE

After obtaining an IP 54 address via DHCP 66, the CM 16 receives a configuration file from a configuration file server. Information about the configuration file is included in the DHCPACK message (e.g., Table 9). For example, in one preferred embodiment of the present invention, a network address (e.g., an IP 54 address) for the server is included in a DHCP 66 siaddr-field 128 (FIG. 6), and a name of the configuration file in a DHCP 66 file-field 136. The configuration file includes multiple configuration parameters used to initialize the CM 16. The TFTP 64 server obtains the requested configuration file and sends it to the CM 16. In one embodiment of the present invention, the configuration file is obtained by the TFTP 64 server from the DHCP server 160. In another embodiment of the present invention, the configuration file is obtained by the TFTP 64 server from the CMTS 12.

Configuration information from an exemplary configuration file is illustrated in Type/Length/Value ("TLV") format in Table 10. However, more or fewer configuration parameters could also be used. In addition, only an exemplary description of the Value in the TLV format is included since the actual numbers used for the Value fields are implementation specific.

TABLE 10

| Type | Length | Value | Notes |
|---|---|---|---|
| 4x | 6 | Variable | Header Length |
| 41 | 1 | 1 | Class-Of-Service-1 |
| 42 | 4 | 1,500,000 | Maximum downstream data rate of 1.5 Mbps |
| 43 | 4 | 256,000 | Maximum upstream data rate of 256 Kbps |
| 44 | 1 | 5 | Priority is level 5. |
| 45 | 4 | 8,000 | Minimum upstream data rate of 8 Kbps |
| 47 | 1 | 1 | Privacy enabled |
| 171 | 4 | 1 | Authorize timeouts |
| 3 | 1 | 1 | Enable network access |
| 8x | 8 | Variable | Vendor ID |
| 83 | N | Variable | N-bytes of vendor specific data in TLV format |
| 0 | N | N-byte padding | Padding to make message 4-byte aligned |
| 255 | N/A | | End-of-file |

The CPE 18 may also receive a configuration file, if necessary from the CM 16, the CMTS 12, or the DHCP server 160 via the TFTP 64 server. The CPE 18 also receives information on where to find a configuration file, if necessary, in a DCHPACK message. However, the CPE 18 may also receive information on where to find a configuration file with other messages (e.g., MAC 44) from the CM 16 or the CMTS 12.

After receiving a configuration file, the CM 16 sends a registration message to the CMTS 12. The registration message is typically a MAC 44 management message that includes a MAC 44 management header and selected information from the configuration file (e.g., from Table 10) in TLV format. The registration message is sent by the CM 16 to the CMTS 12 within a pre-determined time after receiving a DHCPACK to provide a security measure to protect the data-over-cable system 10. If the registration message is not sent by the CM 16 to the CMTS 12 within the pre-determined time, the CMTS 12 purges its ARP and routing tables of entries including the IP 54 address obtained by the CM 16 with DHCP 66. This helps prevent a rogue CM 16 from registering with the CMTS 12.

If a data-over-cable system with telephony return is being used, the registration message is sent on an upstream telephony channel with PPP 50 via the PSTN 22 and TRAC 24 to the CMTS 12. If a data-over-cable system without telephony return is being used, the registration message is sent on an upstream cable channel to the CMTS 12.

Upon receiving the registration message from the CM 16, the CMTS 12 updates its routing and ARP tables to reflect a CM 16 IP 54/MAC 44 address pairing in the registration message. The CMTS 12 will generate an SNMP 62 trap if an IP 54 address in the registration message is paired with a different MAC 44 address for the CM 16 in the CMTS 12 tables. As is known in the art, an SNMP 62 trap is used to indicate an error condition in a network. As was discussed above, the CMTS 12 records an IP 54 address obtained by the CM 16 with DHCP 66 before it forwards the DHCPACK to the CM 16.

The CMTS 12 sends a registration response back to the CM 16 that also includes CPE 18 IP 54 addresses in the CMTS 12 routing and ARP tables which are associated with a MAC 44 address for the CM 16, if any. However, depending on the initialization sequence, the CPE 18 may not have obtained an IP 54 address with DHCP 66 yet. The registration response message is also typically a MAC 44 management message with MAC 44 management header and TLV encoded data for the CM 16 (e.g., CMTS 12 data or vendor specific data).

The CM 16 may also proxy ARP for any CPE 18 IP 54 addresses in a registration response message. The CM 16 will use ARP on the CMCI 20 (FIG. 1) for the hardware addresses of the CPE 18 IP 54 addresses and update routing and ARP tables on the CM 16.

The CPE 18 may also send a registration message to the CMTS 12 via the CM 16, and may also receive a registration response from the CMTS 12 via the CM 16. If the CPE 18 sends a registration message, both the CM 16 and the CMTS 12 update ARP and other routing tables. The CMTS 12 will update its routing and ARP tables to reflect a CPE 18 IP 54 addresses and the CM 16 MAC 44 address pairing in the registration request. As was discussed above, the CMTS 12 records an IP 54 address obtained by the CPE 18 with DHCP 66 before sending a DHCPACK for the CPE 18 to the relay agent, the CM 16. The CMTS 12 will also generate an SNMP 64 trap if a CPE 18 IP 54 address in the registration request is paired with a different MAC 44 address for the CM 16 in the CMTS 12 tables.

After registration, if a data-over-cable system without telephony returned is being used, the CM 16 sends messages to the CMTS 12 on an upstream cable channel and receives messages from the CMTS 12 on a downstream cable channel. The CM 16 can also send data packets on an upstream cable channel to the CMTS 12, which forwards the data packets to the data network 28. The CMTS 12 sends response data packets back to the CM 16 on a downstream cable channel.

If a data-over-cable system with telephony return is used, after registration the CM 16 can send messages to the CMTS 12 on an upstream telephony channel via the PSTN 22 to the TRAC 24, which forwards the messages to the CMTS 12. The CM 16 can also send data packets on an upstream telephony channel via the PSTN 22 to the TRAC 24, which forwards the data packets to the data network 28. The CMTS 12 sends response data packets back to the CM 16 on a downstream cable channel.

After completing the registration request and registration response sequence, the CM 16 and/or the CPE 18 have completed initialization and can communicate with the data-over-cable system 10 and the data network 28 (FIG. 1). The CM 16 typically acts as a relay agent for requests and responses for one or more CPEs 18 attached to the CM 16.

Dynamic Service Registration in a Data-Over-Cable System

As was discussed above, it is desirable to dynamically provide deferred session based services after a session has been established between a network device (e.g., the CM 16 or the CPE 18) and the data-over-cable system 10. The dynamic session based services should provide the ability to activate new session-based services and also allow authentication, authorization or accounting event to be dynamically generated after a session between a network device and a data-over-cable system has already been established.

FIG. 18 is a flow diagram illustrating a Method 330 for dynamic service registration on a data-over-cable system. Method 330 includes receiving a first message on a second network device on a data-over-cable system from a first network device on the data-over-cable system at Step 332. The first message includes multiple service parameters for a desired service for a service device associated with the first network device. At step 334, the multiple service parameters for the desired service are extracted from the first message. At step 336, a service session profile is created for the desired service. The service session profile includes one or more of the extracted service parameters required by the desired service. The service session profile is used by a service server associated with the second network device to activate the desired service. At Step 338, the service session profile is associated with a deferred inactive service identifier for the first network device. The deferred service identifier is used to activate the desired service at a later time. At Step 340, the deferred inactive service identifier is returned to the first network device in a second message.

The deferred inactive service identifier is used at a later time by a service device associated with the first network device to dynamically activate the desired service and to generate a service event on a service server. The desired service can be dynamically activated even though the first network device may have already established a session (e.g., a login) with the second network device on the data-over-cable system. Multiple deferred inactive service identifiers can also be returned to the first network device to support multiple desired services for multiple service devices associated with the first network device.

In one exemplary preferred embodiment of the present invention, the first network device is the CM 16, and the second network device is the CMTS 12. The first message is a registration message and the second message is registration response message. The service parameters include of Quality-of-Service ("QoS"), Class-of-Service ("CoS"), Type-of-Service ("ToS"), voice service parameters or other service session parameters. The deferred inactive service identifier is a MAC 44 Service IDentifier ("SID") and the service session profile describes the desired service associated with the MAC 44 deferred inactive SID. The MAC 44 deferred inactive SID is used at a later time by a service device associated with the CM 16 to activate the desired service and to generate a service event (e.g., authentication, authorization or accounting) on a service server. However, the present invention is not limited to the network devices, messages, service parameters, or deferred service identifiers described. Other network devices (e.g., CPE 18), messages (e.g., DHCP 66), service parameters or deferred service identifiers could also be used.

In one embodiment of the present invention, at Step 332, the CMTS 12 receives a registration message from the CM 16. The registration message includes multiple service parameters (e.g., QoS) for a desired service (e.g., Voice over Internet Protocol ("VoIP") for one or more service devices (e.g., a VoIP telephone) associated with the CM 16.

Figure 19:
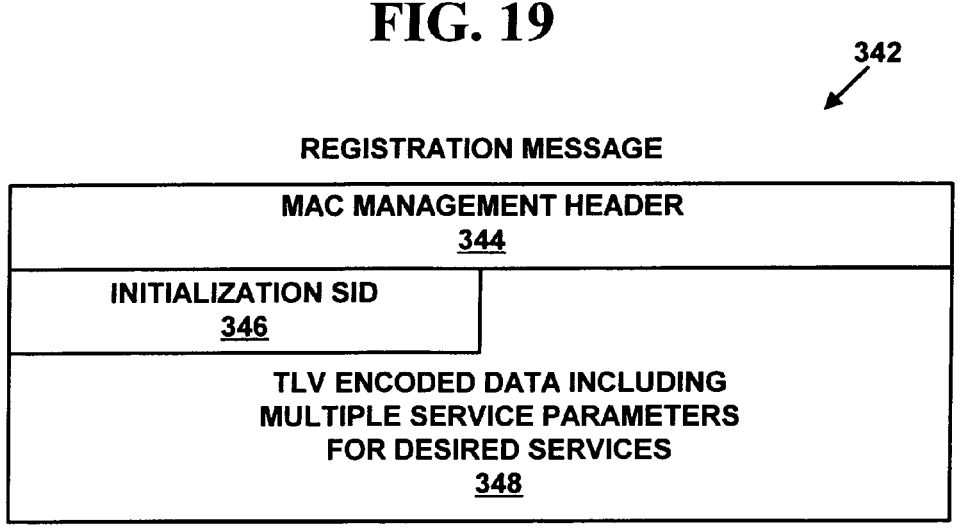
FIG. 19 is a block diagram illustrating a registration message sent from a cable modem to a cable modem termination system.

FIG. 19 is a block diagram illustrating a registration message 342 sent from the CM 16 to the CMTS 12. The registration message includes a MAC 44 management header-field 344, an initialization SID-field 346 and a TLV encoded information-field 348. An initialization SID in the initialization SID-field 346 is a SID used by the CM 16 to request bandwidth from the CMTS 12. In a preferred embodiment of the present invention, the CM 16 encodes service parameters required for one or more desired services and capabilities for service devices associated with the CM 16 in TLV format and places them in the TLV encoded information-field 348. For example, a CM 16 desiring to user VoIP will encode encode VoIP service parameters in TLV format. In addition, VoIP service devices associated with the CM 16 including voice and/or video coder/decoders ("codecs"), will have capabilities of the VoIP codecs encoded in TLV format. The TLV encoding information is placed in the TLV encoded-information field 348 in the registration message 342.

Returning to FIG. 18 at step 334, the multiple service parameters for the desired service are extracted from the first message. At step 336, a service session profile is created for the desired service. The service session profile includes one or more of the extracted service parameters required by the desired service. The service session profile is used by a service server (e.g., a VoIP server) associated with the CMTS 12 to activate the desired service. Table 11 illustrates an exemplary service session profile layout. However, other service session profile layouts can also be used and the present invention is not limited to the service session profile layout illustrated in Table 11.

TABLE 11

| Service | Service Device Type | Service Parameter-1 . . . | Service Parameter-N |
|---|---|---|---|
| VoIP | VoIP Telephone | QoS-3 | 32-bit codec |

Returning again to FIG. 18 at Step 338, the service session profile is associated with a MAC 44 deferred inactive Service IDentifier ("SID") for the CM 16.

A MAC 44 deferred inactive SIDs defines a particular mapping between the CM 16 and the CMTS 12. This mapping is the basis on which bandwidth is typically allocated to the CM 16 by the CMTS 12 and by which service parameters such as QoS, CoS and ToS are implemented. Within a MAC 44 sublayer domain, MAC 44 deferred inactive SIDs are unique.

In one preferred embodiment of the present invention, the CMTS 12 assigns one or more MAC 44 deferred inactive SIDs to each CM 16, corresponding to services requested by service devices associated with the CM 16. In one preferred embodiment of the present invention, a single MAC 44 deferred inactive SID can be used, for example, to offer "best-effort" services. However, MAC 44 deferred inactive SIDs for a preferred embodiment of the present invention can also provide more complex servers to be developed for the CM 16 with support for multiple classes of services while still supporting interoperability with more basic services such as "best-effort." For example, the MAC 44 deferred inactive SIDs can support "data flows" on which protocols such as Resource ReSerVation Protocol ("RSVP") and Real-Time Protocol ("RTP") are based. For more information on RSVP see, RFC-2205, incorporated herein by reference. For more information on RTP see, RFC-1889, incorporated herein by reference.

"Normal" MAC 44 SIDs typically have values in the range of zero through 0x3FFF (i.e., 0 through 16,383). In one preferred embodiment of the present invention, this range of values is split into pre-determined sub-ranges ranges including, for example, a first sub-range for "normal" MAC 44 SIDs, (e.g., 0–2047) a second sub-range for MAC 44 deferred inactive SIDs, (e.g., 2048–8191) and a third sub-range for MAC 44 deferred active SIDs (e.g., 8191–16,382). MAC 44 deferred active SIDs are explained below.

In another preferred embodiment of the present invention, the range of values is split into two sub-ranges, a first sub-range for MAC 44 deferred inactive SIDs (e.g., 8192–16,382) and a second sub-range for MAC 44 deferred active SIDs including "normal" MAC 44 SIDs (e.g., 0–8191). Returning again to FIG. 18, the MAC 44 deferred inactive SID is returned to the first network device in a registration response message at Step 340. The registration response message includes one or more MAC 44 deferred inactive SIDs encoded in TLV format. A MAC 44 deferred inactive SID is returned for each deferred service requested by a service device associated with the CM 16. Thus, multiple MAC 44 deferred inactive SIDs may be returned to a CM 16.

Figure 20:
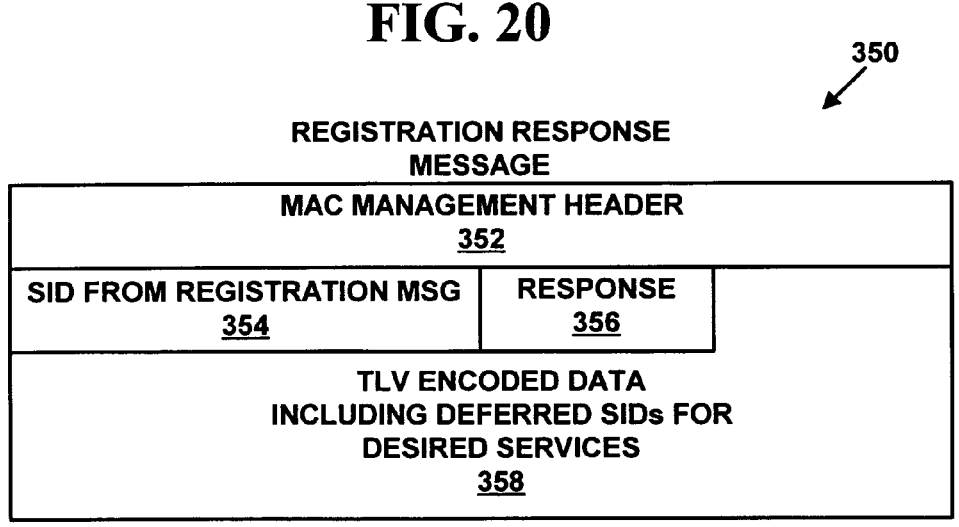
FIG. 20 is a block diagram illustrating a registration response message sent from a cable modem termination system to a cable modem.

FIG. 20 is a block diagram illustrating a registration response message 350 sent from the CMTS 12 to the CM 16. The registration response messages 350 includes a MAC 44 management header-field 352, response SID-field 354, a response-field 356, and a TLV encoded information-field 358. The response SID-field 354 includes the MAC 44 SID from the registration request message 342 to which the registration response refers (i.e., the SID from the initialization SID-field 346 (FIG. 19). The response-field 356 includes a response value (e.g., zero=ok, 1=authentication failure, 2=service failure, etc.).

The TLV encoded information-field 358 includes service device capabilities, service class data including the MAC 44 deferred inactive SID, service not available data, vendor specific data, and other data. Table 12 illustrates exemplary TLV data types included in the TLV encoded information-field 358. However, more or fewer TLV data types may also be included in the TLV encoded information-field 358, and the present invention is not limited to the TLV data illustrated in Table 12.

TABLE 12

| Service Parameter | Description |
| --- | --- |
| Service Device Capability Data | Service capabilities of service devices associated with the CM 16. |

TABLE 12-continued

| Service Parameter | Description |
| --- | --- |
| Service Data | Includes a MAC 44 deferred inactive SID for each deferred type of deferred service granted. |
| Service Not Available Data | If a service cannot be supported, this configuration setting is returned in place of the service class data. If this is received, the entire registration request is considered to have failed and must be repeated. |
| Vendor Specific Data | Vendor ID Configuration Settings including vendor ID of the CMTS 12 and vendor-specific extensions. |

Dynamic Service Activation in a Data-Over-Cable System

The MAC 44 deferred inactive SID from Method 330 is used at a later time by a service device (e.g., VoIP telephone) associated with a network device, such as the CM 16, to activate the desired service and to generate a service event (e.g., authentication, authorization or accounting) on a service server (e.g., VoIP server).

Figure 21:
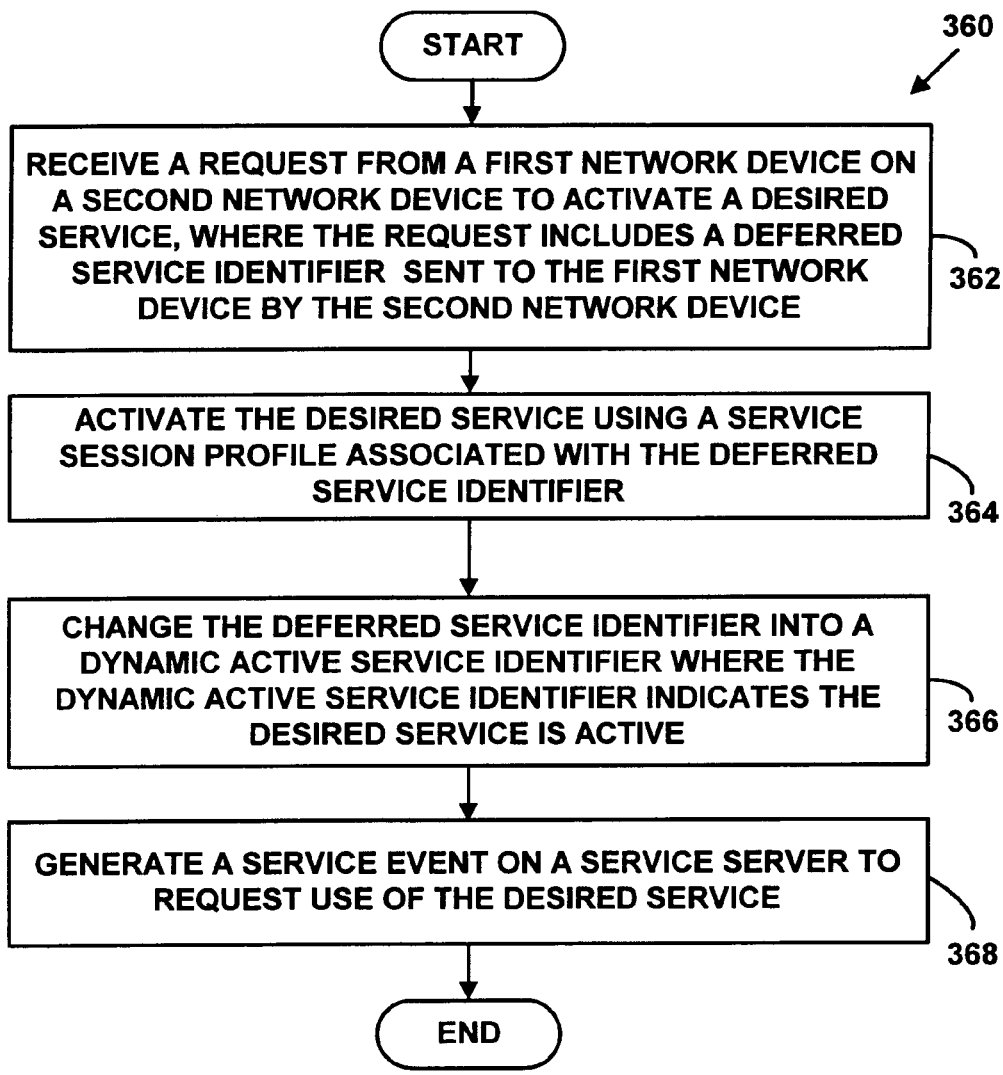
FIG. 21 is a flow diagram illustrating a method for dynamic service activation on data-over-cable system.

FIG. 21 is a flow diagram illustrating a Method 360 for dynamic service activation on the data-over-cable system 10. Method 360 includes at Step 362, receiving a service request from a first network device on a second network device on a data-over-cable system to activate a desired service. The service request includes a deferred inactive service identifier sent to the first network device by the second network device. The service request is initiated by a service device associated with the first network device. At Step 364, the desired service is activated on the data-over-cable system using a service session profile associated with the deferred inactive service identifier creating during registration of the first network device with the second network device. At Step 366, the deferred inactive service identifier is changed into a deferred active service identifier in the data-over-cable system. The second network device maintains a mapping between deferred inactive service identifier values and deferred active service identifier values. This mapping also allows an inactive service indicated by a deferred inactive service identifier to be activated, and an active service indicated by a deferred active service identifier to be deactivated. An active or inactive service is indicated by a pre-determined service identifier valve. At Step 368, a service event is generated on a service server associated with the data-over-cable system to request activation of the desired service.

In one exemplary preferred embodiment of the present invention, the first network device is the CM 16, and the second network device is the CMTS 12. The deferred inactive service identifier and the deferred active service identifier are MAC 44 SIDs and the service session profile describes the desired service based on the MAC 44 SID. The service event (e.g., authentication, authorization or accounting) is generated on a service server. However, the present invention is not limited to the network devices, messages, service parameters, or deferred service identifiers described. Other network devices (e.g., CPE 18), messages (e.g., DHCP 66), service parameters or deferred service identifiers could also be used for other preferred embodiments of the present invention.

In one exemplary preferred embodiment of the present invention, at Step 362, a service request is received on the CMTS 12 from the CM 16 to activate a desired service. The service request includes a MAC 44 deferred inactive SID sent to the CM 16 by the CMTS 12. The service request is initiated by a service device associated with the first network device. For example a VoIP telephone associated with the CM 16 may send an "offhook" request via the CM 16 to the CMTS 12 to activate VoIP service with service parameters sent to the CMTS 12 in a registration message (e.g., Step 332 of Method 330, FIG. 18). The offhook request would include a MAC 44 deferred inactive SID sent to the CM 16 in a registration response message (e.g., at Step 340, Method 330, FIG. 18) and saved in a service session profile. However, other service requests may also be made and the present invention is not limited to VoIP requests.

Returning to FIG. 21 at Step 364, the desired service (e.g., VoIP) is activated on the data-over-cable system using a service session profile (e.g., VoIP service session profile from Table 11) associated with the MAC 44 deferred inactive SID. At Step 366, the MAC 44 deferred inactive SID is changed into a MAC 44 deferred active SID in the data-over-cable system. The MAC 44 deferred active SID indicates the desired service (e.g., VoIP) associated with the MAC 44 deferred inactive SID is now active. In one exemplary preferred embodiment of the present invention, changing the MAC 44 deferred inactive SID into a MAC 44 deferred active SID includes changing the value of the MAC 44 deferred inactive SID into a new value indicating a MAC 44 deferred active SID. The CMTS 12 maintains a mapping between the MAC 44 deferred inactive SID values and MAC 44 deferred active SIDs values. This mapping allows an active service indicated by a MAC 44 deferred active SID to be deactivated and an inactive service indicated by a MAC 4 deferred inactive SID to be activated. An active or inactive service is indicated by a pre-determined MAC 44 SID valve.

Table 13 illustrates an exemplary mapping layout maintained by the CMTS 12 for MAC 44 deferred SID's. However, the mapping illustrated in Table 12 is exemplary, and other mapping layouts could also be used. The present invention is not limited to the mapping illustrated in Table 13.

TABLE 13

| Cable Modem | Service | MAC 44 deferred inactive SID | MAC 44 deferred active SID |
|---|---|---|---|
| CM-1 MAC 44 Address | VoIP | 2048 | 8191 |
| CM-2 MAC 44 Address | ATM | 2049 | — |
| CM-2 MAC 44 Address | Frame Relay | 2050 | — |
| . . . | . . . | . . . | . . . |

As is illustrated in Table 13, the VoIP service for the CM 16 number-1 is active, as it has an assigned MAC 44 deferred active SID) value of 8191, indicating the VoIP service is now active (e.g., assigned at Step 366 of Method 360). The other two services, ATM and Frame Relay for the CM 16 number-2, have been assigned MAC 44 deferred inative SIDs of 2049 and 2050. However, neither the ATM or frame relay services have been activated by a service device associated with the CM 16 number-2 (i.e., Table 13 does not yet include a MAC 44 deferred active SID for theses MAC 44 deferred inactive SIDs). If the VoIP service for the CM 16 number-1 is deactivated (e.g., at Step 374 of Method 370) and activated again at a later time (e.g., with Method 360), the CMTS 12 may not assign a MAC 44 deferred active SID a valve of 8191 for the VoIP service. Another value could be assigned depending on how many other services have already been activated (e.g., ATM and/or Frame Relay).

Returning to FIG. 21 at Step 368, a service event is generated on a service server associated with the data-over-cable system to request activation of the desired service. For example, an authentication, authorization, or accounting service event is generated on a VoIP server associated with the CMTS 12. The service event is mapped to a specific authentication, authorization, or accounting request on the VoIP server to initiate one or more event services, (e.g., a VoIP authentication request, VoIP start accounting request, etc.). Thus, a deferred inactive service has been activated on the data-over-cable system 10.

Dynamic Service Deactivation in a Data-Over-Cable System

Figure 22:
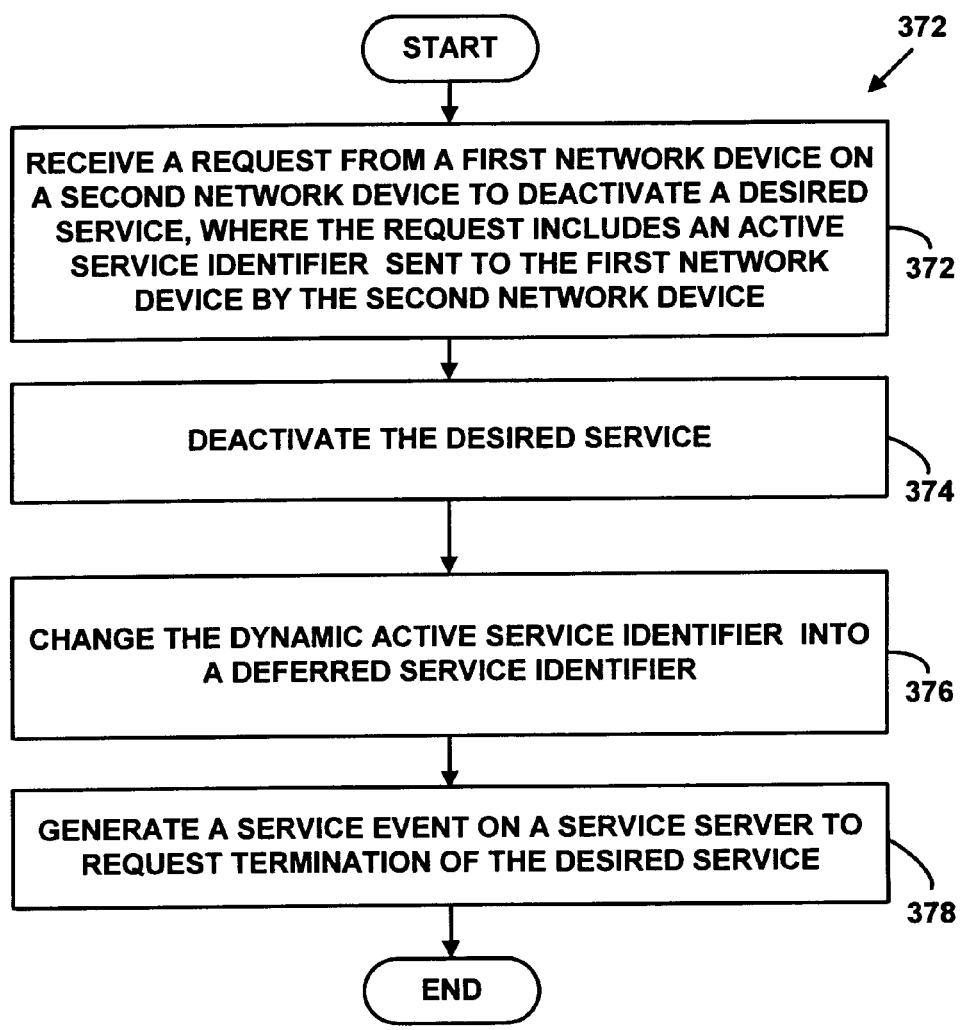
FIG. 22 is a flow diagram illustrating a method for dynamic service deactivation on data-over-cable system.

A service device associated with a CM 16 may also desire to deactivate a desired service that was dynamically activated with method 360 (FIG. 21). FIG. 22 is a flow diagram illustrating a Method 370 for dynamic service deactivation on data-over-cable system. At Step 372, a service request is received from a first network device on a second network device on a data-over-cable system to deactivate a desired service. The service request includes a deferred active service identifier. The service request is initiated by a service device associated with the first network device. At Step 374, the desired service is deactivated on the data-over-cable system. At Step 376, the deferred active service identifier is changed into a deferred inactive service identifier. At Step 378, a service event is generated on a service server associated with the data-over-cable system 10 to request deactivation of the desired service.

In one exemplary preferred embodiment of the present invention, the first network device is the CM 16, and the second network device is the CMTS 12. The deferred inactive service identifier and the deferred active service identifier are MAC 44 SIDs. The service event (e.g., authentication, authorization or accounting) is generating on a service server. However, the present invention is not limited to the network devices, messages, service parameters, or deferred service identifiers described. Other network devices (e.g., CPE 18), messages (e.g., DHCP 66), service parameters or deferred service identifiers could also be used for other preferred embodiments of the present invention.

In one exemplary preferred embodiment of the present invention, at Step 372, a service request is received from the CM 16 on a the CMTS 12 on the data-over-cable system 10 to deactivate a desired service. The service request includes a MAC 44 deferred active SID. The service request is initiated by a service device (e.g., a VoIP telephone) associated with the CM 16. In one exemplary preferred embodiment of the present invention, the service request is a VoIP "onhook" request to terminate a VoIP call. However, other service requests can also be made, and the present invention is not limited to VoIP requests.

At Step 374, the desired service (e.g., VoIP) is deactivated on the data-over-cable system 10. At Step 376, the MAC 44 deferred active SID is changed into a MAC 44 deferred inactive SID. At Step 378, a service event is generated on a service server associated with the data-over-cable system to request deactivation of the desired service.

For example, an authentication, authorization, or accounting service event is generated on a VoIP server associated with the CMTS 12. The service event is mapped to a specific authentication, authorization, or accounting request on the VoIP server to discontinue one or more event services (e.g., a VoIP discontinue authorization, a VoIP stop accounting request, etc.).

Exemplary preferred embodiments of the present invention have been described with examples relating to VoIP servers and services. The VoIP servers and services may be used in a data-over-cable system with or without telephony return. However, the present invention is not limited to VoIP services, and other services and service servers may also be used. For example, part of the Multimedia Cable Network Systems ("MCNS") Data Over Cable Service Interface Specification system ("DOCSIS") defines server interfaces that provide data services. Virtually any service server defined by DOCSIS system could be used for preferred embodiments of the present invention.

In another preferred embodiment of the present invention, a DOCSIS Authentication Dial In User Server ("RADIUS") server can be used as a service server to activate desired services. As is known in the art, RADIUS servers are responsible for receiving user connection requests, authenticating a user, and then returning configuration information necessary for a client to deliver service to a user. A RADIUS server can act as a proxy client to other RADIUS servers or other kinds of authentication servers (e.g., DHCP server 160, CMTS 12, VoIP server, ATM, ISDN, Frame Relay, etc.). For more information on RADIUS see, RFC-2138, incorporated herein by reference. In such an embodiment, the RADIUS server may be associated with TRAC 24, or may be associated with the CMTS 12. The RADIUS session may be initiated in a data-over-cable system with or without telephony return.

A RADIUS server may be used to allow dial-in services to the cable network 14 via the CMTS 12 in a data-over-cable system with or without telephony return. A service event to for activation or deactivation of a desired service can also be mapped to a specific RADIUS authentication, authorization, or accounting request. For example, a RADIUS Accounting START request, a RDIUS Accounting STOP request, etc.

In addition, other service servers not defined by DOCSIS system could also be used to provide deferred services. For example, Asynchronous Transfer Mode ("ATM") Frame Relay, Integrated Services Digital Network ("ISDN"), Asymetric Digital Subscriber Lines ("ADSL") and other service servers could also be used to provide deferred services on a data-over-cable system 10.

Method 330 allows a network device such as a CM 16 or a CPE 18 to use one or more deferred services as the network device registers with another network device, such as the CMTS 12. The CMTS 12 returns one or more deferred inactive service identifies that service devices associated with a network device can use to dynamically activate a deferred service even after the network device has established a service session with the CMTS 12. Methods 360 and 370 allow a network device with associated service devices to dynamically activate or deactivate one or more desired services after a network device has registered and created a service session with the CMTS 12. The activation and deactivation of desired services is accomplished with the cooperation of many different type of service servers.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

We claim:

1. In a data communication system including a plurality of network devices, wherein the plurality of network devices includes first and second network devices, and wherein during initialization, communication system resources for carrying out sessions based services are registered with and allocated by the second network device, a method for providing dynamic services comprising the steps of:

receiving during initialization at the second network device a registration message from the first network device containing parameters associated with a plurality of capabilities of the first network device used for carrying out at least one deferred session-based service between at least one service device associated with the first network device and a service server associated with the second network device, wherein each of the at least one deferred-session-based service comprises a service for which communication system resources are registered with, but not allocated by the second network device until the at least one deferred session-based service is later activated, and activation of the at least one deferred-session-based service is operable to occur after a session is established between the first and second devices;

configuring the second network device and the service server for the at least one deferred-session-based service;

associating a deferred-inactive-service identifier with the at least one deferred-session-based service, wherein the deferred-inactive-service identifier is used to activate the at least one deferred-session-based service at the later time;

sending the deferred-inactive-service identifier to the first network device, wherein when the at least one deferred-session-based service is later activated, a communication link utilizing the parameters is established between the first and second network devices receiving at the second network device from the first network device the deferred-inactive-service identifier;

responsive to the deferred-inactive-service identifier, activating the at least one deferred-session-based service between the session server and the service device; and changing the deferred-inactive-service identifier to a deferred-active-service identifier.

2. The method of claim 1, further comprising the steps of:

receiving at the second network device from the first network device the deferred-active-service identifier;

responsive to the deferred-active-service identifier, deactivating the at least one deferred-session-based service between the session server and the service device; and changing the deferred-active-service identifier to a deferred-inactive-service identifier.

3. In a data communication system including a plurality of network devices, wherein the plurality of network devices includes first and second network devices, and wherein during initialization, communication system resources for carrying out session-based services are registered with and allocated by the second network device, a method for providing dynamic services comprising the steps of:

sending during initialization from the first network device to the second network device a registration message containing parameters associated with a plurality of capabilities of the first network device used for carrying out at least one deferred session-based service between at least one service device associated with the first network device and a service server associated with the second device, wherein each of the at least one deferred-session-based service comprises a service in which communication system resources are registered with, but not allocated by the second network device until the at least one deferred session-based service is later activated, and activation of the at least one deferred-session-based service is operable to occur after a session is established between the first and second devices, and wherein a deferred-inactive-service identifier Is associated with the at least one deferred-session-based service, and wherein the deferred-inactive-service identifier is used to activate the at least one deferred-session-based service at the later time;

receiving at the first network device from the second network device the deferred-inactive-service identifier, wherein when the at least one deferred session-based service is later activated, a communication link utilizing the parameters is established between the first and second network devices; and sending to the second network device from the first network device the deferred-inactve-service identifier; wherein in response to the deferred-inactive-service identifier, the at least one deferred-session-based service between the service server and the service device is activated; and wherein the deferred-inactive-service identifier is changed to a deferred-active-service identifier.

4. The method of claim 3, further comprising the steps of:

sending to the second network device from the first network device the deferred-active-service identifier; wherein responsive to the deferred-active-service identifier, the at least one deferred-session-based service between the service server and the service device is deactivated; and wherein the deferred-active-service identifier is changed to a deferred-inactive-service identifier.

5. In a data communication system including a plurality of network devices, wherein the plurality of network devices includes first and second network devices, and wherein during in initialization, communication system resources for carrying out session-based services are registered with and allocated by the second network device, a method for providing dynamic services comprising the steps of:

the second network device receiving a first message from the first network device, wherein the first message includes parameters associated with a plurality of capabilities of the first network device used for carrying out at least one deferred-session-based service between a service server associated with the second network device and a service device associated with the first network device, wherein each of the at least one deferred-session-based service comprises a service in which communication system resources are registered with, but not allocated by the second network device until the at least one deferred session-based service is later activated, and activation of the at least one deferred-session-based service is operable to occur after a session is established between the first and second devices;

extracting the parameters from the first message;

creating a service-session profile for the at least one deferred-session-based service, wherein the service-session profile includes one or more of the parameters;

using the service-session profile to configure the service server and the second network device for the at least one deferred-session-based service for activation at a later time;

associating the service-session profile with a deferred-inactive-service identifier, wherein the deferred-inactive-service identifier is used to activate the at least one deferred-session-based service at the later time;

sending the deferred-inactive-service identifier to the first network device in a second message, wherein when the deferred-inactive-service identifier is used to later activate the at least one deferred-session-based service, a communication link utilizing the service session profile is established between the first and second network devices;

the second network device receiving from the first network device a service request to activate the at least one deferred-session-based-service, wherein the service request includes the deferred-inactive-service identifier;

responsive to the deferred-inactive-service identifier, activating the at least one deferred-session-based service between the service server and the service device; and changing the deferred-inactive-service identifier to a deferred-active-service identifier.

6. The method of claim 5, wherein the first network device is a cable modem and the second network device is a cable modem termination system.

7. The method of claim 5, wherein the deferred inactive service identifier is a Medium Access Control Protocol service identifier.

8. The method of claim 5, wherein the parameters include any of quality-of-service, class-of-service, type-of-service or voice service parameters.

9. The method of claim 5, wherein the first message is a registration message and the second message is a registration response message.

10. The method of claim 5, wherein the deferred-inactive-service identifier is encoded in a Type-Length-Value format.

11. The method of claim 5, further comprising the step of generating a service event on the service server to request activation of the at least one deferred-session-based service, wherein the step of generating a service event occurs prior to activation of the at least one deferred-session-based service.

12. The method of claim 11, wherein the step of generating a service event includes generating any of an authentication, authorization or an accounting event.

13. The method of claim 5, wherein the service server is any of a Remote Authentication Dial In User Server, a Voice over Internet Protocol server, Asynchronous Transport Mode Server, Frame Relay Server, or an Integrated Services Digital Network server, or an Asymmetric Digital Subscriber Line server.

14. The method of claim 5, further comprising:

the first network device receiving from the second network device a service notification from the service server indicating that the at least one deferred-session-based service has been activated.

15. A computer readable medium having stored therein instructions for causing a central processing unit to execute the method of claim 5.

16. In a data communication system including a plurality of network devices, wherein the plurality of network devices includes first and second network devices, and wherein during initialization, communication system resources for carrying out session-based services are registered with and allocated by the second network device, a method for providing dynamic services comprising the steps of:

the second network device receiving a first message from the first network device, wherein the first message includes parameters associated with a plurality of capabilities of the first network device used for carrying out at least one deferred-session-based service between a service server associated with the second network device and a service device associated with the first network device, wherein each of the at least one deferred-session-based service comprises a service in which communication system resources are registered with, but not allocated by the second network device until the at least one deferred session-based service is later activated, and activation of the at least one deferred-session-based service is operable to occur after a session is established between the first and second devices;

extracting the parameters from the first message;

creating a service-session profile for the at least one deferred-session-based service, wherein the service-session profile includes one or more of the parameters;

using the service-session profile to configure the service server and the second network device for the at least one deferred-session-based service for activation at a later time;

associating the service-session profile with a deferred-inactive-service identifier, wherein the deferred-inactive-service identifier is used to activate the at least one deferred-session-based service at the later time;

sending the deferred-inactive-service identifier to the first network device in a second message, wherein when the deferred-inactive-service identifier is used to later activate the at least one deferred-session-based service, a communication link utilizing the service session profile is established between the first and second network devices;

the second network device receiving from the first network device a service request to deactivate at least one deferred-session-based service, wherein the service request includes the deferred-active-service identifier;

generating a service event on the service server to request deactivation of the desired service;

deactivating the at least one deferred-session-based service; and changing the deferred-active-service identifier to a deferred-inactive-service identifier.

17. The method of claim 16, wherein the deferred-active-service identifier is a Medium Access Control Protocol service identifier and the deferred-inactive-service identifier is a Medium Access Control Protocol service identifier.

18. The method of claim 16, wherein the service request is a Voice over Internet Protocol on-hook request.

19. The method of claim 16, further comprising
the first network device receiving a service notification from the service server indicating that the at least one deferred-session-based service has been deactivated.

20. In a data communication system including a plurality of network devices, wherein the plurality of network devices includes first and second network devices, wherein during initialization, communication system resources for carrying out session-based services are registered with and allocated by the second network device, a method for providing dynamic services comprising the steps of:

the second network device receiving a first message from the first network device, wherein the first message includes parameters associated with a plurality of capabilities of the first network device used for carrying out at least one deferred-session-based service between a service server associated with the second network device and a service device associated with the first network device, wherein each of the at least one deferred-session-based service comprises a service in which communication system resources are registered with, but not allocated by the second network device until the at least one deferred session-based service is later activated, and activation of the at least one deferred-session-based service is operable to occur after a session is established between the first and second devices;

extracting the parameters from the first message;

creating a service-session profile for the at least one deferred-session-based service, wherein the service-session profile includes one or more of the parameters;

using the service-session profile to configure the service server and the second network device for the at least one deferred-session-based service for activation at a later time;

associating the service-session profile with a deferred-inactive-service identifier, wherein the deferred-inactive-service identifier is used to activate the at least one deferred-session-based service at the later time;

sending the deferred-inactive-service identifier to the first network device in a second message, wherein when the deferred-inactive-service identifier is used to later activate the at least one deferred-session-based service, a communication link utilizing the service session profile is established between the first and second network devices;

the second network device receiving from the first network device a service request to activate at least one deferred-session-based service, wherein the service request includes the deferred-inactive-service identifier;

responsive to the deferred-inactive-service identifier, generating a service event on the service server to request activation of the at least one deferred-session-based service;

activating the at least one deferred-session-based service using a previously created service-session profile associated with the deferred-inactive-service identifier; and changing the deferred-inactive-service identifier to a deferred-active-service identifier, wherein when the at least one deferred-session-based service is activated, a communication link utilizing the service session profile is established between the first and second network devices.

21. A computer readable medium having stored therein instructions for causing a central processing unit to execute the method of claim 20.

22. The method of claim 20, wherein the first network device is a cable modem and the second network device is a cable modem termination system.

23. The method of claim 20, wherein the deferred-inactive-service identifier is a Medium Access Control Protocol service identifier and the deferred-active-service identifier is a Medium Access Control Protocol Service identifier.

24. The method of claim 20, wherein the step of generating a service event includes generating any of an authentication, authorization or an accounting event.

25. The method of claim 20, wherein the service server is any of a Remote Authentication Dial In User Server, a Voice over Internet Protocol server, Asynchronous Transport Mode Server, Frame Relay Server, an Integrated Services Digital Network server, or an Asymmetric Digital Subscriber Line server.

26. The method of claim 20, wherein the service request is a Voice over Internet Protocol off-hook request.

27. A computer readable medium having stored therein instructions for causing a central processing unit to execute the method of claim 16.

28. A computer readable medium having stored therein instructions for causing a central processing unit to execute the methods of claim 14.

29. A computer readable medium having stored therein instructions for causing a central processing unit to execute the method of claim 19.

30. A system for providing dynamic services to a network device in data communication system, wherein the system includes first and second network devices, and wherein during initialization, communication system resources for carrying out session-based services are registered with and allocated by the second network device, the system comprising in combination:

the second network device that is operable to provide at least one deferred-session-based service between a service device associated with the first network device and a service server associated with the second network device, wherein each of the at least one deferred-session-based service comprises a service in which communication system resources are registered with, but not allocated by the second network device until the at least one deferred session-based service is later activated, and activation of the at least one deferred-session-based service is operable to occur after a session is established between the first and second devices;

a service-session profile that includes parameters associated with a plurality of capabilities of the first network device used for carrying out the at least one deferred-session-based service, wherein the service-session profile is used for configuring the second network device and the service server for the at least one deferred-session-based service, and wherein when the at least one deferred-session-based service is later activated, a communication link utilizing the service session profile is established between the first and second network devices;

a deferred-inactive-service identifier that is associated with the service-session profile for later activating a previously-configured at least one deferred-session-based service;

a deferred-active-service identifier that is created from the deferred-inactive-service identifier for indicating that the at least one deferred-session-based service is active; and a service event generator for generating a service event on the service server to request activation of the at least one deferred-session-based service wherein the second network device is operable to (i) receive from the first network device the deferred-inactive-service identifier: (ii) activate, responsive to the deferred-inactive-service identifier, the at least one deferred-session-based service between the session server and the service device, and (iii) change the deferred-inactive-service identifier to the deferred-active-service identifier.

* * * * *